(12) United States Patent     (10) Patent No.:   US 12,666,243 B2

Wang et al.                (45) Date of Patent:     Jun. 23, 2026

(54) METHOD FOR SUPPORTING WIRELESS COMMUNICATION NETWORK DATA COLLECTION

(71) Applicant: Samsung Electronics Co., Ltd., Suwon-si (KR)

(72) Inventors: Yanru Wang, Beijing (CN); Hong Wang, Beijing (CN); Lixiang Xu, Beijing (CN); Weiwei Wang, Beijing (CN); Xiaoning Ma, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 417 days.

(21) Appl. No.: 18/156,062

(22) Filed: Jan. 18, 2023

(65) Prior Publication Data

US 2023/0232203 A1     Jul. 20, 2023

(30) Foreign Application Priority Data

| Jan. 19, 2022 | (CN) | ......................... 202210060774.8 |
| Jul. 19, 2022 | (CN) | ......................... 202210849770.8 |
| Jan. 13, 2023 | (CN) | ......................... 202310067610.2 |

(51) Int. Cl.
*H04W 24/10*       (2009.01)
*H04W 8/02*        (2009.01)

(52) U.S. Cl.
CPC ............. *H04W 8/02* (2013.01); *H04W 24/10* (2013.01)

(58) Field of Classification Search
CPC ... H04W 8/02; H04W 24/10; H04W 36/0055; H04W 24/02; H04W 36/0033; H04W 8/22; H04W 36/00692; H04W 36/38; Y02D 30/70
See application file for complete search history.

(56) References Cited

U.S. PATENT DOCUMENTS

| 10,856,139 | B2 | 12/2020 | Kim et al. | |
| 2011/0026422 | A1* | 2/2011 | Ma ......................... | H04L 5/0053 370/252 |
| 2018/0132196 | A1* | 5/2018 | Yang .................... | H04B 17/102 |
| 2018/0331881 | A1* | 11/2018 | Beattie, Jr. ........... | H04W 24/02 |
| 2020/0351645 | A1 | 11/2020 | Jin et al. | |
| 2021/0153005 | A1 | 5/2021 | Ke | |

(Continued)

FOREIGN PATENT DOCUMENTS

| CN | 113873538 A | 12/2021 |
| WO | 2021/163895 A1 | 8/2021 |

(Continued)

OTHER PUBLICATIONS

International Search report dated Mar. 29, 2023, issued in International Patent Application No. PCT/KR2023/000835.

(Continued)

*Primary Examiner* — Chuong A Ngo

(74) *Attorney, Agent, or Firm* — Jefferson IP Law, LLP

(57) ABSTRACT

The disclosure relates to a 5G or 6G communication system for supporting a higher data transmission rate. A method performed by a first entity in a wireless communication network is provided. The method includes sending a first message including a user equipment (UE) model information request to a second entity, and receiving a second message including UE model information from the second entity in response to sending the first message.

20 Claims, 18 Drawing Sheets

(56) References Cited

U.S. PATENT DOCUMENTS

| | | |
|---|---|---|
| 2021/0297849 A1 | 9/2021 | Alnas |
| 2021/0329444 A1 | 10/2021 | Wiemann et al. |
| 2023/0217366 A1 | 7/2023 | Hong |
| 2024/0049003 A1 | 2/2024 | Ryden et al. |
| 2024/0303058 A1* | 9/2024 | Wang ........................ G06F 8/61 |

FOREIGN PATENT DOCUMENTS

| | | |
|---|---|---|
| WO | 2021/248371 A1 | 12/2021 |
| WO | 2022/008037 A1 | 1/2022 |
| WO | 2022/013104 A1 | 1/2022 |

OTHER PUBLICATIONS

Extended European Search Report dated Mar. 24, 2025, issued in European Patent Application No. 23743447.7.

* cited by examiner

<u>2100</u>

| Receive a message including information related to network data collection from a second entity |
|---|

~2101

METHOD FOR SUPPORTING WIRELESS COMMUNICATION NETWORK DATA COLLECTION

CROSS-REFERENCE TO RELATED APPLICATION(S)

This application is based on and claims priority under 35 U.S.C. § 119 (a) of a Chinese patent application number 202210060774.8, filed on Jan. 19, 2022, in the Chinese Patent Office, of a Chinese patent application number 202210849770.8, filed on Jul. 19, 2022, in the Chinese Patent Office, and of a Chinese patent application number 202310067610.2, filed on Jan. 13, 2023, in the Chinese Patent Office, the disclosure of each of which is incorporated by reference herein in its entirety.

BACKGROUND

1. Field

The disclosure relates to a method and a device for supporting wireless communication network data collection.

2. Description of Related Art 5G mobile communication technologies define broad frequency bands such that high transmission rates and new services are possible, and can be implemented not only in "Sub 6 GHz" bands such as 3.5 GHZ, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Recently, a number of subscribers of wireless communication services has exceeded 5 billion, and it continues growing rapidly. With the increasing popularity of smart phones and other mobile data devices (such as tablet computers, notebook computers, netbooks, e-book readers and machine-type devices) in consumers and enterprises, a demand for wireless data services is growing rapidly. In order to meet rapid growth of mobile data services and support new applications and deployments, it is very important to improve efficiency and coverage of wireless interfaces.

Different entities in the wireless network can be classified as user equipments (UEs), access nodes, mobility management function entities, session management function entities, data plane function entities and so on according to the taken tasks.

The above information is presented as background information only to assist with an understanding of the disclosure. No determination has been made, and no assertion is made, as to whether any of the above might be applicable as prior art with regard to the disclosure.

SUMMARY

At present, it is impossible to support user model management and user inference content reporting management during the mobility process, which will lead to repeated download and installation of models, excessive storage of useless models in a user equipment (UE), invalid model inference and/or training of a UE, etc., such that the performance of the network and the UE cannot be guaranteed. At present, it is impossible to support the interaction of computing power information among network entities, such that it is impossible to properly allocate computing power and/or set corresponding strategies to ensure the performance of the network and the user equipment.

Aspects of the disclosure are to address at least the above-mentioned problems and/or disadvantages and to provide at least the advantages described below. Accordingly, an aspect of the disclosure is to provide a method and a device for supporting wireless communication network data collection.

Additional aspects will be set forth in part in the description which follows and, in part, will be apparent from the description, or may be learned by practice of the presented embodiments.

In accordance with an aspect of the disclosure, a method performed by a first entity in a wireless communication network is provided. The method includes sending a first message including a user equipment (UE) model information request to a second entity, and receiving a second message including UE model information from the second entity in response to sending the first message.

In accordance with an aspect of the disclosure, a method performed by a first entity in a wireless communication network is provided. The method includes receiving a message including information related to network data collection from a second entity, sending a first message including a user equipment (UE) model information request to the second entity, and receiving a second message including UE model information from the second entity in response to sending the first message.

In an embodiment, receiving a message including information related to network data collection from a second entity includes receiving a second message including UE model information from the second entity, and further includes sending a first message including a user equipment (UE) model information request to the second entity before receiving the second message including UE model information from the second entity. The first message includes one or more of the followings, UE identification, a validity range of the content of the first message, a handover time, a UE model information reporting request indication, a reporting registration request, a reporting time interval, reporting time, an information reporting type, an information reporting period, reporting triggering event configuration, and content to be reported, and wherein the content to be reported includes one or more of the followings, an index and/or a list of indexes of model(s), a name of a model, a function of a model, a state of a model, a model integrity state, a state of an incompletely downloaded model, a model download address, a model download proportion, a suggested action, a suggested action for an incompletely downloaded model, model accuracy, a model activation condition, a model deactivation condition, model activation time, model deactivation time, an inference content reporting situation, and wherein, the inference content reporting situation includes one or more of the followings, an inference content reporting type, an inference content reporting period, a triggering event for inference content reporting, reported inference content, validity time of the inference content requested to be reported and/or reported inference content, accuracy. The second message comprises one or more of the followings, UE identification, a validity range of the content of the second message, confirmation on the requested content can be reported, a triggering event, model information content, and wherein, the model information content includes one or more of the followings, an index and/or a list of indexes of model(s), a name of a model, a function of a model, a state of a model, a model integrity state, a state of an incompletely downloaded model, a suggested action, a suggested action for an incompletely downloaded model, model accuracy, a model activation condition, a model deactivation condition, model activation time, model deactivation time, a model download address, a model download proportion, an inference content reporting situation, and wherein, the inference content reporting situation includes one or more of the followings, an inference content reporting type, an inference content reporting period, a triggering event for inference content reporting, reported inference content, validity time of the reported inference content, accuracy.

In an embodiment, receiving a message including information related to network data collection from a second entity includes receiving a fourth message including a UE model management decision from the second entity. The fourth message includes one or more of UE identification, a validity range of the content of the fourth message and model management decision, and wherein, the model management decision includes one or more of the followings, an index and/or a list of indexes of model(s), a named of a model, a function of a model, a state of a model, a state of an incompletely downloaded model, a decision for a model, a decision for an incompletely downloaded model, a list of active models, a model activation indication, a model deactivation indication, model activation time, model deactivation time, a model activation condition, a model deactivation condition, a forwarding strategy applicable to a completely downloaded model, a model forwarding strategy applicable to an incompletely downloaded model, a model forwarding proportion, an inference content reporting decision, and wherein, the inference content reporting decision includes one or more of the followings, an inference content reporting type, an inference content reporting period, a triggering event for inference content reporting, reported inference content, validity time of the reported inference content, inference content requested to be reported, validity time of the inference content requested to be reported, accuracy.

In an embodiment, the receiving a message including information related to network data collection from a second entity comprises receiving a sixth message including a UE model from the second entity, and further comprises before receiving the sixth message including the UE model from the second entity, sending a fifth message including a UE model forwarding request to the second entity. The fifth message comprises one or more of the followings, UE identification, a validity range of the content of the fifth message, a handover time, model forwarding request identification, a model forwarding registration request, a model forwarding time interval, model forwarding time, a model forwarding proportion, a model forwarding type, triggering event configuration for model forwarding, a model download address, a model download proportion, content to be forwarded, and wherein, the content to be forwarded includes one or more of the followings, an index and/or a list of indexes of model(s), a name of a model, a function of a model, a state of a model, model accuracy, a model type, a feature parameter of a model, an input parameter type of a model, constraints of input parameters of a model, output parameter types of a model, preprocessing methods of input parameters of a model, post-processing methods of output parameters of a model, validity time of model inference content. The sixth message comprises one or more of the followings, UE identification, a validity range of the content of the sixth message, confirmation on the requested content can be forwarded, a model download proportion, a model forwarding proportion, a triggering event for model forwarding, content to be forwarded, distribution content, and wherein, the content to be forwarded includes one or more of the followings, an index and/or a list of indexes of model(s), a name of a model, a function of a model, a state of a model, model accuracy, a type of a model, a feature parameter of a model, an input parameter type of a model, constraints of input parameters of a model, output parameter types of a model, preprocessing methods of input parameters of a model, post-processing methods of output parameters of a model, validity time of model inference content, and wherein, the distribution content includes one or more of the followings, an index and/or a list of indexes of model(s), a name of a model, a function of a model, a state of a model, model accuracy, a type of a model, a feature parameter of a model, an input parameter type of a model, constraints of input parameters of a model, output parameter types of a model, preprocessing methods of input parameters of a model, post-processing methods of output parameters of a model.

In an embodiment, receiving a message including information related to network data collection from the second entity includes receiving a tenth message including computing power information from the second entity.

In an embodiment, receiving a message including information related to network data collection from a second entity comprises sending an eighth message including information for requesting computing power to the second entity, receiving a ninth message including a response to the eighth message or a tenth message including computing power information from the second entity. The eighth message comprises one or more of the followings, a validity range of the content of the eighth message, prediction identification, a prediction registration request, a registration request, a reporting time interval, reporting time, a predicted information reporting time interval, predicted information reporting time, validity time of the prediction result of predicted information, a computing power information reporting type, a computing power information reporting period, triggering event configuration for computing power information reporting, a predicted computing power information reporting type, a predicted computing power information reporting period, triggering event configuration for predicted computing power information reporting, computing power information content to be reported, predicted computing power information content to be reported. The ninth message comprises one or more of the followings, a validity range of the content of the ninth message, confirmation on the requested content can be reported, confirmation on the requested predicted content can be reported, a triggering event for computing power information reporting, a triggering event for predicted computing power information reporting, computing power information reporting content, predicted computing power information reporting content, accuracy of predicted computing power information, validity time of predicted computing power information. The tenth message comprises one or more of the followings, a validity range of the content of the tenth message, a triggering event for computing power information reporting, a triggering event for predicted computing power information reporting, computing power information reporting content, predicted computing power information reporting content, accuracy of predicted computing power information, validity time of predicted computing power information.

In accordance with another aspect of the disclosure, a method performed by a second entity in a wireless communication network is provided. The method includes sending a message including information related to network data collection to a first entity, wherein the message includes a message including user equipment (UE) model information, a message including a UE model management decision, a message including a UE model, a message including a response to a computing power information reporting request and a message including computing power information.

In accordance with another aspect of the disclosure, an entity in a wireless communication network is provided. The entity includes a processor and a transceiver, and the processor is coupled with the transceiver and configured to perform the above-mentioned methods, steps and operations.

The disclosure provides a method for supporting wireless communication network data collection, which can ensure the effectiveness of model distribution and/or training and/or inference of a UE and reduce unnecessary model distribution and/or training and/or inference.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
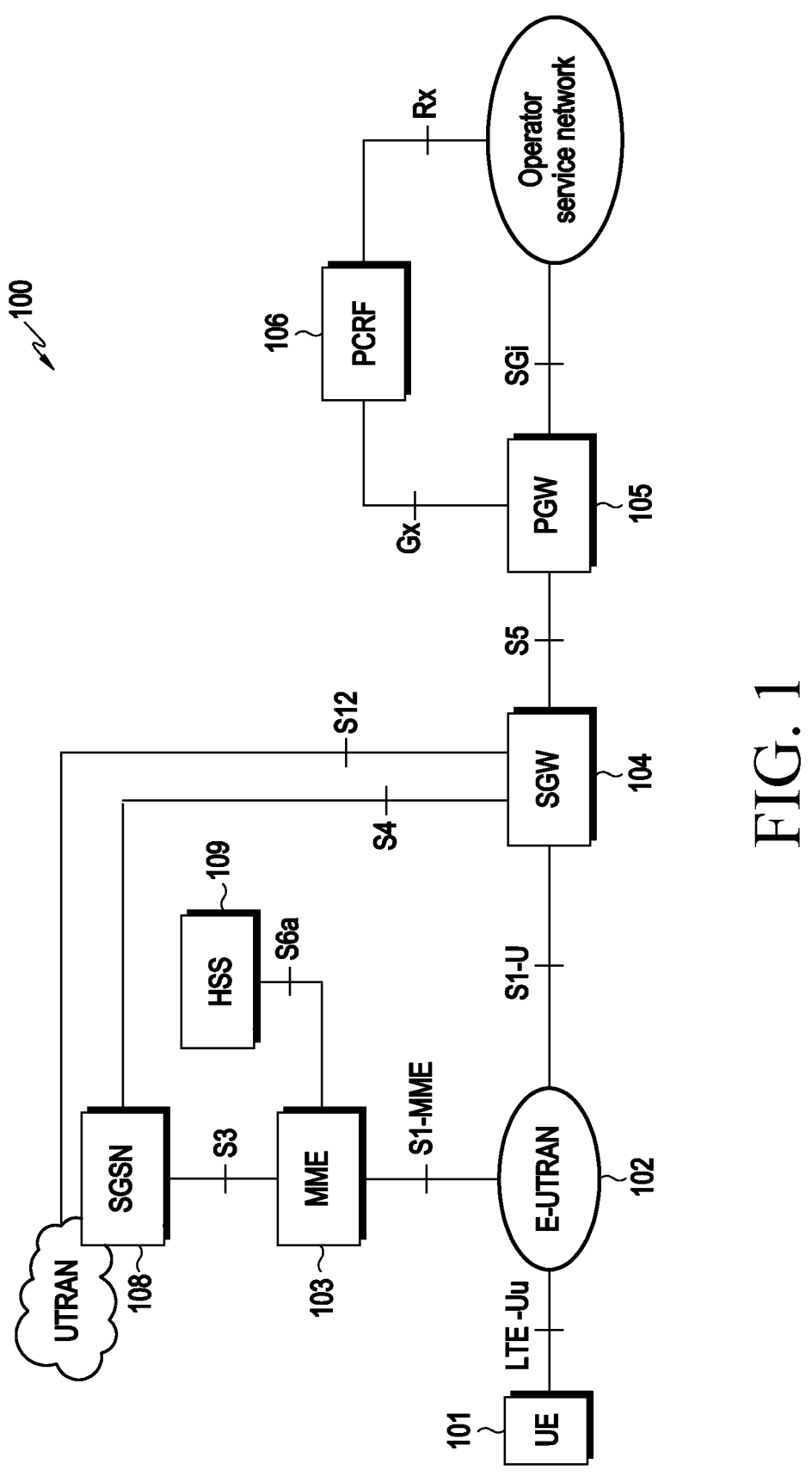
FIG. 1 illustrates a system architecture of System Architecture Evolution (SAE) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It should be understood that singular forms of "a", "an" and "the" include plural referents unless the context clearly dictates otherwise. Thus, for example, references to "a component surface" includes reference to one or more such surfaces.

The term "including" or "may include" refers to the existence of the corresponding disclosed functions, operations or components that can be used in various embodiments of the disclosure, rather than limiting the existence of one or more additional functions, operations or features. In addition, the term "including" or "having" can be interpreted to indicate certain features, numbers, steps, operations, constituent elements, components or combinations thereof, but should not be interpreted to exclude the possibility of the existence of one or more other features, numbers, steps, operations, constituent elements, components or combinations thereof.

The term "or" used in various embodiments of the disclosure includes any listed terms and all combinations thereof. For example, "A or B" may include A, B, or both A and B.

The term "forward" used in various embodiments of the disclosure includes "forward" and "transmit/send".

Unless otherwise defined, all terms (including technical terms or scientific terms) used in this disclosure have the same meanings as understood by those skilled in the art to which this disclosure belongs. General terms as defined in dictionaries are interpreted to have meanings consistent with the context in the relevant technical fields, and these terms should not be interpreted idealized or excessively formally, unless explicitly defined as such in this disclosure.

FIGS. 1 to 20 discussed below and various embodiments for describing the principles of the disclosure in this patent document are only for illustration and should not be interpreted as limiting the scope of the disclosure in any way. Those skilled in the art will understand that the principles of the disclosure can be implemented in any suitably arranged system or device.

FIG. 1 is a system architecture 100 of system architecture evolution (SAE) according to an embodiment of the disclosure.

Referring to FIG. 1, user equipment (UE) 101 is a terminal device for receiving data. An evolved universal terrestrial radio access network (E-UTRAN) 102 is a radio access network, which includes a macro base station (eNodeB/NodeB) that provides UE with interfaces to access the radio network. A mobility management entity (MME) 103 is responsible for managing mobility context, session context and security information of the UE.

A serving gateway (SGW) 104 mainly provides functions of user plane, and the MME 103 and the SGW 104 may be in the same physical entity. A packet data network gateway (PGW) 105 is responsible for functions of charging, lawful interception, etc., and may be in the same physical entity as the SGW 104. A policy and charging rules function entity (PCRF) 106 provides quality of service (QoS) policies and charging criteria. A general packet radio service support node (SGSN) 108 is a network node device that provides routing for data transmission in a universal mobile telecommunications system (UMTS). A home subscriber server (HSS) 109 is a home subsystem of the UE, and is responsible for protecting user information including a current location of the user equipment, an address of a serving node, user security information, and packet data context of the user equipment, etc.

Figure 2:
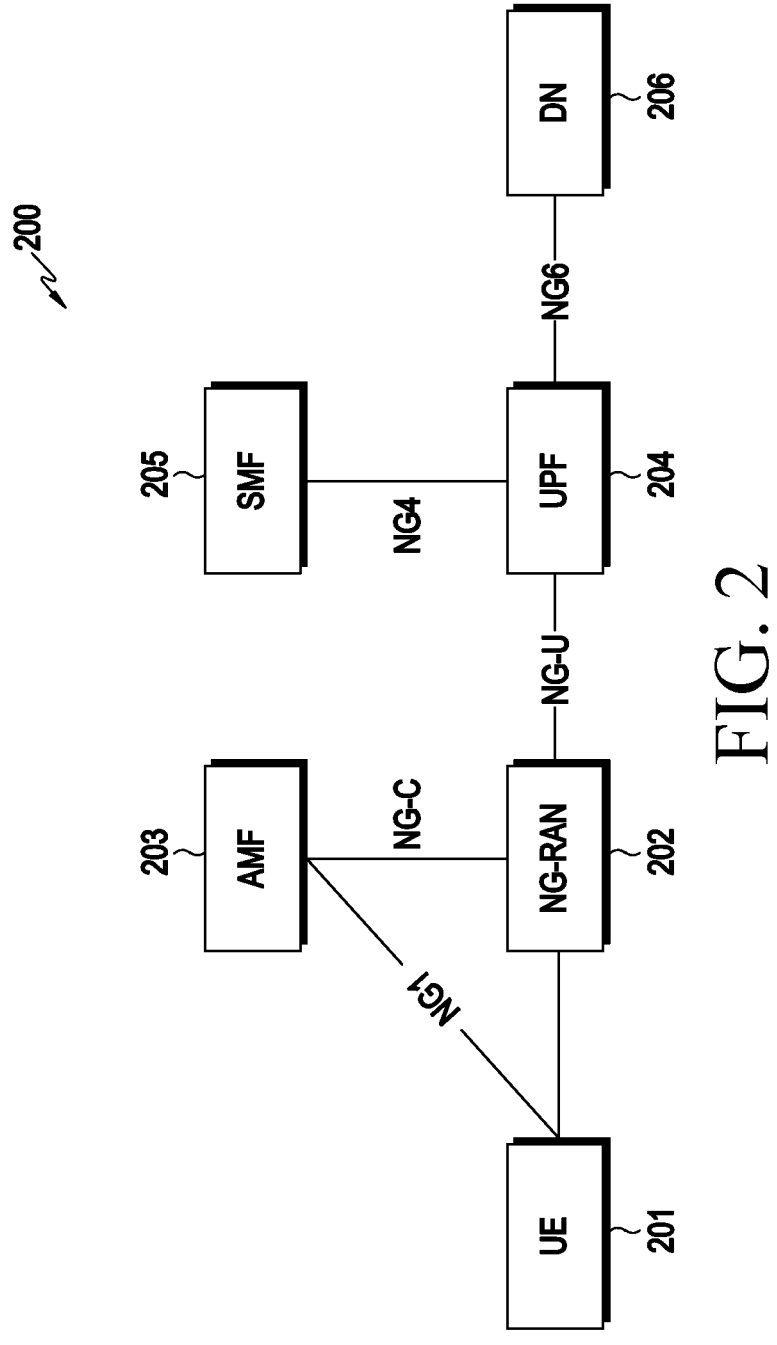
FIG. 2 illustrates a system architecture according to an embodiment of the disclosure.

FIG. 2 is a system architecture 200 according to an embodiment of the disclosure. Other embodiments of the system architecture 200 can be used without departing from the scope of the disclosure.

Referring to FIG. 2, a user equipment (UE) 201 is a terminal device for receiving data. A next generation radio access network (NG-RAN) 202 is a radio access network, which includes a base station (a gNB or an eNB connected to 5G core network 5GC, and the eNB connected to the 5GC is also called ng-gNB) that provides UE with interfaces to access the radio network. An access control and mobility management function entity (AMF) 203 is responsible for managing mobility context and security information of the UE. A user plane function entity (UPF) 204 mainly provides functions of user plane. A session management function entity SMF 205 is responsible for session management. A data network (DN) 206 includes, for example, services of operators, access of Internet and service of third parties.

The entities described in the disclosure may include gNB, gNB Central Unit (gNB-CU), gNB Distributed Unit (gNB-DU), gNB Central Unit Control Plane (gNB-CU-Control Plane, gNB CU-CP), gNB Central Unit user plane (gNB-CU-User Plane, gNB CU-UP), en-gNB, eNB, ng-eNB, UE, Access and Mobility Management Function, AMF), Session Management Function (SMF), Mobility Management Entity (MME) and other network entities or network logic units.

According to an aspect of the embodiment of the disclosure, a method of supporting wireless communication network data collection is proposed, the method includes: a first entity sends a first message including a UE model information request to a second entity, to inform the second entity of the UE model information feedback requirement. After receiving the first message, the second entity needs to report UE model information to the first entity according to the request, so that the first entity can acquire the UE model information, and provide information for the first entity to make a UE model management decision on the UE model, so as to ensure the effectiveness of UE model distribution and/or training and/or inference, and reduce unnecessary model distribution and/or training and/or inference.

The first message may be a HANDOVER REQUEST ACKNOWLEDGE message or a RETRIEVE UE CONTEXT REQUEST message or a UE CONTEXT RELEASE message or a HANDOVER SUCCESS message of X2 or Xn; it can also be a secondary eNB modification request (SENB MODIFICATION REQUEST) message, a secondary eNB modification request acknowledge (SENB MODIFICATION REQUEST ACKNOWLEDGE) message, a secondary eNB modification request reject (SENB MODIFICATION REQUEST REJECT) message or a secondary gNB modification request (SGNB MODIFICATION REQUEST) message or a secondary gNB modification request acknowledge (SGNB MODIFICATION REQUEST ACKNOWLEDGE) message or a secondary gNB modification request reject (SGNB MODIFICATION REQUEST REJECT) message or a secondary eNB modification required (SENB MODIFICATION REQUIRED) message or a secondary eNB modification confirm (SENB MODIFICATION CONFIRM) message or a secondary eNB modification refuse (SENB MODIFICATION REFUSE) message or a secondary gNB modification required (SGNB MODIFICATION REQUIRED) message or a secondary gNB modification confirm (SGNB MODIFICATION CONFIRM) message or a secondary gNB modification refuse (SGNB MODIFICATION REFUSE) message of X2; it can also be an S-NODE MODIFICATION REQUEST message, an S-NODE MODIFICATION REQUEST ACKNOWLEDGE message, an S-NODE MODIFICATION REQUEST REJECT message, or an S-NODE MODIFICATION REQUIRED message or an S-NODE MODIFICATION CONFIRM message or an S-NODE MODIFICATION REFUSE message of Xn; or it can also be a secondary gNB change confirm (SGNB CHANGE CONFIRM) message of X2; it can also be an S-NODE CHANGE CONFIRM message of Xn; it can also be a secondary eNB release request (SENB RELEASE REQUEST) message or a secondary eNB release confirm (SENB RELEASE CONFIRM) message or a secondary gNB release request (SGNB RELEASE REQUEST) message or a secondary gNB release confirm (SGNB RELEASE CONFIRM) message of X2; it can also be an S-NODE RELEASE REQUEST message or an S-NODE RELEASE CONFIRM message of Xn; it can also be a secondary eNB reconfiguration complete (SENB RECONFIGURATION COMPLETE) message or a secondary gNB reconfiguration complete (SGNB RECONFIGURATION COMPLETE) message of X2; it can also be an S-NODE RECONFIGURATION COMPLETE message of Xn; it can also be an X2 SETUP REQUEST message or an EN-DC X2 SETUP REQUEST message of X2; it can also be an XN SETUP REQUEST message of Xn; it can also be an ENB CONFIGURATION UPDATE message or an ENB CONFIGURATION UPDATE ACKNOWLEDGE message or an EN-DC CONFIGURATION UPDATE message or an EN-DC CONFIGURATION UPDATE ACKNOWLEDGE message of X2; it can also be an NG-RAN NODE CONFIGURATION UPDATE message or an NG-RAN NODE CONFIGURATION UPDATE ACKNOWLEDGE message of Xn; it can also be a RESET REQUEST message of X2 or Xn; it can also be a MOBILITY CHANGE REQUEST message of X2; it can also be a HANDOVER COMMAND message, HANDOVER PREPARATION FAILURE message, HANDOVER REQUEST ACKNOWLEDGE message, HANDOVER NOTIFY message or HANDOVER SUCCESS message or a PATH SWITCH REQUEST message or a UE CONTEXT RELEASE COMMAND message of NG: it can also be a Radio Resource Control (RRC) setup ((RRCSetup) message or a RRCConnectionSetup message or a RRCReconfiguration message, a RRCConnectionReconfiguration message or a RRCReestablishment message or a RRCConnectionReestablishment message or a RRCResume message or a RRCConnectionResume message or a RRCRelease with suspend configuration message or a MobilityFromNRCommand message; it can also be a system message, such as a System Information Block, a Master Information Block, a positioning system information block (posSIB, Positioning SIB), etc.: it can also be a newly defined X2 message or Xn message or NG message or RRC message or RRC container.

The first message includes one or more of the followings:

UE identification: used to identify the UE where the model information to be reported is located. The identification may be one or more of the followings: NG-RAN node UE XnAP ID, Source NG-RAN node UE XnAP ID, M-NG-RAN node UE XnAP ID, S-NG-RAN node UE XnAP ID, MeNB UE X2AP ID, SeNB UE X2AP ID, MeNB UE X2AP ID, SgNB UE X2AP ID, AMF UE NGAP ID, RAN UE NGAP ID, Source AMF UE NGAP ID, ue-Identity, and new UE-Identity.

first entity identification: used to identify the entity sending the request. The identification can be one or more of the followings: Cell Global ID, Target Cell Global ID, and Requested Target Cell ID, second entity identification: used to identify the entity receiving the request. The identification may be one or more of the followings: Cell Global ID, Target Cell Global ID, Requested Target Cell ID, and UE identification.

interaction identification: used to identify the present interaction. The identification may be rrc-Transaction-Identifier.

a validity range: the validity range identification and/or identification list of the message content, including one or more of the followings: UE, QoS flow, QoS level, Data Radio Bearer, slice, cell, node, service, region, operator, etc. The identifier of the slice may be Single Network Slice Selection Assistance Information (S-NSSAI). The identifier of the cell may be a Physical-layer Cell identity. The identifier of the operator may be a Public Land Mobile Network ID (PLMN ID). The identifier of the QoS level may be a mapped 5G QoS Identifier (5QI) or a QoS Class Identifier (QCI).

a handover time: used to indicate the time point when the UE performs handover. This time can be either relative time or absolute time.

UE model information reporting request identification: used to indicate the UE model information reporting request is included. This field can be represented by a single bit, for example, 1 indicates that the request includes the UE model information reporting request, and 0 indicates that the request does not include the UE model information reporting request; or 1 indicates that the request does not include the UE model information reporting request, and 0 indicates that the request includes the UE model information reporting request.

a reporting registration request; used to indicate the starting, ending and addition of UE model information reporting.

a reporting time interval: used to indicate the reporting time interval. It can be represented by 2*n bits. For example, the first n bits indicate the reporting starting time, and the last n bits indicate the reporting ending time, which can be either relative time or absolute time. It can also be represented by Separate fields, including one or more of the followings:

a reporting starting time: used to indicate the starting time of reporting. The starting time can be relative time or absolute time.

a reporting ending time: used to indicate the ending time of reporting. The ending time can be relative time or absolute time.

reporting time: used to indicates the time point for reporting. This time can be relative time or absolute time.

an information reporting type: used to indicate whether the model information is one-time reported or periodically reported or event-triggered reported. The reporting types include, but are not limited to, on-demand type, periodic type, event-triggered reporting, etc.

an information reporting period: used to indicate the time interval of periodic reporting of model information. If there is no content in this field, it means a one-time reporting.

triggering event configuration for reporting: used to indicate the triggering event for reporting. Reporting is needed only when the actual situation satisfies the triggering event, such as the number of models in active and/or inactive state is greater than and/or less than the threshold value, measurement report related value (Reference Signal Received Power (RSRP), reference signal receiving quality, RSRQ), signal to interference plus noise ratio (SINR), etc.) is greater than and/or less than a threshold value, accessing a certain slice (for example, entering a certain slice identified by single network slice selection assistance information (S-NS-SAI)), accessing a private network, accessing a certain operator (for example, entering a certain operator identified by a Public Land Mobile Network, PLMN, etc.) network, the user changes from an Inactive state and/or an Idle state to an Active state, the user changes from an Active state to an Inactive state and/or an Idle state, the model accuracy is higher and/or lower than a threshold value, and there are models that are not completely downloaded.

content to be reported; used to indicate the content to be reported. The reported content includes one or more of the followings:

an index and/or a list of indexes of model(s)

a name of a model a function of a model a state of a model: used to indicate the current state of a model, including one or more of the followings: active state, inactive state, etc. The model may be a model that is completely and/or incompletely downloaded.

a model integrity state: used to indicate whether the model has been downloaded completely, including one or more of the followings: completely downloaded, incompletely downloaded, etc.

a state of an incompletely downloaded model: indicates the state of an incompletely downloaded model, including one or more of the followings: active state, inactive state, etc. When it's in the active state, it means that the current download of the model is in progress; when it is in inactive state, it means that the download is suspended.

a model download address: used to indicate the download address of a model, including but not limited to at least one of the following information; the address and/or port and/or protocol of the download server, URL address.

a model download proportion: used to indicate the download progress of a model, including one or more of the followings: a proportion of downloaded parts to all content to be downloaded, a proportion of parts that have not been downloaded to all content to be downloaded, etc.

a suggested action: indicated the suggested action for the model, including one or more of the followings: keep, deletion, deactivation, activation, etc. The model can be the completely and/or incompletely downloaded model, etc. For a completely down-loaded model, deactivation means to keep the model, but not train and/or infer; activation means to keep the model and continue to train and/or infer. For the incompletely downloaded model, deactivation means to keep the downloaded part, but not to continue downloading; activation means to continue downloading the parts that has not been downloaded.

a suggested action for incompletely downloaded model: indicates a suggested action for an incompletely downloaded model, including one or more of the followings: keep, deletion, deactivation, activation, etc. Deactivation means to keep the downloaded part, but not to continue downloading; activation means to continue downloading the parts that have not been downloaded.

model accuracy: used to identify the performance evaluation result of a model, including one or more of the followings: accuracy, confidence, etc.

a model activation condition: indicates the activation condition for activating a certain model, that is, when the activation condition is satisfied, the model is activated. The activation condition may be entering a certain cell (such as accessing to a certain cell identifier identified cell), accessing to a certain operator (such as entering a certain operator identified by PLMN, etc.), accessing to a certain slice (for example, entering a slice identified by S-NSSAI, etc.), signal strength and/or signal quality (which can be RSRP/RSRQ/SINR/RSSI, etc.) being in a certain interval and/or larger than and/or smaller than and/or larger than or equal to and/or less than or equal to a certain threshold, entering a certain geographical area, and the moving speed of the entity being larger than and/or smaller than and/or larger than or equal to and/or less than or equal to a certain threshold. The model can be either a completely download model or an incompletely download model.

a model deactivation condition: indicates the deactivation condition for deactivating a certain model, that is, when the deactivation condition is satisfied, the model is deactivated. The activation condition may be entering a certain cell (such as accessing to a certain cell identifier identified cell), accessing to a certain operator (such as entering a certain operator identified by PLMN, etc.), accessing to a certain slice (for example, entering a slice identified by S-NSSAI, etc.), signal strength and/or signal quality (which can be RSRP/RSRQ/SINR/RSSI, etc.) being in a certain interval and/or larger than and/or smaller than and/or larger than or equal to and/or less than or equal to a certain threshold, entering a certain geographical area, and the moving speed of the entity being larger than and/or smaller than and/or larger than or equal to and/or less than or equal to a certain threshold. The model can be either a completely download model or an incompletely download model.

model activation time: indicates the time point and/or time period for activating the model.

model deactivation time: indicates the time point and/or time period for deactivating the model.

an inference content reporting situation: indicates the situation that the UE reports the model inference content, including one or more of the followings:

an inference content reporting type: used to indicate whether inference content is one-time reported or periodically reported or event-triggered reported. Reporting type includes, but is not limited to, on-demand type, periodic type, event-triggered reporting, etc.

an inference content reporting period: used to indicate the time interval of periodic reporting of inference content. If there is no content in this field, it means a one-time reporting.

a triggering event for inference content reporting: used to indicate the triggering event for inference content reporting. Reporting is needed only when the actual situation satisfies the triggering event, such as accessing a certain slice (for example, entering a certain slice identified by S-NSSAI, etc.), accessing a private network, accessing a certain operator (for example, entering a certain operator identified by PLMN, etc.) network, the user changes from Inactive state and/or Idle state to Active state, the user changes from Active state to Inactive state and/or Idle state, the model accuracy is higher than and/or lower than a threshold value, etc.

reported inference content: used to indicate the inference content reported by the UE. It can include one or more of the followings: predicted data volume, predicted position information, predicted trajectory information, predicted computing power information (such as a hash value, the unit can be TOPS, TFLOPS, FLOP, GOPS, etc.), predicted energy efficacy (or efficiency), predicted energy, predicted quality of service information, predicted user experience information, predicted service type, predicted traffic information, predicted load information, predicted resource status information, predicted measurement report information, predicted operating (or execution) condition information, predicted handover target node information, etc.

validity time of inference content: used to indicate the validity time and/or time point of inference content. The inference content can be either the reported inference content or the inference content requested to be reported. This time can be either relative time or absolute time. If it is a time interval, it can be represented by 2*n bits. For example, the first n bits represent the starting time and the last n bits represent the ending time. It can also be represented by Separate fields, including one or more of the followings:

starting Time: used to indicate the starting time of the validity time interval. The starting time can be relative time or absolute time.

ending time: used to indicate the ending time of the validity time interval. The ending time can be relative time or absolute time.

accuracy: used to identify evaluation result of the model and/or inference content, including one or more of the followings: accuracy, confidence, etc.

The second entity sends a second message including UE model information to the first entity according to its own situation and/or according to the UE model information request sent by the first entity, so that the first entity can acquire the UE model information of the UE. After receiving the second message, the first entity needs to make a decision on the model of the UE, such as activation, deactivation, deletion, keep, decision for inference content reporting, etc., and then it can directly or indirectly inform the UE of the decision to manage the model, so as to ensure the effectiveness of model distribution and/or training and/or inference and/or inference content reporting of the UE and reduce unnecessary model distribution and/or training and/or inference and/or inference content reporting.

The second message may be a HANDOVER REQUEST message, a RETRIEVE UE CONTEXT RESPONSE message or a RETRIEVE UE CONTEXT FAILURE message of X2 or Xn. It can also be a secondary eNB modification request (SENB MODIFICATION REQUEST) message, a secondary eNB modification request acknowledge (SENB MODIFICATION REQUEST ACKNOWLEDGE) message, a secondary eNB modification request reject (SENB MODIFICATION REQUEST REJECT) message or a secondary gNB modification request (SGNB MODIFICATION REQUEST) message or a secondary gNB modification request acknowledge (SGNB MODIFICATION REQUEST ACKNOWLEDGE) message or a secondary gNB modification request reject (SGNB MODIFICATION REQUEST REJECT) message or a secondary eNB modification required (SENB MODIFICATION REQUIRED) message or a secondary eNB modification confirm (SENB MODIFICATION CONFIRM) message or a secondary eNB modification refuse (SENB MODIFICATION REFUSE) message or a secondary gNB modification required (SGNB MODIFICATION REQUIRED) message or a secondary gNB modification confirm (SGNB MODIFICATION CONFIRM) message or a secondary gNB modification refuse (SGNB MODIFICATION REFUSE) message of X2. It can also be an S-NODE MODIFICATION REQUEST message, an S-NODE MODIFICATION REQUEST ACKNOWLEDGE message, an S-NODE MODIFICATION REQUEST REJECT message, or an S-NODE MODIFICATION REQUIRED message, an S-NODE MODIFICATION CONFIRM message or an S-NODE MODIFICATION REFUSE message of Xn. It can also be a secondary gNB change required (SGNB CHANGE REQUIRED) message of X2. It can also be an S-NODE CHANGE REQUIRED message of Xn. It can also be a secondary gNB release request acknowledge (SGNB RELEASE REQUEST ACKNOWLEDGE) message, a secondary eNB release required (SENB RELEASE REQUIRED) message or a secondary gNB release required (SGNB RELEASE REQUIRED) message of X2. It can also be an S-NODE RELEASE REQUEST ACKNOWLEDGE message or an S-NODE RELEASE REQUIRED message of Xn. It can also be a secondary eNB reconfiguration complete (SENB RECONFIGURATION COMPLETE) message or a secondary gNB reconfiguration complete (SGNB RECONFIGURATION COMPLETE) message of X2. It can also be an S-NODE RECONFIGURATION COMPLETE message of Xn. It can also be a HANDOVER REQUIRED message or a HANDOVER REQUEST message, a PATH SWITCH REQUEST ACKNOWLEDGE message or a PATH SWITCH REQUEST FAILURE message or a UE CONTEXT RELEASE REQUEST message or a UE CONTEXT RELEASE COMPLETE message or a UE INFORMATION TRANSFER message or an INITIAL CONTEXT SETUP REQUEST message of NG. It can also be an RRCSetupRequest message or an RRCConnectionRequest message or an RRCSetupComplete message or an RRCConnectionSetupComplete message or an RRCReconfigurationComplete message or an RRCConnectionReconfigurationComplete message or an RRCReestablishmentRequest message or an RRCConnectionReestablishmentRequest message, an RRCReestablishmentComplete message or an RRCConnectionReestablishmentComplete message or an RRC resume request (RRCResumeRequest or RRCResumeRequest1) message or an RRCConnectionResumeRequest message or an RRCResumeComplete message or RRCConnectionResumeComplete message. It can also be a newly defined X2 or Xn or NG message or RRC message or RRC container.

The second message includes one or more of the followings:

UE identification: used to identify the UE where the reported model information is located. The identification may be one or more of the followings: NG-RAN node UE XnAP ID, Source NG-RAN node UE XnAP ID, M-NG-RAN node UE XnAP ID, S-NG-RAN node UE XnAP ID, MeNB UE X2AP ID, SeNB UE X2AP ID, MeNB UE X2AP ID, SgNB UE X2AP ID, AMF UE NGAP ID, RAN UE NGAP ID, Source AMF UE NGAP ID, ue-Identity, and new UE-Identity.

first entity identification: used to identify the first entity. The identification can be one or more of the followings: Cell Global ID, Target Cell Global ID, and Requested Target Cell ID.

second entity identification: used to identify the second entity. The identification may be one or more of the followings: Cell Global ID, Target Cell Global ID, Requested Target Cell ID, and UE identification.

interaction identification: used to identify the current interaction. The identification may be an rrc-TransactionIdentification.

a validity range: the validity range identification and/or identification list of the message content, including one or more of the followings: UE, QoS flow, QoS level, Data Radio Bearer, slice, cell, node, service, region, operator, etc. The identifier of the slice may be Single Network Slice Selection Assistance Information (S-NSSAI). The identifier of the cell may be a Physical-layer Cell identity. The identifier of the operator may be a Public Land Mobile Network ID (PLMN ID). The identifier of the QoS level may be a mapped 5G QoS Identifier (5QI) or a QoS Class Identifier (QCI).

confirmation on the requested content can be reported; a single bit can be used to indicate whether it can be reported. If the bit is 1, it means that all the requested content can be reported; if the bit is 0, it means that the requested content cannot be reported; it is also possible to confirm for each requested content, such as in the form of bitmap, where each bit corresponds to one request content. For example, when the bit is 1, it means that the information of the corresponding requested reporting content can be sent, while 0 means that the information of the corresponding requested reporting content cannot be sent. Separate fields can also be used to indicate the confirmation for different requested reporting contents.

model information content: used to indicate the reported model information content. The model information content includes one or more of the followings:

an index and/or a list of indexes of model(s)

a name of a model a function of a model a state of a model: used to indicate the current state of a model, including one or more of the followings: active state, inactive state, etc. The model may be a completely downloaded model and/or an incompletely downloaded model.

a model integrity state: used to indicate whether the model has been downloaded completely, including one or more of the followings: completely downloaded, incompletely download, etc.

a state of an incompletely downloaded model: indicates the state of an incompletely downloaded model, including one or more of the followings: active state, inactive state, etc. When it is in the active state, it means that the current download of the model is in progress; when it is in the inactive state, it means that the download is suspended.

a suggested action: indicates the suggested action for the model, including one or more of the followings: keep, deletion, deactivation, activation, etc. The model can be the completely downloaded model and/or the incompletely downloaded model, etc. For a completely downloaded model, deactivation means to keep the model, but not train and/or infer; activation means to keep the model and continue to train and/or infer. For the incompletely downloaded model, deactivation means to keep the downloaded part, but not to continue downloading; activation means to continue downloading the parts that have not been downloaded.

a suggested action for the incompletely downloaded model: indicates a suggested action for an incompletely downloaded model, including one or more of the followings: keep, deletion, deactivation, activation, etc. Deactivation means to keep the downloaded part, but not to continue downloading; activation means to continue downloading the parts that have not been downloaded.

model accuracy: used to identify the performance evaluation result of a model, including one or more of the followings: accuracy, confidence, etc.

a model download address: used to indicate the model download address, including but not limited to at least one of the following information; the address and/or port and/or protocol of the download server, URL address.

a model download proportion: used to indicate the download progress, including one or more of the followings: a proportion of downloaded parts to all contents to be downloaded, a proportion of parts that have not been downloaded to all contents to be downloaded, etc.

a model activation condition: indicates the configured activation condition for activating a certain model, that is, when the activation condition is satisfied, the model is activated. The activation condition may be entering a certain cell (such as accessing to a certain cell identifier identified cell), accessing to a certain operator (such as entering a certain operator identified by PLMN, etc.), accessing to a certain slice (for example, entering a slice identified by S-NSSAI, etc.), signal strength and/or signal quality (which can be RSRP/RSRQ/SINR/RSSI, etc.) being in a certain interval and/or larger than and/or smaller than and/or larger than or equal to and/or less than or equal to a certain threshold, entering a certain geographical area, and the moving speed of the entity being larger than and/or smaller than and/or larger than or equal to and/or less than or equal to a certain threshold. The model can be either a completely download model or an incompletely download model.

a model deactivation condition: indicates the configured deactivation condition for deactivating a certain model, that is, when the deactivation condition is satisfied, the model is deactivated. The activation condition may be entering a certain cell (such as accessing to a certain cell identifier identified cell), accessing to a certain operator (such as entering a certain operator identified by PLMN, etc.), accessing to a certain slice (for example, entering a slice identified by S-NSSAI, etc.), signal strength and/or signal quality (which can be RSRP/RSRQ/SINR/RSSI, etc.) being in a certain interval and/or larger than and/or smaller than and/or larger than or equal to and/or less than or equal to a certain threshold, entering a certain geographical area, and the moving speed of the entity being larger than and/or smaller than and/or larger than or equal to and/or less than or equal to a certain threshold. The model can be either a completely download model or an incompletely download model.

model activation time: indicates the time point and/or time period for activating the model.

model deactivation time: indicates the time point and/or time period for deactivating the model.

an inference content reporting situation: indicates the situation that the UE reports the model inference content, including one or more of the followings:

an inference content reporting type: used to indicate whether inference content is one-time reported or periodically reported or event-triggered reported. Reporting types include, but are not limited to, on-demand type, periodic type, event-triggered reporting, etc.

an inference content reporting period: used to indicate the time interval of periodic reporting of inference content. If there is no content in this field, it means one-time reporting.

a triggering event for inference content reporting: used to indicate the triggering event for which the inference content needs to be reported. Reporting is needed only when the actual situation satisfies the triggering event, such as accessing a certain slice (for example, entering a certain slice identified by S-NSSAI, etc.), accessing a private network, accessing a certain operator (for example, entering a certain operator identified by PLMN, etc.) network, the user changes from Inactive state and/or Idle state to Active state, the user changes from Active state to Inactive state and/or Idle state, the model accuracy is higher than and/or lower than a threshold value, etc.

reported inference content: used to indicate the inference content reported by the UE. It can include one or more of the followings: predicted data volume, predicted position information, predicted trajectory information, predicted computing power information (such as a hash value, the unit can be TOPS, TFLOPS, FLOP, GOPS, etc.), predicted energy efficacy (or efficiency), predicted energy, predicted quality of service information, predicted user experience information, predicted service type, predicted traffic information, predicted load information, predicted resource status information, predicted measurement report information, predicted operating (or execution) condition information, predicted handover target node information, etc.

validity time of reported inference content: used to indicate the validity time and/or time point of reported inference content. This time can be either relative time or absolute time. If it is a time interval, it can be represented by 2*n bits. For example, the first n bits represent the starting time and the last n bits represent the ending time. It can also be represented by Separate fields, including one or more of the followings:

starting Time: used to indicate the starting time of the validity time interval. The starting time can be relative time or absolute time.

ending time: used to indicate the ending time of the validity time interval. The ending time can be relative time or absolute time.

accuracy: used to identify evaluation result of the model and/or inference content, including one or more of the followings: accuracy, confidence, etc.

a triggering event: used to indicate the triggering event of the current report. for example, the number of models in Active and/or Inactive state is greater than and/or less than the threshold value, the measurement report related value (RSRP. RSRQ. SINR, etc.) is greater than and/or less than the threshold value, accessing a certain slice (for example, entering a certain slice identified by S-NSSAI, etc.), accessing a private network, accessing a certain operator (for example, entering a certain operator identified by PLMN, etc.) network, the user changes from the Inactive state and/or the Idle state to the Active state, the user changes from the Active state to the Inactive state and/or the Idle state, the model accuracy is higher and/or lower than the threshold value, and there are incompletely downloaded models.

If the second entity cannot feedback the UE model information result to the first entity according to the UE model information request sent by the first entity, the second entity sends a third message including the inability or failure of reporting to the first entity, so that the first entity knows that the second entity cannot report according to the request.

The third message may be a HANDOVER REQUEST message, a RETRIEVE UE CONTEXT RESPONSE message or a RETRIEVE UE CONTEXT FAILURE message of X2 or Xn. It can also be a secondary eNB modification request (SENB MODIFICATION REQUEST) message, a secondary eNB modification request acknowledge (SENB MODIFICATION REQUEST ACKNOWLEDGE) message, a secondary eNB modification request reject (SENB MODIFICATION REQUEST REJECT) message or a secondary gNB modification request (SGNB MODIFICATION REQUEST) message or a secondary gNB modification request acknowledge (SGNB MODIFICATION REQUEST ACKNOWLEDGE) message or a secondary gNB modification request reject (SGNB MODIFICATION REQUEST REJECT) message or a secondary eNB modification required (SENB MODIFICATION REQUIRED) message or a secondary eNB modification confirm (SENB MODIFICATION CONFIRM) message or a secondary eNB modification refuse (SENB MODIFICATION REFUSE) message or a secondary gNB modification required (SGNB MODIFICATION REQUIRED) message or a secondary gNB modification confirm (SGNB MODIFICATION CONFIRM) message or a secondary gNB modification refuse (SGNB MODIFICATION REFUSE) message of X2. It can also be an S-NODE MODIFICATION REQUEST message, an S-NODE MODIFICATION REQUEST ACKNOWLEDGE message, an S-NODE MODIFICATION REQUEST REJECT message, or an S-NODE MODIFICATION REQUIRED message, an S-NODE MODIFICATION CONFIRM message or an S-NODE MODIFICATION REFUSE message of Xn. It can also be a secondary gNB change required (SGNB CHANGE REQUIRED) message of X2. It can also be an S-NODE CHANGE REQUIRED message of Xn. It can also be a secondary gNB release request acknowledge (SGNB RELEASE REQUEST ACKNOWLEDGE) message, a secondary eNB release required (SENB RELEASE REQUIRED) message or a secondary gNB release required (SGNB RELEASE REQUIRED) message of X2. It can also be an S-NODE RELEASE REQUEST ACKNOWLEDGE message or an S-NODE RELEASE REQUIRED message of Xn. It can also be a secondary eNB reconfiguration complete (SENB RECONFIGURATION COMPLETE) message or a secondary gNB reconfiguration complete (SGNB RECONFIGURATION COMPLETE) message of X2. It can also be an S-NODE RECONFIGURATION COMPLETE message of Xn. It can also be a HANDOVER REQUIRED message or a HANDOVER REQUEST message, a PATH SWITCH REQUEST ACKNOWLEDGE message or a PATH SWITCH REQUEST FAILURE message or a UE CONTEXT RELEASE REQUEST message or a UE CONTEXT RELEASE COMPLETE message or a UE INFORMATION TRANSFER message or an INITIAL CONTEXT SETUP REQUEST message of NG. It can also be an RRCSetupRequest message or an RRCConnectionRequest message or an RRCSetupComplete message or an RRCConnectionSetupComplete message or an RRCReconfigurationComplete message or an RRCConnectionReconfigurationComplete message or an RRCReestablishmentRequest message or an RRCConnectionReestablishmentRequest message, an RRCReestablishmentComplete message or an RRCConnectionReestablishmentComplete message or an RRC resume request (RRCResumeRequest or RRCResumeRequest1) message or an RRCConnectionResumeRequest message or an RRCResumeComplete message or RRCConnectionResumeComplete message. It can also be a newly defined X2 or Xn or NG message or RRC message or RRC container.

The third message includes one or more of the followings:

UE identification: used to identify the UE where the model information to be reported is located. The identification may be one or more of the followings: NG-RAN node UE XnAP ID, Source NG-RAN node UE XnAP ID, M-NG-RAN node UE XnAP ID, S-NG-RAN node UE XnAP ID, MeNB UE X2AP ID, SeNB UE X2AP ID, MeNB UE X2AP ID, SgNB UE X2AP ID, AMF UE NGAP ID, RAN UE NGAP ID, Source AMF UE NGAP ID, ue-Identity, and new UE-Identity.

first entity identification: used to identify the first entity. The identification can be one or more of the followings: Cell Global ID, Target Cell Global ID, and Requested Target Cell ID.

second entity identification: used to identify the second entity. The identification may be one or more of the followings: Cell Global ID, Target Cell Global ID, Requested Target Cell ID, and UE identification.

interaction identification: used to identify the current interaction. The identification may be an rrc-TransactionIdentification.

a validity range: the validity range identification and/or identification list of the message content, including one or more of the followings: UE, QoS flow, QoS level, Data Radio Bearer, slice, cell, node, service, region, operator, etc. The identifier of the slice may be Single Network Slice Selection Assistance Information (S-NSSAI). The identifier of the cell may be a Physical-layer Cell identity. The identifier of the operator may be a Public Land Mobile Network ID (PLMN ID). The identifier of the QoS level may be a mapped 5G QoS Identifier (5QI) or a QoS Class Identifier (QCI).

confirmation on the requested content can be reported; a single bit can be used to indicate whether it can be reported. If the bit is 1, it means that all the requested content can be reported; if the bit is 0, it means that the requested content cannot be reported; it is also possible to confirm for each requested content, such as in the form of bitmap, where each bit corresponds to a request content. For example, when the bit is 1, it means that the information of the corresponding requested reporting content can be sent, while 0 means that the information of the corresponding requested reporting content cannot be sent. Separate fields can also be used to indicate the confirmation for different requested reporting contents.

a cause: used to indicate the reason for the failure of the request, for example, there is no requested reporting content, no model, etc.

According to another aspect of the embodiment of the disclosure, a method for supporting wireless communication network data collection is proposed, the method includes: the second entity sends a fourth message including the UE model management decision to the first entity, to directly or indirectly notify the UE of the UE model management decision of the second entity, so as to ensure the effectiveness of model distribution and/or training and/or inference and/or inference content reporting of the UE and reduce unnecessary model training and/or inference. Herein. UE model management decision includes the management decision of the model and/or the decision of inference content reporting etc.

The fourth message may be a HANDOVER REQUEST ACKNOWLEDGE message or a RETRIEVE UE CONTEXT REQUEST message or a UE CONTEXT RELEASE message or a HANDOVER SUCCESS message of X2 or Xn; it can also be a secondary eNB modification request (SENB MODIFICATION REQUEST) message, a secondary gNB modification request (SGNB MODIFICATION REQUEST) message, a secondary eNB modification required (SENB MODIFICATION REQUIRED) message, a secondary gNB modification required (SGNB MODIFICATION REQUIRED) message of X2; it can also be an S-NODE MODIFICATION REQUEST message, an S-NODE MODIFICATION REQUIRED message of Xn; or it can also be a secondary gNB change confirm (SGNB CHANGE CONFIRM) message of X2; it can also be an S-NODE CHANGE CONFIRM message of Xn; it can also be a secondary eNB release request (SENB RELEASE REQUEST) message or a secondary eNB release confirm (SENB RELEASE CONFIRM) message or a secondary gNB release request (SGNB RELEASE REQUEST) message or a secondary gNB release confirm (SGNB RELEASE CONFIRM) message of X2; it can also be an S-NODE RELEASE REQUEST message or an S-NODE RELEASE CONFIRM message of Xn; it can also be a secondary eNB reconfiguration complete (SENB RECONFIGURATION COMPLETE)) message or a secondary gNB reconfiguration complete (SGNB RECONFIGURATION COMPLETE) message of X2; it can also be an S-NODE RECONFIGURATION COMPLETE message of Xn; it can also be an X2 SETUP REQUEST message or an EN-DC X2 SETUP REQUEST message of X2; it can also be an XN SETUP REQUEST message of Xn; it can also be an ENB CONFIGURATION UPDATE message or an eNB CONFIGURATION UPDATE ACKNOWLEDGE message or an EN-DC CONFIGURATION UPDATE message or an EN-DC CONFIGURATION UPDATE ACKNOWLEDGE message of X2; it can also be an NG-RAN NODE CONFIGURATION UPDATE message or an NG-RAN NODE CONFIGURATION UPDATE ACKNOWLEDGE message of Xn; it can also be a RESET REQUEST message of X2 or Xn; it can also be a MOBILITY CHANGE REQUEST message of X2; it can also be a HANDOVER COMMAND message. HANDOVER PREPARATION FAILURE message. HANDOVER REQUEST ACKNOWLEDGE message, HANDOVER NOTIFY message or HANDOVER SUCCESS message or a PATH SWITCH REQUEST message of NG: it can also be a RRCSetup message or a RRCConnectionSetup message or a RRCReconfiguration message, a RRCConnectionReconfiguration message or a RRCReestablishment message or a RRCConnectionReestablishment message or a RRCResume message or a RRCConnectionResume message or a RRCRelease with suspend configuration message or a Mobility FromNRCommand message; it can also be a system message, such as a System Information Block, a Master Information Block, a positioning system information block (posSIB, Positioning SIB), etc.: it can also be a newly defined X2 message or Xn message or NG message or RRC message or RRC container.

The fourth message includes one or more of the followings:

UE identification: used to identify the UE where the model information to be reported is located. The identification may be one or more of the followings: NG-RAN node UE XnAP ID, Source NG-RAN node UE XnAP ID, M-NG-RAN node UE XnAP ID, S-NG-RAN node UE XnAP ID, MeNB UE X2AP ID, SeNB UE X2AP ID, MeNB UE X2AP ID, SgNB UE X2AP ID, AMF UE NGAP ID, RAN UE NGAP ID, Source AMF UE NGAP ID, ue-Identity, and new UE-Identity.

first entity identification: used to identify the first entity. The identification may be one or more of the followings: Cell Global ID, Target Cell Global ID, Requested Target Cell ID, and UE identification.

second entity identification: used to identify the second entity. The identification can be one or more of the followings: Cell Global ID, Target Cell Global ID, and Requested Target Cell ID.

interaction identification: used to identify the current interaction. The identification may be an rrc-TransactionIdentification.

a validity range: the validity range identification and/or identification list of the message content, including one or more of the followings: UE, QoS flow, QoS level, Data Radio Bearer, slice, cell, node, service, region, operator, etc. The identifier of the slice may be Single Network Slice Selection Assistance Information (S-NSSAI). The identifier of the cell may be a Physical-layer Cell identity. The identifier of the operator may be a Public Land Mobile Network ID (PLMN ID). The identifier of the QoS level may be a mapped 5G QoS Identifier (5QI) or a QoS Class Identifier (QCI).

a model management decision: used to indicate the model management decision. The model management decision includes one or more of the followings:
an index and/or a list of indexes of model(s)
a name of a model
a function of a model
a state of a model: used to indicate the current state of a model, including one or more of the followings: active state, inactive state, etc. The model may be a completely downloaded model and/or an incompletely downloaded model.
a state of the incompletely downloaded model: indicates the state of the incompletely downloaded model, including one or more of the followings: active state, inactive state, etc. When it is in the active state, it means that the current download of the model is in progress; when it is in the inactive state, it means that the download is suspended.

a decision for the model: used to indicate the decision for this model, including one or more of the followings: keep, deletion, deactivation, activation, etc. The model may be a completely downloaded model and/or an incompletely downloaded model. For the completely downloaded model, deactivation means to keep the model, but not train and/or infer; activation means to keep the model and continue to train and/or infer. For the incompletely downloaded model, deactivation means to keep the downloaded part, but not to continue downloading; activation means to continue downloading the parts that have not been downloaded.

a decision for the incompletely downloaded model: used to indicate the decision for the models that is not downloaded completely, including one or more of the followings: keep, deletion, deactivation, activation, etc, deactivation means to keep the downloaded part, but not to continue downloading; activation means to continue downloading the parts that have not been downloaded.

an active model list: indicates a list of models that can be in the active state, which can be represented by the index of the model, the name of the model, the function of the model, etc.

indication of activating a model: indicates to activate the model, that is, the model can do the training or inference.

indication of deactivating a model: indicates to deactivate the model, that is, the model is kept without training and/or inferring, or it can also indicate to delete the model.

model activation time: indicates the time point and/or time period for activating the model.

model deactivation time: indicates the time point and/or time period for deactivating the mode.

a model activation condition: indicates when the activation condition is satisfied, the model is activated. The activation condition may be entering a certain cell (such as accessing to a certain cell identifier identified cell), accessing to a certain operator (such as entering a certain operator identified by PLMN, etc.), accessing to a certain slice (for example, entering a slice identified by S-NSSAI, etc.), signal strength and/or signal quality (which can be RSRP/RSRQ/SINR/RSSI, etc.) being in a certain interval and/or larger than and/or smaller than and/or larger than or equal to and/or less than or equal to a certain threshold, entering a certain geographical area, and the moving speed of the entity being larger than and/or smaller than and/or larger than or equal to and/or less than or equal to a certain threshold. The model can be either a completely download model or an incompletely download model.

a model deactivation condition: indicates when the deactivation condition is satisfied, the model is deactivated. The activation condition may be entering a certain cell (such as accessing to a certain cell identifier identified cell), accessing to a certain operator (such as entering a certain operator identified by PLMN, etc.), accessing to a certain slice (for example, entering a slice identified by S-NSSAI, etc.), signal strength and/or signal quality (which can be RSRP/RSRQ/SINR/RSSI, etc.) being in a certain interval and/or larger than and/or smaller than and/or larger than or equal to and/or less than or equal to a certain threshold, entering a certain geographical area, and the moving speed of the entity being larger than and/or smaller than and/or larger than or equal to and/or less than or equal to a certain threshold. The model can be either a completely download model or an incompletely download model.

a forwarding strategy applicable to the completely downloaded model: includes one or more of the followings: model forwarding is required, model forwarding is not required, etc. The model forwarding includes one or more of the followings: partial model forwarding, whole model forwarding, etc.

a model forwarding strategy applicable to the incompletely downloaded model: includes one or more of the followings: model forwarding is required, model forwarding is not required, etc. The model forwarding includes one or more of the followings: partial model forwarding, whole model forwarding, etc.

a model forwarding proportion: used to indicate a proportion of model forwarding, including one or more of the followings: partial model forwarding (<100%), all model forwarding (100%), remaining model forwarding, etc. Where the remaining model forwarding means forwarding the parts that have not been downloaded; among them, partial model forwarding can indicate the percentage counted from the starting part to the back, or the percentage counted from the ending part to the front. The model can include one or more of the followings: the completely downloaded model and/or the incompletely downloaded model, etc.

an inference content reporting decision: indicates the decision of the inference content reporting of the model of the UE, including one or more of the followings:

an inference content reporting type: used to indicate whether inference content is one-time reported or periodically reported or event-triggered reported. Reporting types include, but are not limited to, on-demand type, periodic type, event-triggered reporting, etc.

an inference content reporting period: used to indicate the time interval of periodic reporting of inference content. If there is no content in this field, it means a one-time reporting.

a triggering event for inference content reporting: used to indicate the triggering event for inference content reporting. Reporting is needed only when the actual situation satisfies the triggering event, such as accessing a certain slice (for example, entering a certain slice identified by S-NSSAI, etc.), accessing a private network, accessing a certain operator (for example, entering a certain operator identified by PLMN, etc.) network, the user changes from Inactive state and/or Idle state to Active state, the user changes from Active state to Inactive state and/or Idle state, the model accuracy is higher than and/or lower than the threshold value.

reported inference content: used to indicate the inference content reported by the UE. It can include one or more of the followings: predicted data volume, predicted position information, predicted trajectory information, predicted computing power information (such as a hash value, the unit can be TOPS, TFLOPS, FLOP, GOPS, etc.), predicted energy efficacy (or efficiency), predicted energy, predicted quality of service information, predicted user experience information, predicted service type, predicted traffic information, predicted load information, predicted resource status information, predicted measurement report information, predicted operating (or execution) condition information, predicted handover target node information, etc.

validity time of reported inference content: used to indicate the validity time and/or time point of reported inference content. The inference content can be either the reported inference content or the inference content requested to be reported. This time can be either a relative time or an absolute time. If it is a time interval, it can be represented by 2*n bits. For example, the first n bits represent the starting time and the last n bits represent the ending time. It can also be represented by a Separate field, including one or more of the followings:

starting Time: used to indicate the starting time of the validity time interval. The starting time can be relative time or absolute time.

ending time: used to indicate the ending time of the validity time interval. The ending time can be relative time or absolute time.

inference content requested to be reported; used to indicate the inference content requested to be reported. It can include one or more of the followings: predicted data volume, predicted location information, predicted trajectory information, predicted computing power information (such as hash value, its unit can be TOPS, TFLOPS, FLOP, GOPS, etc.), predicted energy efficiency, predicted energy, predicted quality of service information, predicted user experience information, predicted business type, predicted traffic information, predicted load information and predicted resource status information, predicted measurement report information, predicted operating (or execution) condition information, predicted handover target node information, etc.

validity time of inference content requested to be reported; used to indicate the validity time and/or time point of inference content requested to be reported. The inference content can be either the reported inference content or the inference content requested to be reported. This time can be either relative time or absolute time. If it is a time interval, it can be represented by 2*n bits. For example, the first n bits represent the starting time and the last n bits represent the ending time. It can also be represented by Separate fields, including one or more of the followings:

starting Time: used to indicate the starting time of the validity time interval. The starting time can be relative time or absolute time.

ending time: used to indicate the ending time of the validity time interval. The ending time can be relative time or absolute time.

accuracy: used to identify evaluation result of the model and/or inference content, including one or more of the followings: accuracy, confidence, etc.

After receiving the fourth message, the first entity will forward or apply the model management decision. If the first entity is the UE, the UE applies the UE model management decision: if the first entity is not the UE, the first entity forwards the UE model management decision to other entities, to indirectly notify the UE of the UE model management decision.

According to another aspect of the embodiment of the disclosure, a method for supporting wireless communication network data collection is proposed, the method includes: a first entity sends a fifth message including a model forwarding request to a second entity to inform the second entity of the model forwarding request. After receiving the fifth message, the second entity needs to report a model to the first entity according to the model forwarding request, so that the first entity can acquire the model to ensure the subsequent performance of the network and/or the UE.

The fifth message may be a HANDOVER REQUEST ACKNOWLEDGE message or a RETRIEVE UE CONTEXT REQUEST message or a UE CONTEXT RELEASE message or a HANDOVER SUCCESS message of X2 or Xn; it can also be a secondary eNB modification request (SENB MODIFICATION REQUEST) message or a secondary gNB modification request (SGNB MODIFICATION REQUEST) message or a secondary eNB modification required (SENB MODIFICATION REQUIRED) message or a secondary gNB modification required (SGNB MODIFICATION REQUIRED) message of X2; it can also be an S-NODE MODIFICATION REQUEST message or an S-NODE MODIFICATION REQUIRED message or an S-NODE MODIFICATION CONFIRM message of Xn; or it can also be a secondary gNB change confirm (SGNB CHANGE CONFIRM) message of X2; it can also be an S-NODE CHANGE CONFIRM message of Xn; it can also be a secondary eNB release request (SENB RELEASE REQUEST) message or a secondary eNB release confirm (SENB RELEASE CONFIRM) message or a secondary gNB release request (SGNB RELEASE REQUEST) message or a secondary gNB release confirm (SGNB RELEASE CONFIRM) message of X2; it can also be an S-NODE RELEASE REQUEST message or an S-NODE RELEASE CONFIRM message of Xn; it can also be a secondary eNB reconfiguration complete (SENB RECONFIGURATION COMPLETE) message or a secondary gNB reconfiguration complete (SGNB RECONFIGURATION COMPLETE) message of X2; it can also be an S-NODE RECONFIGURATION COMPLETE message of Xn; it can also be an X2 SETUP REQUEST message or an EN-DC X2 SETUP REQUEST message of X2; it can also be an XN SETUP REQUEST message of Xn; it can also be an ENB CONFIGURATION UPDATE message or an eNB CONFIGURATION UPDATE ACKNOWLEDGE message or an EN-DC CONFIGURATION UPDATE message or an EN-DC CONFIGURATION UPDATE ACKNOWLEDGE message of X2; it can also be an NG-RAN NODE CONFIGURATION UPDATE message or an NG-RAN NODE CONFIGURATION UPDATE ACKNOWLEDGE message of Xn; it can also be a RESET REQUEST message of X2 or Xn; it can also be a MOBILITY CHANGE REQUEST message of X2; it can also be a HANDOVER COMMAND message. HANDOVER PREPARATION FAILURE message. HANDOVER REQUEST ACKNOWLEDGE message. HANDOVER NOTIFY message or HANDOVER SUCCESS message or a PATH SWITCH REQUEST message or a UE CONTEXT RELEASE COMMAND message of NG: it can also be a RESET message or a F1 SETUP REQUEST message or a GNB-DU CONFIGURATION UPDATE message or a GNB-CU CONFIGURATION UPDATE message or a UE CONTEXT RELEASE COM- MAND message or a UE CONTEXT MODIFICATION REQUEST message or a UE CONTEXT MODIFICATION REQUIRED message of F1: it can also be a RESET message, a GNB-CU-UP E1 SETUP REQUEST message or a GNB-CU-CP E1 SETUP REQUEST message or a GNB-CU-UP CONFIGURATION UPDATE message or a GNB-CU-CP CONFIGURATION UPDATE message of E1; or an E1 RELEASE REQUEST message or a BEARER CONTEXT SETUP REQUEST message or a BEARER CONTEXT MODIFICATION REQUEST message or a BEARER CONTEXT MODIFICATION REQUIRED message or a BEARER CONTEXT RELEASE COMMAND message; it can also be a newly defined X2 message or Xn message or NG message or F1 message or E1 message.

The fifth message includes one or more of the followings:

UE identification: used to identify the UE where the model information to be reported is located. The identification may be one or more of the followings: NG-RAN node UE XnAP ID, Source NG-RAN node UE XnAP ID, M-NG-RAN node UE XnAP ID, S-NG-RAN node UE XnAP ID, MeNB UE X2AP ID, SeNB UE X2AP ID, MeNB UE X2AP ID, SgNB UE X2AP ID, AMF UE NGAP ID, RAN UE NGAP ID, Source AMF UE NGAP ID, ue-Identity, and new UE-Identity.

first entity identification: used to identify the entity that sent the request. The identification can be one or more of the followings: Cell Global ID, Target Cell Global ID, and Requested Target Cell ID.

second entity identification: used to identify the entity receiving the request. The identification can be one or more of the followings: Cell Global ID, Target Cell Global ID, and Requested Target Cell ID.

a validity range: the validity range identification and/or identification list of the message content, including one or more of the followings: UE, QoS flow, QoS level, Data Radio Bearer, slice, cell, node, service, region, operator, etc. The identifier of the slice may be Single Network Slice Selection Assistance Information (S-NSSAI). The identifier of the cell may be a Physical-layer Cell identity. The identifier of the operator may be a Public Land Mobile Network ID (PLMN ID). The identifier of the QoS level may be a mapped 5G QoS Identifier (5QI) or a QoS Class Identifier (QCI).

a handover time: used to indicate the time point when the UE performs handover. This time can be either relative time or absolute time.

model forwarding request identification: used to indicate including a model forwarding request. This field can be represented by a single bit, for example, 1 indicates that the request includes a model forwarding request, and 0 indicates that the request does not include a model forwarding request; or 1 indicates that the request does not include a model forwarding request, and 0 indicates that the request includes a model forwarding request.

a model forwarding registration request; used to indicate the starting, ending and addition of model forwarding.

a model forwarding time interval: used to indicate the time interval of model forwarding. It can be represented by 2*n bits. For example, the first n bits represent the starting time of model forwarding, and the last n bits represent the ending time of model forwarding, which can be either relative time or absolute time. It can also be represented by Separate fields, and the model forwarding time interval includes one or more of the followings:

a model forwarding starting time: used to indicate the starting time of model forwarding. The starting time can be relative time or absolute time.

a model forwarding ending time: used to indicate the ending time of model forwarding. The ending time can be relative time or absolute time.

model forwarding time: used to indicate the time point of model forwarding. This time can be either relative time or absolute time.

a model forwarding proportion: used to indicate a proportion of model forwarding, including one or more of the followings: partial model forwarding (<100%), whole model forwarding (100%), remaining model forwarding, etc. Wherein, the remaining model forwarding means forwarding the parts that have not been downloaded; wherein, partial model forwarding can indicate the percentage counted from the starting part to the back, or the percentage counted from the ending part to the front.

a model forwarding type: used to indicate whether the model forwarding is one-time forwarding or triggering forwarding. Reporting types include, but are not limited to, on-demand reporting, event-triggered reporting, etc.

triggering event configuration for model forwarding: used to indicate the triggering event for model forwarding. Reporting is needed only when the actual situation satisfies the triggering event, such as accessing a certain slice (for example, entering a certain slice identified by S-NSSAI, etc.), accessing a private network, accessing a certain operator (for example, entering a certain operator identified by PLMN, etc.) network, the user changes from an Inactive state and/or an Idle state to an active state, the user changes from an Active state to an Inactive state and/or an Idle state, the model accuracy is higher and/or lower than a threshold value, and there is/are model(s) being distributed and/or downloaded.

a model download address: used to indicate the model download address, including but not limited to at least one of the following information; the address and/or port and/or protocol of the download server, URL address.

a model download proportion: used to indicate the download progress, including one or more of the followings: a proportion of downloaded parts to all contents to be downloaded, a proportion of parts that have not been downloaded to all contents to be downloaded, etc.

content to be forwarded: used to indicate the content to be forwarded. The content to be forwarded includes one or more of the followings:

an index and/or a list of indexes of model(s)

a name of a model a function of a model a state of a model: used to indicate the current state of a model, including one or more of the followings: active state, inactive state, etc. When it is in the active state, it means that the current download of the model is in progress; when it is in the inactive state, it means that the download is suspended.

model accuracy: used to identify the performance evaluation result of a model, including one or more of the followings: accuracy, confidence, etc.

a type of a model: used to indicate the model type of machine learning, the type can include, but is not limited to, perceptron, feedforward neural network, radial basis function network, depth feedforward network, cyclic neural network, long/short term memory network, gated cyclic unit, automatic encoder, variational automatic encoder, denoise automatic encoder, sparse automatic encoder, Markov chain, Hoffitt network, Pozmann machine, restricted Pozmann machine, depth belief network, depth convolution network, deconvolution neural network, depth convolution inverse graph network, generative adversarial network, liquid machine, extreme learning machine, echo state network, depth residual network, Kohonen network, support vector machine, neural Turing machine, convolution neural network, artificial neural network, cyclic neural network, depth neural network, etc.

a feature parameter of a model: including but not limited to at least one of the following information;

the number of layers, used to indicate the number of layers of the neural network;

the number of neurons in a layer, used to indicate the number of neurons in a layer of the neural network;

a weight, used to indicate the weight of the neuron and/or neuron connection of the neural network.

a bias, used to indicate the bias of the neuron and/or neuron connection of the neural network;

a direction, used to indicate the direction of connection of the neural network;

an activation function;

a layer type, used to indicate the type of layer of the neural network, including input, hidden, output, etc.

input parameter types of a model constraints of input parameters of a model: including but not limited to time, precision, etc.

output parameter types of a model preprocessing methods of input parameters of a model: including but not limited to preprocessing matrix, etc.

post-processing methods of output parameters of a model: including but not limited to post-processing matrix, etc.

validity time of model inference content: used to indicate the validity time and/or time point of model inference content. This time can be either relative time or absolute time. If it is a time interval, it can be represented by 2*n bits. For example, the first n bits represent the starting time and the last n bits represent the ending time. It can also be represented by Separate fields, including one or more of the followings:

starting Time: used to indicate the starting time of the validity time interval. The starting time can be relative time or absolute time.

ending time: used to indicate the ending time of the validity time interval. The ending time can be relative time or absolute time.

The second entity sends the sixth message including the model to the first entity according to its own situation and/or according to the model forwarding request sent by the first entity, so that the first entity can acquire the UE model to ensure the subsequent performance of the network and/or the UE.

The sixth message may be a HANDOVER REQUEST message or a RETRIEVE UE CONTEXT RESPONSE message or a RETRIEVE UE CONTEXT FAILURE message of X2 or Xn. It can also be a secondary eNB modification request (SENB MODIFICATION REQUEST) message or a secondary eNB modification request acknowledge (SENB MODIFICATION REQUEST ACKNOWLEDGE) message or a secondary eNB modification request reject (SENB MODIFICATION REQUEST REJECT) message or a secondary gNB modification request (SGNB MODIFICATION REQUEST) message or a secondary gNB modification request acknowledge (SGNB MODIFICATION REQUEST ACKNOWLEDGE) message or a secondary gNB modification request reject (SGNB MODIFICATION REQUEST REJECT) message or a secondary eNB modification required (SENB MODIFICATION REQUIRED) message or a secondary eNB modification confirm (SENB MODIFICATION CONFIRM) message or a secondary eNB modification refuse (SENB MODIFICATION REFUSE) message or a secondary gNB modification required (SGNB MODIFICATION REQUIRED) message or a secondary gNB modification confirm (SGNB MODIFICATION CONFIRM) message or a secondary gNB modification refuse (SGNB MODIFICATION REFUSE) message of X2. It can also be an S-NODE MODIFICATION REQUEST message or an S-NODE MODIFICATION REQUEST ACKNOWLEDGE message or an S-NODE MODIFICATION REQUEST REJECT message or an S-NODE MODIFICATION REQUIRED message or an S-NODE MODIFICATION CONFIRM message or an S-NODE MODIFICATION REFUSE message of Xn. It can also be a secondary gNB change required (SGNB CHANGE REQUIRED) message of X2. It can also be an S-NODE CHANGE REQUIRED message of Xn. It can also be a secondary gNB release request acknowledge (SGNB RELEASE REQUEST ACKNOWLEDGE) message or a secondary eNB release required (SENB RELEASE REQUIRED) message or a secondary gNB release required (SGNB RELEASE REQUIRED) message of X2. It can also be an S-NODE RELEASE REQUEST ACKNOWLEDGE message or an S-NODE RELEASE REQUIRED message of Xn. It can also be a secondary eNB reconfiguration complete (SENB RECONFIGURATION COMPLETE) message or a secondary gNB reconfiguration complete (SGNB RECONFIGURATION COMPLETE) message of X2. It can also be an S-NODE RECONFIGURATION COMPLETE message of Xn. It can also be a HANDOVER REQUIRED message or a HANDOVER REQUEST message or a PATH SWITCH REQUEST ACKNOWLEDGE message or a PATH SWITCH REQUEST FAILURE message or a UE CONTEXT RELEASE REQUEST message or a UE CONTEXT RELEASE COMPLETE message or a UE INFORMATION TRANSFER message or an INITIAL CONTEXT SETUP REQUEST message of NG. It can also be a RESET ACKNOWLEDGE message or an F1 SETUP RESPONSE message or a GNB-DU CONFIGURATION UPDATE ACKNOWLEDGE message or a GNB-CU CONFIGURATION UPDATE ACKNOWLEDGE message or a UE CONTEXT SETUP REQUEST message or a UE CONTEXT RELEASE REQUEST message or a UE CONTEXT RELEASE COMPLETE message or a UE CONTEXT MODIFICATION RESPONSE message or a UE CONTEXT MODIFICATION CONFIRM message or a UE INACTIVITY NOTIFICATION message of F1. It can also be a RESET ACKNOWLEDGE message or a GNB-CU-UP E1 SETUP RESPONSE message or a GNB-CU-CP E1 SETUP RESPONSE message or a GNB-CU-UP CONFIGURATION UPDATE ACKNOWLEDGE message or a GNB-CU-CP CONFIGURATION UPDATE ACKNOWLEDGE message or an E1 RELEASE RESPONSE message or a BEARER CONTEXT SETUP RESPONSE message or a BEARER CONTEXT MODIFICATION RESPONSE message or a BEARER CONTEXT MODIFICATION CONFIRM message or a BEARER CONTEXT RELEASE COMPLETE message or a BEARER CONTEXT RELEASE REQUEST message or a BEARER CONTEXT INACTIVITY NOTIFICATION message of E1. It can also be a newly defined X2 message or Xn message or NG message or F1 message or E1 message.

The sixth message includes one or more of the followings:

UE identification: used to identify the UE where the model information to be reported is located and/or applicable. The identification may be one or more of the followings: NG-RAN node UE XnAP ID, Source NG-RAN node UE XnAP ID, M-NG-RAN node UE XnAP ID, S-NG-RAN node UE XnAP ID, MeNB UE X2AP ID, SeNB UE X2AP ID, MeNB UE X2AP ID, SgNB UE X2AP ID, AMF UE NGAP ID, RAN UE NGAP ID, Source AMF UE NGAP ID, ue-Identity, and new UE-Identity.

first entity identification: used to identify the first entity. The identification can be one or more of the followings: Cell Global ID, Target Cell Global ID, and Requested Target Cell ID.

second entity identification: used to identify the second entity. The identification can be one or more of the followings: Cell Global ID, Target Cell Global ID, and Requested Target Cell ID.

a validity range: the validity range identification and/or identification list of the message content, including one or more of the followings: UE, QoS flow, QoS level, Data Radio Bearer, slice, cell, node, service, region, operator, etc. The identifier of the slice may be Single Network Slice Selection Assistance Information (S-NSSAI). The identifier of the cell may be a Physical-layer Cell identity. The identifier of the operator may be a Public Land Mobile Network ID (PLMN ID). The identifier of the QoS level may be a mapped 5G Qos Identifier (5QI) or a QoS Class Identifier (QCI).

confirmation on the requested content can be forwarded: a single bit can be used to indicate whether it can be forwarded. For example, a bit of 1 indicates that all the requested content can be forwarded, and a bit of 0) indicates that the requested content cannot be forwarded. The confirmation may also be made on per requested content basis, for example, in the form of a bitmap, where each bit corresponds to a requested content. For example, when the bit is 1, it indicates that the information of the corresponding content requested to forward can be sent, while 0) indicates that the information of the corresponding content requested to forward cannot be sent. Separate fields can also be used to indicate confirmation for different contents requested to forward.

a model download proportion: used to indicate the download progress, including one or more of the followings: a proportion of downloaded parts to all contents to be downloaded, a proportion of parts that have not been downloaded to all contents to be downloaded, etc.

a model forwarding proportion: used to indicate a proportion of model forwarding, including one or more of the followings: partial model forwarding (<100%), whole model forwarding (100%), remaining model forwarding, etc. Wherein the remaining model forwarding means forwarding the downloaded part; wherein, partial model forwarding can indicate the percentage counted from the starting part to the back, or the percentage counted from the ending part to the front.

content to be forwarded: used to indicate the content to be forwarded. The content to be forwarded includes one or more of the followings:

an index and/or a list of indexes of model(s)

a name of a model a function of a model a state of a model: used to indicate the current state of a model, including one or more of the followings: active state, inactive state, etc. When it is in the active state, it means that the current download of the model is in progress; when it is in the inactive state, it means that the download is suspended.

model accuracy: used to identify the performance evaluation result of a model, including one or more of the followings: accuracy, confidence, etc.

a type of a model: used to indicate the model type of machine learning, The type can include, but is not limited to, perceptron, feedforward neural network, radial basis function network, depth feedforward network, cyclic neural network, long/short term memory network, gated cyclic unit, automatic encoder, variational automatic encoder, denoise automatic encoder, sparse automatic encoder, Markov chain, Hoffitt network, Pozmann machine, restricted Pozmann machine, depth belief network, depth convolution network, deconvolution neural network, depth convolution inverse graph network, generative adversarial network, liquid machine, extreme learning machine, echo state network, depth residual network, Kohonen network, support vector machine, neural Turing machine, convolution neural network, artificial neural network, cyclic neural network, depth neural network, etc.

a feature parameter of a model: including but not limited to at least one of the following information;

the number of layers, used to indicate the number of layers of the neural network;

the number of neurons in a layer, used to indicate the number of neurons in a layer of the neural network;

a weight, used to indicate the weight of the neuron and/or neuron connection of the neural network.

a bias, used to indicate the bias of the neuron and/or neuron connection of the neural network;

a direction, used to indicate the direction of connection of the neural network;

an activation function:

a layer type, used to indicate the type of layer of the neural network, including input, hidden, output, etc.

input parameter types of a model constraints of input parameters of a model: including but not limited to time, precision, etc.

output parameter types of a model preprocessing methods of input parameters of a model: including but not limited to preprocessing matrix, etc.

post-processing methods of output parameters of a model: including but not limited to post-processing matrix, etc.

validity time of model inference content: used to indicate the validity time and/or time point of model inference content. This time can be either relative time or absolute time. If it is a time interval, it can be represented by 2*n bits. For example, the first n bits represent the starting time and the last n bits represent the ending time. It can also be represented by Separate fields, including one or more of the followings:

starting Time: used to indicate the starting time of the validity time interval. The starting time can be relative time or absolute time.

ending time: used to indicate the ending time of the validity time interval. The ending time can be relative time or absolute time.

a triggering event for model forwarding: used to indicate the triggering event of the current model forwarding, such as such as accessing a certain slice (for example, entering a certain slice identified by S-NSSAI, etc.), accessing a private network, accessing a certain operator (for example, entering a certain operator identified by PLMN, etc.) network, the user changes from an Inactive state and/or an Idle state to an active state, the user changes from an Active state to an Inactive state and/or an Idle state, the model accuracy is higher and/or lower than a threshold value, and there are/is model(s) being distributed and/or downloaded.

distribution Content: used to indicate the content to be distributed. The distribution content includes one or more of the followings:

an index and/or a list of indexes of model(s)

a name of a model a function of a model a state of a model: used to indicate the current state of a model, including one or more of the followings: active state, inactive state, etc. When it is in the active state, it means that the current downloading of the model is in progress; when it is in the inactive state, it means the downloading is suspended.

model accuracy: used to identify the performance evaluation results of the model, including one or more of the followings: accuracy, confidence, etc.

a type of a model: used to indicate the model type of machine learning, the type can include but is not limited to, perceptron, feedforward neural network, radial basis function network, depth feedforward network, cyclic neural network, long/short term memory network, gated cyclic unit, automatic encoder, variational automatic encoder, denoise automatic encoder, sparse automatic encoder, Markov chain, Hoffitt network, Pozmann machine, restricted Pozmann machine, depth belief network, depth convolution network, deconvolution neural network, depth convolution inverse graph network, generative adversarial network, liquid machine, extreme learning machine, echo state network, depth residual network, Kohonen network, support vector machine, neural Turing machine, convolution neural network, artificial neural network, cyclic neural network, depth neural network, etc.

a feature parameter of a model: including but not limited to at least one of the following information;

the number of layers, used to indicate the number of layers of the neural network;

the number of neurons in a layer, used to indicate the number of neurons in a layer of the neural network;

a weight, used to indicate the weight of the neuron and/or neuron connection of the neural network.

a bias, used to indicate the bias of the neuron and/or neuron connection of the neural network;

a direction, used to indicate the direction of connection of the neural network;

an activation function:

a layer type, used to indicate the type of layer of the neural network, including input, hidden, output, etc.

input parameter types of a model constraints of input parameters of a model: including but not limited to time, precision, etc.

output parameter types of a model preprocessing methods of input parameters of a model: including but not limited to preprocessing matrix, etc.

post-processing methods of output parameters of a model: including but not limited to post-processing matrix, etc.

Wherein, the forwarding content and/or the distribution content may contain all sub-content, or only partial sub-content. Wherein, the partial sub-content may be the changed content compared with the previous forwarding content and/or distribution content. The sub-content of the forwarding content and/or distribution content may be a specific value or a changed value compared with the previous forwarding content and/or distribution content.

If the second entity cannot feedback the model forwarding result to the first entity according to the model forwarding request sent by the first entity, the second entity sends a seventh message including the inability or failure of forwarding to the first entity, so that the first entity knows that the second entity cannot forward according to the request.

The seventh message may be a HANDOVER REQUEST message or a RETRIEVE UE CONTEXT RESPONSE message or a RETRIEVE UE CONTEXT FAILURE message of X2 or Xn. It can also be a secondary eNB modification request (SENB MODIFICATION REQUEST) message or a secondary eNB modification request acknowledge (SENB MODIFICATION REQUEST ACKNOWLEDGE) message or a secondary eNB modification request reject (SENB MODIFICATION REQUEST REJECT) message or a secondary gNB modification request (SGNB MODIFICA-TION REQUEST) message or a secondary gNB modification request acknowledge (SGNB MODIFICATION REQUEST ACKNOWLEDGE) message or a secondary gNB modification request reject (SGNB MODIFICATION REQUEST REJECT) message or a secondary eNB modification required (SENB MODIFICATION REQUIRED) message or a secondary eNB modification confirm (SENB MODIFICATION CONFIRM) message or a secondary eNB modification refuse (SENB MODIFICATION REFUSE) message or a secondary gNB modification required (SGNB MODIFICATION REQUIRED) message or a secondary gNB modification confirm (SGNB MODIFICATION CON-FIRM) message or a secondary gNB modification refuse (SGNB MODIFICATION REFUSE) message of X2. It can also be an S-NODE MODIFICATION REQUEST message or an S-NODE MODIFICATION REQUEST ACKNOWL-EDGE message or an S-NODE MODIFICATION REQUEST REJECT message or an S-NODE MODIFICA-TION REQUIRED message or an S-NODE MODIFICA-TION CONFIRM message or an S-NODE MODIFICA-TION REFUSE message of Xn. It can also be a secondary gNB change required (SGNB CHANGE REQUIRED) message of X2. It can also be an S-NODE CHANGE REQUIRED message of Xn. It can also be a secondary gNB release request acknowledge (SGNB RELEASE REQUEST ACKNOWLEDGE) message or a secondary eNB release required (SENB RELEASE REQUIRED) message or a secondary gNB release required (SGNB RELEASE REQUIRED) message of X2. It can also be an S-NODE RELEASE REQUEST ACKNOWLEDGE message or an S-NODE RELEASE REQUIRED message of Xn. It can also be a secondary eNB reconfiguration complete (SENB RECONFIGURATION COMPLETE) message or a secondary gNB reconfiguration complete (SGNB RECONFIGU-RATION COMPLETE) message of X2. It can also be an S-NODE RECONFIGURATION COMPLETE message of Xn. It can also be a HANDOVER REQUIRED message or a HANDOVER REQUEST message or a PATH SWITCH REQUEST ACKNOWLEDGE message or a PATH SWITCH REQUEST FAILURE message or a UE CON-TEXT RELEASE REQUEST message or a UE CONTEXT RELEASE COMPLETE message or a UE INFORMATION TRANSFER message or an INITIAL CONTEXT SETUP REQUEST message of NG. It can also be a RESET ACKNOWLEDGE message or an F1 SETUP RESPONSE message or a F1 SETUP FAILURE message or a GNB-DU CONFIGURATION UPDATE ACKNOWLEDGE message or a GNB-DU CONFIGURATION UPDATE FAILURE message or a GNB-CU CONFIGURATION UPDATE ACKNOWLEDGE message or a GNB-CU CONFIGURA-TION UPDATE FAILURE message or a UE CONTEXT RELEASE COMPLETE message or a UE CONTEXT MODIFICATION RESPONSE message or a UE CON-TEXT MODIFICATION FAILURE message or a UE CON-TEXT MODIFICATION CONFIRM message or a UE CONTEXT MODIFICATION REFUSE message of F1. It can also be a RESET ACKNOWLEDGE message or a GNB-CU-UP E1 SETUP RESPONSE message or a GNB-CU-UP E1 SETUP FAILURE message or a GNB-CU-CP E1 SETUP RESPONSE message or a GNB-CU-CP E1 SETUP FAILURE message or a GNB-CU-UP CONFIGURATION UPDATE ACKNOWLEDGE message or a GNB-CU-UP CONFIGURATION UPDATE FAILURE message or a GNB-CU-CP CONFIGURATION UPDATE ACKNOWL-EDGE message or a GNB-CU-CP CONFIGURATION UPDATE FAILURE message of E1; or an E1 RELEASE RESPONSE message or a BEARER CONTEXT SETUP RESPONSE message or a BEARER CONTEXT SETUP FAILURE message or a BEARER CONTEXT MODIFICA-TION RESPONSE message or a BEARER CONTEXT MODIFICATION FAILURE message or a BEARER CON-TEXT MODIFICATION CONFIRM message or a BEARER CONTEXT RELEASE COMPLETE message. It can also be a newly defined X2 message or Xn message or NG message or F1 message or E1 message.

The seventh message includes one or more of the follow-ings:

UE identification: used to identify the UE where the model information to be reported is located and/or applicable. The identification may be one or more of the followings: NG-RAN node UE XnAP ID, Source NG-RAN node UE XnAP ID, M-NG-RAN node UE XnAP ID, S-NG-RAN node UE XnAP ID, MeNB UE X2AP ID, SeNB UE X2AP ID, MeNB UE X2AP ID, SgNB UE X2AP ID, AMF UE NGAP ID, RAN UE NGAP ID, and Source AMF UE NGAP ID.

first entity identification: used to identify the first entity. The identification can be one or more of the followings: Cell Global ID, Target Cell Global ID, and Requested Target Cell ID.

second entity identification: used to identify the second entity. The identification can be one or more of the followings: Cell Global ID, Target Cell Global ID, and Requested Target Cell ID.

a validity range: the validity range identification and/or identification list of the message content, including one or more of the followings: UE, QoS flow, QoS level, Data Radio Bearer, slice, cell, node, service, region, operator, etc. The identifier of the slice may be Single Network Slice Selection Assistance Information (S-NSSAI). The identifier of the cell may be a Physical-layer Cell identity. The identifier of the operator may be a Public Land Mobile Network ID (PLMN ID). The identifier of the QoS level may be a mapped 5G QoS Identifier (5QI) or a QoS Class Identifier (QCI).

confirmation on the requested content can be forwarded: a single bit can be used to indicate whether it can be forwarded. For example, a bit of 1 indicates that all the requested content can be forwarded, and a bit of 0) indicates that the requested content cannot be for-warded. The confirmation may also be made on per requested content basis. for example, in the form of a bitmap, where each bit corresponds to a requested content. For example, when the bit is 1, it indicates that the information of the corresponding content requested to forward can be sent while 0 indicates that the information of the corresponding content requested to forward cannot be sent. Separate fields can also be used to indicate confirmation for different contents requested to forward.

a cause: used to indicate the reason for the failure of the request. for example, there is no requested forwarding content, no model. model not available, etc.

According to another aspect of the embodiment of the disclosure, a method for supporting wireless communication network data collection is proposed, the method includes: a first entity sends an eighth message including a computing power information reporting request to a second entity, so as to inform the second entity of the computing power infor-mation reporting request. After receiving the eighth mes-sage, the second entity needs to report the computing power information to the first entity according to the computing power information reporting request, so that the first entity can acquire the computing power information of the second entity and ensure the subsequent performance of the network and/or UE.

The eighth message may be a RESOURCE STATE REQUEST message of X2 or Xn or F1 or E1. It can also be an EN-DC RESOURCE STATUS REQUEST message or an EN-DC X2 SETUP REQUEST message or an EN-DC CONFIGURATION UPDATE message or a secondary gNB addition request (SGNB ADDITION REQUEST) message of X2. It can also be an XN SETUP REQUEST message or a NG-RAN NODE CONFIGURATION UPDATE message or an S-NODE ADDITION REQUEST message or an S-NODE MODIFICATION REQUEST message or an S-NODE MODIFICATION REQUIRED message of Xn. It can also be a GNB-CU CONFIGURATION UPDATE mes-sage of F1. It can also be a GNB-CU-CP E1 SETUP REQUEST message or a GNB-CU-CP CONFIGURATION UPDATE message or a BEARER CONTEXT SETUP REQUEST message or a BEARER CONTEXT MODIFI-CATION REQUEST message. It can also be the measure-ment configuration of RRC. MDT configuration, etc. It can also be a newly defined X2 message or Xn message or F1 message or E1 message or RRC message or RRC Container.

The eighth message includes one or more of the follow-ings:

first entity identification: used to identify the entity that sent the request. The identification may be one or more of the followings: Cell Global ID, Target Cell Global ID, Requested Target Cell ID, eNB Measurement ID, en-gNB Measurement ID, NG-RAN node Measurement ID, gNB-DU Measurement ID, gNB-CU Measurement ID, gNB-CU-CP Measurement ID, gNB-CU-UP Measurement ID, and RAN Measurement ID.

second entity identification: used to identify the entity receiving the request. The identification may be one or more of the followings: Cell Global ID, Target Cell Global ID, Requested Target Cell ID, ue-Identity, new UE-Identity, eNB Measurement ID, en-gNB Measurement ID, NG-RAN node Measurement ID, gNB-DU Measurement ID, gNB-CU Measurement ID, gNB-CU-CP Measurement ID, gNB-CU-UP Measurement ID, and RAN Measurement ID.

interaction identification: used to identify the current interaction. The identification may be an rrc-TransactionIdentification.

a validity range: the validity range identification and/or identification list of the message content, including one or more of the followings: UE, QoS flow, QoS level, Data Radio Bearer, slice, cell, node, service, region, operator, etc. The identifier of the slice may be Single Network Slice Selection Assistance Information (S-NSSAI). The identifier of the cell may be a Physical-layer Cell identity. The identifier of the operator may be a Public Land Mobile Network ID (PLMN ID). The identifier of the QoS level may be a mapped 5G QoS Identifier (5QI) or a QoS Class Identifier (QCI).

prediction identification: used to identify whether the request includes the reporting request for predicted computing power related information of the second entity. This field can be represented by a single bit. For example, I indicates that the request includes a reporting request for predicted computing power related information, and 0 indicates that the request does not include a reporting request for predicted computing power related information; or 1 indicates that the request does not include the reporting request for predicted computing power related information, and 0 indicates that the request includes the reporting request for predicted computing power related information. Alternatively, 1 indicates that the request includes the reporting request for predicted computing power related information, while 0 indicates that the request includes the reporting request for computing power related information; or 1 indicates that the request includes a reporting request for computing power related information, and 0 indicates that the request includes a reporting request for predicting computing power related information.

a prediction registration request; used to indicate related information on at least one of the starting, ending or addition of the reporting of predicted computing power information.

a registration request; used to indicate related information on at least one of the starting, ending or addition of the reporting of computing power information.

a reporting time interval: used to indicate the time interval of the reporting of computing power information. It can be represented by 2*n bits. For example, the first n bits represent the reporting starting time, and the last n bits represent the reporting ending time, which can be either relative time or absolute time. It can also be represented by Separate fields, including one or more of the followings:

a reporting starting time: used to indicate the starting time of reporting. The starting time can be relative time or absolute time.

a reporting ending time: used to indicate the ending time of reporting. The ending time can be relative time or absolute time.

reporting time: used to indicates the time point for reporting. This time can be a relative time or an absolute time.

a predicted information reporting time interval: used to indicate the reporting time interval of predicted computing power information. It can be represented by 2*n bits. For example, the first n bits represent the reporting starting time, and the last n bits represent the reporting ending time, which can be either relative time or absolute time. It can also be represented by Separate fields, including one or more of the followings:

a reporting starting time: used to indicate the starting time of reporting. The starting time can be relative time or absolute time.

a reporting ending time: used to indicate the ending time of reporting. The ending time can be relative time or absolute time.

predicted information reporting time: used to indicate the time point of the predicted computing power information reporting. This time can be relative time or absolute time.

validity time of prediction result of predicted information; used to indicate the validity time and/or time point of the requested predicted computing power information. This time can be either a relative time or an absolute time. If it is a time interval, it can be represented by 2*n bits. For example, the first n bits represent the starting time and the last n bits represent the ending time. It can also be represented by Separate fields, including one or more of the followings:

starting Time: used to indicate the starting time of the validity time interval. The starting time can be a relative time or an absolute time.

ending time: used to indicate the ending time of the validity time interval. The ending time can be a relative time or an absolute time.

a computing power information reporting type: used to indicate whether the computing power information is one-time reported or periodically reported or event-triggered reported. Reporting types include, but are not limited to, on-demand type, periodic type, event-triggered reporting, etc.

a computing power information reporting period: used to indicate the time interval of periodic reporting of computing power information. If there is no content in this field, it means a one-time reporting.

triggering event configuration for computing power information reporting: used to indicate the triggering event for computing power information reporting. The computing power information needs to be reported only when the actual situation satisfies the triggering event, such as when the computing power is greater than and/or greater than or equal to a certain threshold value, less than and/or less than or equal to a certain threshold value, the computing power is in a downward trend, the computing power is in an upward trend.

a predicted computing power information reporting type: used to indicate whether the predicted computing power information is one-time reported, periodically reported or event-triggered reported. Reporting types include, but are not limited to, on-demand type, periodic type, event-triggered reporting, etc.

a predicted computing power information reporting period: used to indicate the time interval of periodic reporting of predicted computing power information. If there is no content in this field, it means a one-time reporting.

triggering event configuration for predicted computing power information reporting: used to indicate the triggering event for computing power information reporting. The predicted computing power information needs to be reported only when the actual situation satisfies the triggering event, such as the predicted computing power is greater than and/or greater than or equal to a certain threshold, the predicted computing power is less than and/or less than or equal to a certain threshold, the predicted computing power is in a downward trend, the predicted computing power is in an upward trend, the computing power is greater than and/or greater than or equal to a certain threshold, the computing power is less than and/or less than or equal to a certain threshold, the computing power is in a downward trend, and the computing power is in an upward trend.

computing power information content to be reported; used to indicate the computing power information to be reported. The reported content includes one or more of the followings: computing power, hash value, etc. Its unit can be TOPS. TFLOPS. FLOP. GOPS, etc.

predicted computing power information content to be reported; used to indicate the predicted computing power information to be reported. The reported content includes one or more of the followings: computing power, hash value, etc. Its unit can be TOPS. TFLOPS, FLOP, GOPS, etc.

The second entity sends the ninth message including a computing power information reporting request response to the first entity according to the computing power information reporting request sent by the first entity, so as to inform the first entity whether the computing power information can be reported.

The ninth message may be a RESOURCE STATE RESPONSE message or a RESOURCE STATE FAILURE message or a RESOURCE STATE UPDATE message of X2 or Xn or F1 or E1. It can also be an EN-DC RESOURCE STATUS RESPONSE message or an EN-DC RESOURCE STATUS FAILURE message or an EN-DC RESOURCE STATUS UPDATE message or an EN-DC X2 SETUP RESPONSE message or an EN-DC X2 SETUP FAILURE message or an EN-DC CONFIGURATION UPDATE message or an EN-DC CONFIGURATION UPDATE ACKNOWLEDGE message or a secondary gNB addition request acknowledge (SGNB ADDITION REQUEST ACKNOWLEDGE) message of X2. It can also be an XN SETUP RESPONSE message or an NG-RAN NODE CONFIGURATION UPDATE message or an NG-RAN NODE CONFIGURATION UPDATE ACKNOWLEDGE message or an S-NODE ADDITION REQUEST message or an S-NODE ADDITION REQUEST ACKNOWLEDGE message or an S-NODE MODIFICATION REQUEST ACKNOWLEDGE message or an S-NODE MODIFICATION REQUEST REJECT message or an S-NODE MODIFICATION CONFIRM message of Xn. It can also be a GNB-CU CONFIGURATION UPDATE ACKNOWLEDGE message or a GNB-DU CONFIGURATION UPDATE message or a GNB-DU STATUS INDICATION message of F1. It can also be a GNB-CU-UP CONFIGURATION UPDATE message or a BEARER CONTEXT MODIFICATION RESPONSE message or a GNB-CU-UP STATUS INDICATION message of E1. It can also be RRC measurement report, MDT report, etc. It can also a newly defined X2 message or Xn message or F1 message or E1 message or RRC message or RRC Container.

The ninth message includes one or more of the followings:

first entity identification: used to identify the first entity. The identification may be one or more of the followings: Cell Global ID, Target Cell Global ID, Requested Target Cell ID, eNB Measurement ID, en-gNB Measurement ID, NG-RAN node Measurement ID, gNB-DU Measurement ID, gNB-CU Measurement ID, gNB-CU-CP Measurement ID, gNB-CU-UP Measurement ID, and RAN Measurement ID.

second entity identification: used to identify the second entity. The identification may be one or more of the followings: Cell Global ID, Target Cell Global ID, Requested Target Cell ID, ue-Identity, newUE-Identity, eNB Measurement ID, en-gNB Measurement ID, NG-RAN node Measurement ID, gNB-DU Measurement ID, gNB-CU Measurement ID, gNB-CU-CP Measurement ID, gNB-CU-UP Measurement ID, and RAN Measurement ID.

interaction identification: used to identify the current interaction. The identification may be an rrc-TransactionIdentification.

a validity range: the validity range identification and/or identification list of the message content, including one or more of the followings: UE, QoS flow, QoS level, Data Radio Bearer, slice, cell, node, service, region, operator, etc. The identifier of the slice may be Single Network Slice Selection Assistance Information (S-NSSAI). The identifier of the cell may be a Physical-layer Cell identity. The identifier of the operator may be a Public Land Mobile Network ID (PLMN ID). The identifier of the QoS level may be a mapped 5G QoS Identifier (5QI) or a QoS Class Identifier (QCI).

confirmation on the requested content can be reported; a single bit can be used to indicate whether it can be reported. For example, the bit of 1 indicates all the requested content can be reported; the bit of 0) indicates the requested content cannot be reported. The confirmation may also be on per requested content basis, such as in the form of bitmap, where each bit corresponds to a requested content. For example, when the bit is 1, it means that the information of the corresponding content requested to be reported can be sent, while 0 means that the information of the corresponding content requested to be reported cannot be sent. Separate fields can also be used to indicate the confirmation for different reporting request contents.

confirmation on the requested predicted content can be reported; a single bit can be used to indicate whether the predicted computing power information can be reported. For example, the bit of 1 indicates all the requested predicted computing power content can be reported, the bit of 0 indicates the requested predicted computing power content cannot be reported. The confirmation may also be on per requested content basis, such as in the form of bitmap, where each bit corresponds to a requested content. For example, when the bit is 1, it means that the information of the corresponding content requested to be reported can be sent, while 0 means that the information of the corresponding content requested to be reported cannot be sent. Separate fields can also be used to indicate the confirmation for different reporting request contents.

a triggering event for computing power information reporting: used to indicate the triggering event of the current computing power information reporting. The computing power information needs to be reported only when the actual situation satisfies the triggering event, such as when the computing power is greater than and/or greater than or equal to a certain threshold value, the computing power is less than and/or less than or equal to a certain threshold value, the computing power is in a downward trend, the computing power is in an upward trend, etc.

a triggering event for predicted computing power information reporting: used to indicate the triggering event of the current predicted computing power information reporting. The predicted computing power information needs to be reported only when the actual situation satisfies the triggering event, such as the predicted computing power is greater than and/or greater than or equal to a certain threshold, the predicted computing power is less than and/or less than or equal to a certain threshold, the predicted computing power is in a downward trend, the predicted computing power is in an upward trend, the computing power is greater than and/or greater than or equal to a certain threshold, the computing power is less than and/or less than or equal to a certain threshold, the computing power is in a downward trend, and the computing power is in an upward trend, etc.

computing power information reporting content: used to indicate the reported computing power information. The reported content includes one or more of the followings: computing power, hash value, etc. Its unit can be TOPS, TFLOPS, FLOP, GOPS, etc.

predicted computing power information reporting content: used to indicate the reported predicted computing power information. The reported content includes one or more of the followings: computing power, hash value, etc. Its unit can be TOPS, TFLOPS, FLOP, GOPS, etc.

accuracy of predicted computing power information; used to indicate the accuracy of the reported predicted computing power information and/or model. The accuracy may include one or more of the followings: accuracy, confidence, etc.

validity time of predicted computing power information; used to indicate the validity time and/or time point of predicted computing power information. This time can be either a relative time or an absolute time. If it is a time interval, it can be represented by 2*n bits. For example, the first n bits represent the starting time and the last n bits represent the ending time. It can also be represented by a Separate field, including one or more of the followings:

starting Time: used to indicate the starting time of the validity time interval. The starting time can be a relative time or an absolute time.

ending time: used to indicate the ending time of the validity time interval. The ending time can be a relative time or an absolute time.

The second entity sends a tenth message including the computing power information to the first entity according to its own situation and/or the computing power information reporting request sent by the first entity, so that the first entity can acquire the computing power information.

The tenth message may be a RESOURCE STATE RESPONSE message or a RESOURCE STATE FAILURE message or a RESOURCE STATE UPDATE message of X2 or Xn or F1 or E1. It can also be an EN-DC RESOURCE STATUS RESPONSE message or an EN-DC RESOURCE STATUS FAILURE message or an EN-DC RESOURCE STATUS UPDATE message or an EN-DC X2 SETUP RESPONSE message or an EN-DC X2 SETUP FAILURE message or an EN-DC CONFIGURATION UPDATE message or an EN-DC CONFIGURATION UPDATE ACKNOWLEDGE message or a secondary gNB addition request acknowledge (SGNB ADDITION REQUEST ACKNOWLEDGE) message of X2. It can also be an XN SETUP RESPONSE message or an NG-RAN NODE CONFIGURATION UPDATE message or an NG-RAN NODE CONFIGURATION UPDATE ACKNOWLEDGE message or an S-NODE ADDITION REQUEST message or an S-NODE ADDITION REQUEST ACKNOWLEDGE message or an S-NODE MODIFICATION REQUEST ACKNOWLEDGE message or an S-NODE MODIFICATION REQUEST REJECT message or an S-NODE MODIFICATION CONFIRM message of Xn. It can also be a GNB-CU CONFIGURATION UPDATE ACKNOWLEDGE message or a GNB-DU CONFIGURATION UPDATE message or a GNB-DU STATUS INDICATION message of F1. It can also be a GNB-CU-UP CONFIGURATION UPDATE message or a BEARER CONTEXT MODIFICATION RESPONSE message or a GNB-CU-UP STATUS INDICATION message of E1. It can also be RRC measurement report, MDT report, etc. It can also a newly defined X2 message or Xn message or F1 message or E1 message or RRC message or RRC Container.

The tenth message includes one or more of the followings:

first entity identification: used to identify the first entity. The identification may be one or more of the followings: Cell Global ID, Target Cell Global ID, Requested Target Cell ID, eNB Measurement ID, en-gNB Measurement ID, NG-RAN node Measurement ID, gNB-DU Measurement ID, gNB-CU Measurement ID, gNB-CU-CP Measurement ID, gNB-CU-UP Measurement ID, RAN Measurement ID.

second entity identification: used to identify the second entity. The identification may be one or more of the followings: Cell Global ID, Target Cell Global ID, Requested Target Cell ID, ue-Identity, newUE-Identity, eNB Measurement ID, en-gNB Measurement ID, NG-RAN node Measurement ID, gNB-DU Measurement ID, gNB-CU Measurement ID, gNB-CU-CP Measurement ID, gNB-CU-UP Measurement ID, and RAN Measurement ID.

interaction identification: used to identify the current interaction. The identification may be an rrc-TransactionIdentification.

a validity range: the validity range identification and/or identification list of the message content, including one or more of the followings: UE, QoS flow, QoS level, Data Radio Bearer, slice, cell, node, service, region, operator, etc. The identifier of the slice may be Single Network Slice Selection Assistance Information (S-NSSAI). The identifier of the cell may be a Physical-layer Cell identity. The identifier of the operator may be a Public Land Mobile Network ID (PLMN ID). The identifier of the QoS level may be a mapped 5G QoS Identifier (5QI) or a QoS Class Identifier (QCI).

a triggering event for computing power information reporting: used to indicate the triggering event of the current computing power information reporting. The computing power information needs to be reported only when the actual situation satisfies the triggering event, such as when the computing power is greater than and/or greater than or equal to a certain threshold value, the computing power is less than and/or less than or equal to a certain threshold value, the computing power is in a downward trend, the computing power is in an upward trend, etc.

a triggering event for predicted computing power information reporting: used to indicate the triggering event of the current predicted computing power information reporting. The predicted computing power information needs to be reported only when the actual situation satisfies the triggering event, such as the predicted computing power is greater than and/or greater than or equal to a certain threshold, the predicted computing power is less than and/or less than or equal to a certain threshold, the predicted computing power is in a downward trend, the predicted computing power is in an upward trend, the computing power is greater than and/or greater than or equal to a certain threshold, the computing power is less than and/or less than or equal to a certain threshold, the computing power is in a downward trend, and the computing power is in an upward trend, etc.

computing power information reporting content: used to indicate the reported computing power information. The reported content includes one or more of the followings: computing power, hash value, etc. Its unit can be TOPS, TFLOPS, FLOP, GOPS, etc.

predicted computing power information reporting content: used to indicate the reported predicted computing power information. The reported content includes one or more of the followings: computing power, hash value, etc. Its unit can be TOPS, TFLOPS, FLOP, GOPS, etc.

accuracy of predicted computing power information; used to indicate the accuracy of the reported predicted computing power information and/or model. The accuracy may include one or more of the followings: accuracy, confidence, etc.

validity time of predicted computing power information; used to indicate the validity time and/or time point of predicted computing power information. This time can be either a relative time or an absolute time. If it is a time interval, it can be represented by 2*n bits. For example, the first n bits represent the starting time and the last n bits represent the ending time. It can also be represented by a Separate field, including one or more of the followings:

starting Time: used to indicate the starting time of the validity time interval. The starting time can be a relative time or an absolute time.

ending time: used to indicate the ending time of the validity time interval. The ending time can be a relative time or an absolute time.

If the second entity cannot feedback the computing power information result to the first entity according to the computing power information reporting request sent by the first entity, the second entity sends an eleventh message including the inability or failure of reporting to the first entity, so that the first entity knows that the second entity cannot report according to the request.

The eleventh message may be a RESOURCE STATE RESPONSE message or a RESOURCE STATE FAILURE message or a RESOURCE STATE UPDATE message of X2 or Xn or F1 or E1. It can also be an EN-DC RESOURCE STATUS RESPONSE message or an EN-DC RESOURCE STATUS FAILURE message or an EN-DC RESOURCE STATUS UPDATE message or an EN-DC X2 SETUP RESPONSE message or an EN-DC X2 SETUP FAILURE message or an EN-DC CONFIGURATION UPDATE message or an EN-DC CONFIGURATION UPDATE ACKNOWLEDGE message or a secondary gNB addition request acknowledge (SGNB ADDITION REQUEST ACKNOWLEDGE) message of X2. It can also be an XN SETUP RESPONSE message or an NG-RAN NODE CONFIGURATION UPDATE message or an NG-RAN NODE CONFIGURATION UPDATE ACKNOWLEDGE message or an S-NODE ADDITION REQUEST message or an S-NODE ADDITION REQUEST ACKNOWLEDGE message or an S-NODE MODIFICATION REQUEST ACKNOWLEDGE message or an S-NODE MODIFICATION REQUEST REJECT message or an S-NODE MODIFICATION CONFIRM message of Xn. It can also be a GNB-CU CONFIGURATION UPDATE ACKNOWLEDGE message or a GNB-DU CONFIGURATION UPDATE message of F1. It can also be a GNB-CU-UP CONFIGURATION UPDATE message or a BEARER CONTEXT MODIFICATION RESPONSE message of E1. It can also be RRC measurement report. MDT report, etc. It can also a newly defined X2 message or Xn message or F1 message or E1 message or RRC message or RRC Container.

The eleventh message includes one or more of the followings:

first entity identification: used to identify the first entity. The identification may be one or more of the followings: Cell Global ID, Target Cell Global ID, Requested Target Cell ID, eNB Measurement ID, en-gNB Measurement ID, NG-RAN node Measurement ID, gNB-DU Measurement ID, gNB-CU Measurement ID, gNB-CU-CP Measurement ID, gNB-CU-UP Measurement ID, and RAN Measurement ID.

second entity identification: used to identify the second entity. The identification may be one or more of the followings: Cell Global ID, Target Cell Global ID, Requested Target Cell ID, ue-Identity, newUE-Identity, eNB Measurement ID, en-gNB Measurement ID, NG-RAN node Measurement ID, gNB-DU Measurement ID, gNB-CU Measurement ID, gNB-CU-CP Measurement ID, gNB-CU-UP Measurement ID, and RAN Measurement ID.

interaction identification: used to identify the current interaction. The identification may be an rrc-TransactionIdentification.

a validity range: the validity range identification and/or identification list of the message content, including one or more of the followings: UE, QoS flow, QoS level, Data Radio Bearer, slice, cell, node, service, region, operator, etc. The identifier of the slice may be Single Network Slice Selection Assistance Information (S-NSSAI). The identifier of the cell may be a Physical-layer Cell identity. The identifier of the operator may be a Public Land Mobile Network ID (PLMN ID). The identifier of the QoS level may be a mapped 5G Qos Identifier (5QI) or a QoS Class Identifier (QCI).

confirmation on the requested content can be reported; a single bit can be used to indicate whether it can be reported. For example, the bit of 1 indicates all the requested content can be reported; the bit of 0 indicates the requested content cannot be reported. The confirmation may also be on per requested content basis, such as in the form of bitmap, where each bit corresponds to a requested content. For example, when the bit is 1, it means that the information of the corresponding content requested to be reported can be sent, while 0 means that the information of the corresponding content requested to be reported cannot be sent. Separate fields can also be used to indicate the confirmation for different reporting request contents.

confirmation on the requested predicted content can be reported; a single bit can be used to indicate whether the predicted computing power information can be reported. For example, the bit of 1 indicates all the requested predicted computing power content can be reported, the bit of 0 indicates the requested predicted computing power content cannot be reported. The confirmation may also be on per requested content basis, such as in the form of bitmap, where each bit corresponds to a requested content. For example, when the bit is 1, it means that the information of the corresponding content requested to be reported can be sent, while 0 means that the information of the corresponding content requested to be reported cannot be sent. Separate fields can also be used to indicate the confirmation for different reporting request contents.

A cause: used to indicate the reason for the failure of the request, for example, there is no requested reporting content, no computing power information, no prediction capability, no computing power information prediction capability, unable to provide the corresponding prediction result for the validity time of the requested prediction result, etc.

The model involved in the disclosure can be an artificial intelligence model, a machine learning model, a mathematical model, etc.

The distribution of a model involved in this disclosure means that the owner entity of the model issues it to the demander entity of the model, and the download of the model means that the demander entity of the model downloads it from the owner entity of the model. In this disclosure, the distribution and download of a model can be replaced with each other according to the roles of entities.

The inference content involved in this disclosure means the output result acquired by using the trained model and inputting the corresponding input parameters.

The active state of the user in the disclosure may be RRC_Connected and/or CM_Connected, the inactive state of the user may be RRC_Inactive, and the idle state of the user may be RRC_Idle and/or CM_Idle.

The model state involved in the disclosure may be that, for the completely downloaded model, the inactive state represents that the model is kept, but no training and/or inference is performed: The active state indicates that the model is being used, and training and/or inference are being carried out. For the model that has not been downloaded completely, the inactive state represents to keep the downloaded part, but not to continue downloading the remaining part; the active state indicates that downloading of the un-downloaded part is continuing.

The model management decision involved in the disclosure may be, for the completely downloaded model, deactivation means to keep the model, but not training and/or inference is performed: Activation means to keep the model and continue training and/or inference. For the model that has not been downloaded completely, deactivation means to keep the downloaded part, but not to continue downloading; Activating means to continue downloading the un-downloaded part.

The on-demand reporting involved in the disclosure can refer to a single reporting.

The user experience information involved in the disclosure may include one or more of the followings: Round-trip time, Jitter duration, Corruption duration, Average throughput, Initial playout delay, Device information, Rendered viewports, Codec information, Buffer level, Representation switch events, Play List, Media presentation description (MPD) information, Interactivity Summary, Interactivity Event List, QoE MOS value, and evaluation values of the above parameters.

The QoS information involved in the disclosure may include one or more of the followings: packet loss rate, delay, throughput, data rate, QoS level, and evaluation values of the above parameters. The identifier of the QoS level may be a mapped 5G QoS Identifier (5QI) or a QoS Class Identifier (QCI).

The load information in the disclosure can also be resource status information.

The measurement report information and/or measurement report related values in the disclosure may include one or more of the followings: RSRP, RSRQ, SINR, received signal strength indicator (RSSI), etc.

The feature parameter of a model in the present disclosure may be an absolute value or a relative value. For example, it can be the relative value comparing with previous parameters or existing parameters. Relative value can help to reduce size of transmission signalling.

The position information in the present disclosure may be an absolute location, a relative location, etc. The location information may be expressed by latitude and longitude, absolute coordinates, relative coordinates, serving cell, camping cell, connected entity, beam, etc. The location information may include one or more of the following: time point and/or time interval, location coordinates and/or range, estimated speed (including magnitude and/or direction), moving direction, cell identification (such as Cell Global ID, etc.), entity identification, beam identification, precision, etc. The serving cell and/or the camping cell may be represented by a cell identification. The precision of location information may include, for example, meter, centimeter, decimeter, kilometer, etc.

The trajectory information in the present disclosure may be expressed by latitude and longitude, absolute coordinates, relative coordinates, serving cell, camping cell, connected entity, beam, etc. The trajectory information may include one or more of the following: time point and/or time interval, location coordinates and/or range, estimated speed (including magnitude and/or direction), moving direction, cell identification (such as Cell Global ID, etc.), entity identification, beam identification, precision, trajectory special case type, coordinate points and/or area of a trajectory special case etc. The serving cell and/or the camping cell may be represented by a cell identification. The precision of trajectory information may include, for example, meter, centimeter, decimeter, kilometer, etc. Herein, the trajectory special case type can include, but not limited to, long-term camping, short-term camping, ping-pong movement and so on. Herein, the coordinate points and/or area of the trajectory special case indicate information of the location where the trajectory special case occurs.

The energy efficiency in the present disclosure may include one or more of the followings: maximum power (unit: Watt), minimum power, average power, energy consumption (unit: KWH), uplink and/or downlink data volume, the ratio of uplink and/or downlink data volume to energy consumption.

The service type in the present disclosure may include one or more of the followings: Ultra Reliable Low Latency Communication, Enhanced Mobile Broadband, massive Machine Type of Communication, etc. The service type also can be the service with one and/or multiple QoS requirements. The service type also can be represented by QoS class, QoS type, etc.

The QoS class and/or QoS type in the present disclosure may use one or more of the following identifier: 5G QoS Identifier, QoS Flow Identifier, etc.

The traffic information in the present disclosure may include one or more of the followings: data volume, QoS class and/or QoS type, QoS parameter, QoS requirement, QoS requirement related QoS parameter and/or QoS class and/or QoS type, etc.

The handover target node information in the present disclosure may include one or more of the followings: target node, target cell, target beam, target slice, etc.

The entity and/or node in the present disclosure also can be one or more of the cells in the entity and/or node.

The execution condition information in the present disclosure may include one or more of the followings: measurement result of the neighbouring cell, measurement result of the connected cell, measurement offset, hysteresis, threshold of the event.

The measurement report and measurement result in the present disclosure can be represented by each other.

The load information and/or resource status information in the present disclosure may include one or more of the followings: transport network layer (TNL) capacity indicator, radio resource status, composite available capacity group, composite available resource group, number of active UEs, radio resource control (RRC) connections, slice available capacity, hardware (HW) capacity indicator, S1 TNL load indicator, hardware (HW) load indicator, almost blank subframe (ABS) status, reference signal received power (RSRP) measurement report or report list, reference signal receiving quality (RSRQ) measurement report or report list, signal to interference plus noise ratio (SINR) measurement report or report list. RSSI report or report list, channel state information (CSI) report, cell reporting indicator, channel occupancy time percentage, energy detection threshold, signal strength and/or signal quality, channel busy percentage, data volume, jitter of each predicted content parameter, etc. The jitter can be the variance or standard deviation of the parameter. The parameters above can be the status of connected cell, the status of neighbouring cell, the status of co-existence techniques (such as Wireless Local Area Network. Bluetooth, etc.), the sum of the status of connected cell and neighbouring cell, and the average of the status of connected cell and neighbour cells. The above parameters can be the uplink, downlink, or uplink and downlink. The above parameters can be current value, historical value, maximum value, minimum value, or average value.

The radio resource status in the present disclosure is used to indicate the usage of physical resource block (PRB) for downlink and/or uplink traffic and/or the usage of physical downlink control channel element (PDCCH CCE) for downlink and/or uplink scheduling. For example, the radio resource status is used to indicate within a certain area, such as cell and/or synchronization signal/physical broadcast channel block (SSB) area, and/or a certain time period and/or at one or more of time points and/or one or more of slices, the usage of physical resource block (PRB) of downlink and uplink traffic and the usage of physical downlink control channel element (PDCCH CCE) of downlink and uplink scheduling. The radio resource status can be the radio resource status and/or NR Radio resource status: the radio resource status can also be used to indicate within a certain area, such as cell and/or synchronization signal/physical broadcast channel block (SSB) area, and/or a certain time period and/or at one or more of time points and/or one or more of slices, the usage of PRBs for downlink and uplink traffic: the radio resource status can also be used to indicate the usage of PRBs for downlink and uplink traffic and the usage of PDCCH CCEs for downlink and uplink scheduling. The radio resource status may include one or more of the following: uplink and/or downlink guaranteed bit rate (GBR) PRB usage, uplink and/or downlink non-GBR PRB usage, uplink and/or downlink PRB usage, uplink and/or downlink scheduling PDCCH CCE usage. SSB area uplink and/or downlink GBR PRB usage. SSB area uplink and/or downlink non-GBR PRB usage. SSB area uplink and/or downlink PRB usage, uplink and/or downlink scheduling PDCCH CCE usage, etc.

Reference Signal Received Power (RSRP) measurement report or report list is used to provide RSRP measurement report of UE. For example, RSRP measurement report or report list can be used to provide RSRP measurement report of UE, and the reference signal reception power measurement report list can be RSRP Measurement Report List. The reference signal reception power measurement report list may include RSRP measured, etc.

Channel State Information (CSI) report in the present disclosure is used to provide CSI reports of the UE. The channel state information report may include one or more of the following: Rank Indicator (RI), wideband channel quality indicator (CQI), subband size, subband CQI, subband index, 4-bit CQI, 3-bit spatial differential CQI, 2-bit subband differential CQI, 2-bit differential CQI, 2-bit differential CQI, 2-bit subband differential CQI, Precoding Matrix Indicator (PMI), CSI-RS Resource Indicator (CRI), Layer Indicator (LI), L1-L1-RSRP.

The model information in the present disclosure includes all information related to model, including one or more of the followings: model information, inference content reporting information, inference content information, etc.

Various embodiments of the disclosure are further described below with reference to the accompanying drawings.

Figure 3:
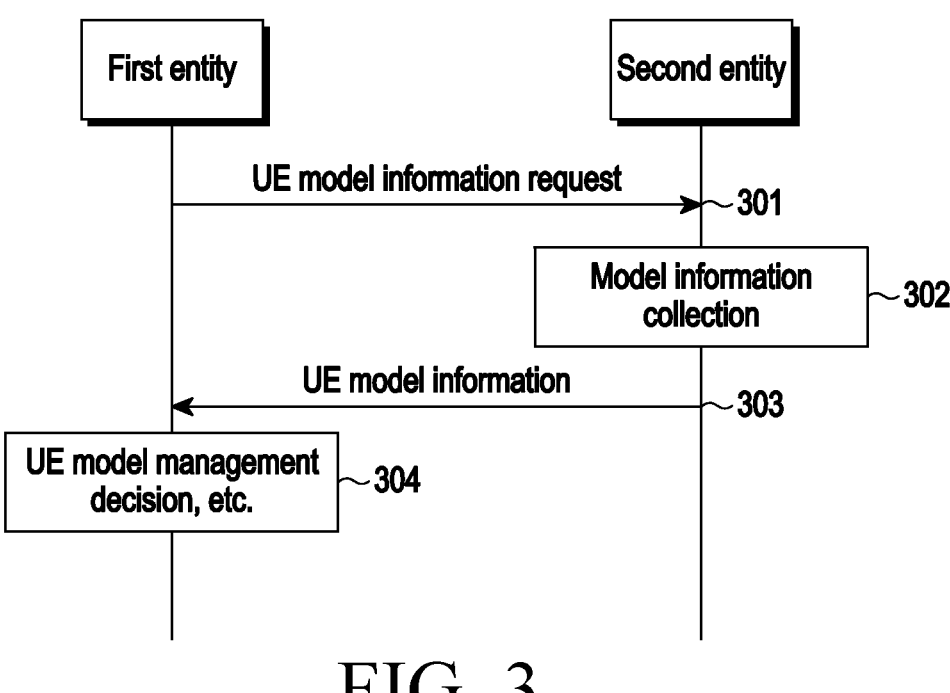
FIG. 3 is a schematic diagram illustrating an aspect of supporting wireless communication network data collection according to an embodiment of the disclosure.

FIG. 3 illustrates a schematic diagram of an aspect of supporting wireless communication network data collection according to an embodiment of the disclosure.

Referring to FIG. 3, FIG. 3 illustrates the process in which entities interact with each other for UE model information, which provides information for entities to make a UE model management decision on a UE model, so as to ensure the effectiveness of UE model distribution and/or training and/or inference, and reduce unnecessary model distribution and/or training and/or inference. In an implementation, for example, the first entity may be a gNB or a gNB CU-CP or gNB CU or gNB DU or an en-gNB or an eNB or an ng-eNB, and the second entity may be a gNB or a gNB CU-CP or gNB CU or gNB DU or an en-gNB or an eNB or an ng-eNB. In another implementation, for example, the first entity may be a gNB or a gNB CU-CP or gNB CU or gNB DU or an en-gNB or an eNB or an ng-eNB, and the second entity may be a UE. In another implementation, for example, the first entity may be an AMF or an SMF or an MME, and the second entity may be a gNB or a gNB CU-CP or gNB CU or gNB DU or an en-gNB or an eNB or an ng-eNB. In another implementation, for example, the first entity may be a gNB or a gNB CU-CP or gNB CU or gNB DU or an en-gNB or an eNB or an ng-eNB, and the second entity may be an AMF or an SMF or an MME.

Operation 301: The first entity sends a UE model information request message to the second entity to inform the second entity of the UE model information that needs to be fed back to the first entity. In an implementation, for example, the message may be the aforementioned first message including the UE model information request.

Operation 302: The second entity collects model information.

Operation 303: The second entity sends a message including UE model information to the first entity. In an implementation, for example, the message may be the aforementioned second message including UE model information. If the second entity cannot report the UE model information according to the request, it sends a UE model information request failure message to the first entity and does not perform operation 304. In an implementation, for example, the message may be the aforementioned third message including UE model information reporting failure information.

Operation 304: The first entity can make a UE model management decision, such as activation, deactivation, deletion, keep, inference content reporting decision and so on, for the UE model according to the UE model information.

Figure 4:
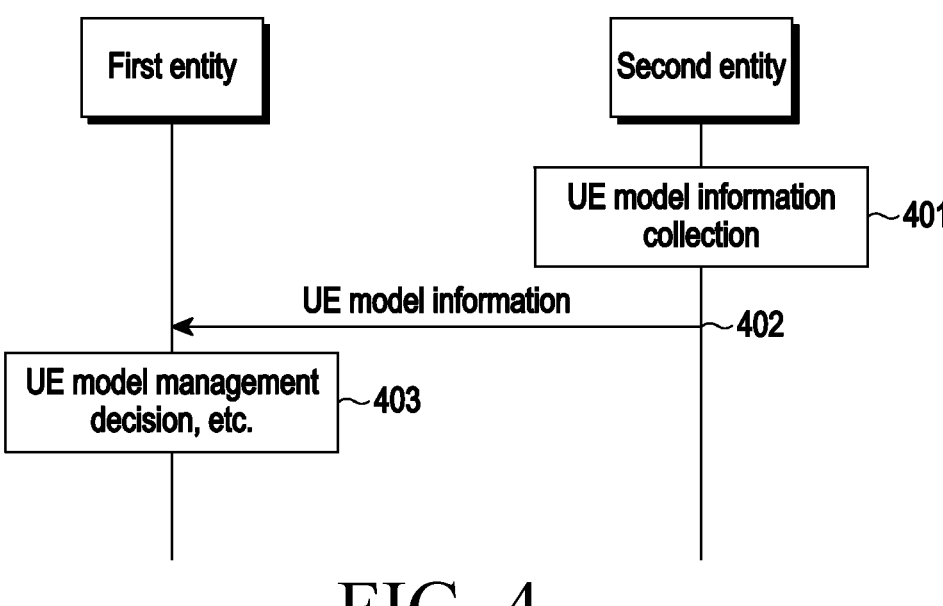
FIG. 4 is a schematic diagram illustrating an aspect of supporting wireless communication network data collection according to an embodiment of the disclosure.

FIG. 4 illustrates a schematic diagram of an aspect of supporting wireless communication network data collection according to an embodiment of the disclosure.

Referring to FIG. 4, FIG. 4 illustrates the process in which entities interact with each other for UE model information according to their own situations, which provides information for entities to make a UE model management decision on UE model, so as to ensure the effectiveness of UE model distribution and/or training and/or inference, and reduce unnecessary model distribution and/or training and/or inference. In an implementation, for example, the first entity may be a gNB or a gNB CU-CP or gNB CU or gNB DU or an en-gNB or an eNB or an ng-eNB, and the second entity may be a gNB or a gNB CU-CP or gNB CU or gNB DU or an en-gNB or an eNB or an ng-eNB. In another implementation, for example, the first entity may be a gNB or a gNB CU-CP or gNB CU or gNB DU or an en-gNB or an eNB or an ng-eNB, and the second entity may be a UE. In another implementation, for example, the first entity may be an AMF or an SMF or an MME, and the second entity may be a gNB or a gNB CU-CP or gNB CU or gNB DU or an en-gNB or an eNB or an ng-eNB. In another implementation, for example, the first entity may be a gNB or a gNB CU-CP or gNB CU or gNB DU or an en-gNB or an eNB or an ng-eNB, and the second entity may be an AMF or an SMF or an MME.

Operation 401: The second entity collects UE model information.

Operation 402: The second entity sends a message including UE model information to the first entity according to its own situation. In an implementation, for example, the message may be the aforementioned second message including UE model information.

Operation 403: The first entity can make a UE model management decision, such as activation, deactivation, deletion, keep, inference content reporting decision and so on, on the UE model according to the UE model information.

Figure 5:
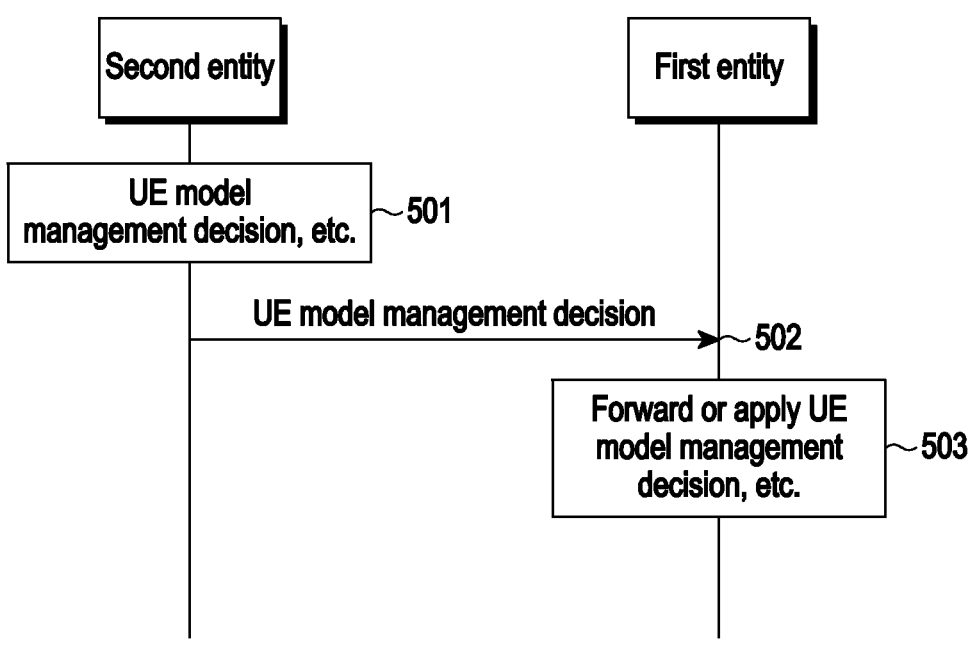
FIG. 5 is a schematic diagram showing an aspect of supporting wireless communication network data collection according to an embodiment of the disclosure.

FIG. 5 illustrates a schematic diagram of an aspect of supporting wireless communication network data collection according to an embodiment of the disclosure.

Referring to FIG. 5, FIG. 5 illustrates the process in which entities interact with each other for a UE model management decision according to their own situations, which directly or indirectly informs the UE of the model management decision made by an entity for the UE, so as to ensure the effectiveness of model distribution and/or training and/or inference of the UE and reduce unnecessary model distribution and/or training and/or inference. In an implementation, for example, the first entity may be a gNB or a gNB CU-CP or gNB CU or gNB DU or an en-gNB or an eNB or an ng-eNB, and the second entity may be a gNB or a gNB CU-CP or gNB CU or gNB DU or an en-gNB or an eNB or an ng-eNB. In another implementation, for example, the first entity may be a UE, and the second entity may be a gNB or a gNB CU-CP or gNB CU or gNB DU or an en-gNB or an eNB or an ng-eNB. In another implementation, for example, the first entity may be a gNB or a gNB CU-CP or gNB CU or gNB DU or an en-gNB or an eNB or an ng-eNB, and the second entity may be an AMF or an SMF or an MME. In another implementation, for example, the first entity may be an AMF or an SMF or an MME, and the second entity may be a gNB or a gNB CU-CP or gNB CU or gNB DU or an en-gNB or an eNB or an ng-eNB.

Operation 501: The second entity makes a UE model management decision according to the UE model information.

Operation 502: The second entity sends a message including the UE model management decision to the first entity according to its own situation. In an implementation, for example, the message may be the aforementioned fourth message including the UE model management decision.

Operation 503: The first entity may forward or apply the UE model management decision. If the first entity is a UE, the UE applies the UE model management decision: if the first entity is not a UE, the first entity forwards the UE model management decision to other entities, and indirectly notifies the UE of the UE model management decision.

Figure 6:
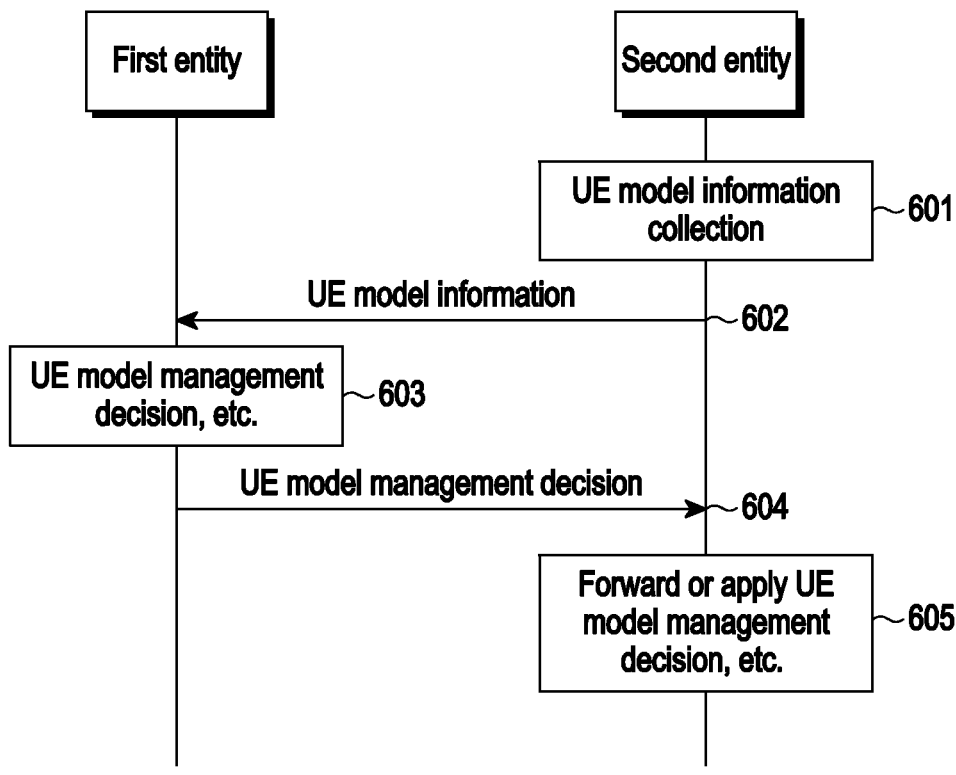
FIG. 6 is a schematic diagram illustrating an aspect of supporting wireless communication network data collection according to an embodiment of the disclosure.

FIG. 6 illustrates a schematic diagram of an aspect of supporting wireless communication network data collection according to an embodiment of the disclosure.

Referring to FIG. 6, FIG. 6 illustrates the process in which entities interact with each other for UE model information and UE model management decision, which directly or indirectly informs the UE of the model management decision made by an entity for the UE, so as to ensure the effectiveness of model distribution and/or training and/or inference of the UE and reduce unnecessary model distribution and/or training and/or inference. In an implementation, for example, the first entity may be a gNB or a gNB CU-CP or gNB CU or gNB DU or an en-gNB or an eNB or an ng-eNB, and the second entity may be a gNB or a gNB CU-CP or gNB CU or gNB DU or an en-gNB or an eNB or an ng-eNB. In another implementation, for example, the first entity may be a gNB or a gNB CU-CP or gNB CU or gNB DU or an en-gNB or an eNB or an ng-eNB, and the second entity may be a UE. In another implementation, for example, the first entity may be an AMF or an SMF or an MME, and the second entity may be a gNB or a gNB CU-CP or gNB CU or gNB DU or an en-gNB or an eNB or an ng-eNB. In another implementation, for example, the first entity may be a gNB or a gNB CU-CP or gNB CU or gNB DU or an en-gNB or an eNB or an ng-eNB, and the second entity may be an AMF or an SMF or an MME.

Operation 601: The second entity collects UE model information.

Operation 602: The second entity sends a message including UE model information to the first entity according to its own situation. In an implementation, for example, the message may be the aforementioned second message including UE model information.

Operation 603: The first entity can make a UE model management decision, such as activation, deactivation, deletion, keep, inference content reporting decision and so on, on the UE model according to the UE model information.

Operation 604: The first entity sends a message including the UE model management decision to the second entity. In an implementation, for example, the message may be the aforementioned fourth message including a UE model management decision.

Operation 605: The second entity may forward or apply the UE model management decision. If the second entity is a UE, the UE applies the UE model management decision; if the second entity is not a UE, the second entity forwards the UE model management decision to other entities to indirectly notify the UE of the UE model management decision.

Figure 7:
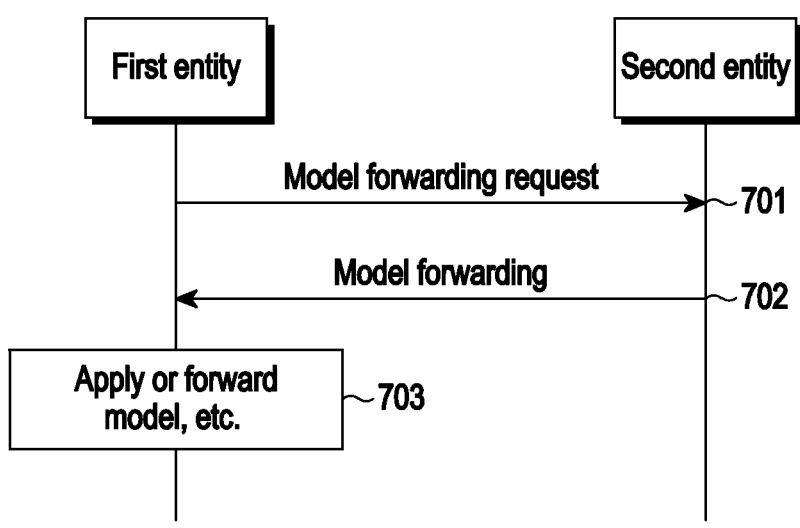
FIG. 7 is a schematic diagram showing an aspect of supporting wireless communication network data collection according to an embodiment of the disclosure.

FIG. 7 illustrates a schematic diagram of an aspect of supporting wireless communication network data collection according to an embodiment of the disclosure.

Referring to FIG. 7, FIG. 7 illustrates the process in which entities interact with each other for a model forwarding request and a model, through which the entities can acquire the model to ensure the subsequent performance of networks and/or the UE. In an implementation, for example, the first entity may be a gNB or a gNB CU-CP or gNB CU or gNB DU or an en-gNB or an eNB or an ng-eNB, and the second entity may be a gNB or a gNB CU-CP or gNB CU or gNB DU or an en-gNB or an eNB or an ng-eNB. In another implementation, for example, the first entity may be a gNB or a gNB CU-CP or gNB CU or gNB DU or an en-gNB or an eNB or an ng-eNB, and the second entity may be a UE. In another implementation, for example, the first entity may be an AMF or an SMF or an MME, and the second entity may be a gNB or a gNB CU-CP or gNB CU or gNB DU or an en-gNB or an eNB or an ng-eNB. In another implementation, for example, the first entity may be a gNB or a gNB CU-CP or gNB CU or gNB DU or an en-gNB or an eNB or an ng-eNB, and the second entity may be an AMF or an SMF or an MME. In another implementation, for example, the first entity may be a gNB CU and the second entity may be a gNB DU. In another implementation, for example, the first entity may be a gNB DU and the second entity may be a gNB CU. In yet another implementation, for example, the first entity may be a gNB CU-CP and the second entity may be a gNB CU-UP. In another implementation, for example, the first entity may be a gNB CU-UP and the second entity may be a gNB CU-CP.

Operation 701: The first entity sends a model forwarding request message to the second entity. In an implementation, for example, the message may be the aforementioned fifth message including the model forwarding request. In another implementation, for example, the message may be the aforementioned fourth message including the UE model management decision.

Operation 702: The second entity forwards a message including the model to the first entity according to the model forwarding request. In an implementation, for example, the message may be the aforementioned sixth message including the model. If the second entity cannot forward the model to the first entity according to the model forwarding request, a message including model forwarding request failure is sent to the first entity, and operation 703 is not performed. In an implementation, for example, the message may be the aforementioned seventh message including model forwarding failure.

Operation 703: The first entity may forward or apply the model. If the first entity is the target application entity of the model, the first entity applies the model: if the first entity is not the target application entity of the model, the first entity forwards the model to other entities to indirectly send the model to the target application entity.

Figure 8:
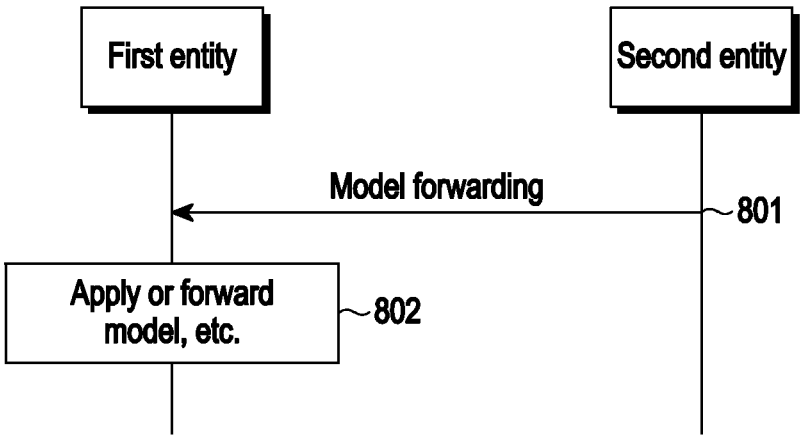
FIG. 8 is a schematic diagram showing an aspect of supporting wireless communication network data collection according to an embodiment of the disclosure.

FIG. 8 illustrates a schematic diagram of an aspect of supporting wireless communication network data collection according to an embodiment of the disclosure.

Referring to FIG. 8, FIG. 8 illustrates that an entity forwards a model according to its own situation, so that an entity can acquire the model to ensure the subsequent performance of the network and/or the UE. In an implementation, for example, the first entity may be a gNB or a gNB CU-CP or gNB CU or gNB DU or an en-gNB or an eNB or an ng-eNB, and the second entity may be a gNB or a gNB CU-CP or gNB CU or gNB DU or an en-gNB or an eNB or an ng-eNB. In another implementation, for example, the first entity may be a gNB or a gNB CU-CP or gNB CU or gNB DU or an en-gNB or an eNB or an ng-eNB, and the second entity may be a UE. In another implementation, for example, the first entity may be an AMF or an SMF or an MME, and the second entity may be a gNB or a gNB CU-CP or gNB CU or gNB DU or an en-gNB or an eNB or an ng-eNB. In another implementation, for example, the first entity may be a gNB or a gNB CU-CP or gNB CU or gNB DU or an en-gNB or an eNB or an ng-eNB, and the second entity may be an AMF or an SMF or an MME. In another implementation, for example, the first entity may be a gNB CU and the second entity may be a gNB DU. In another implementation, for example, the first entity may be a gNB DU and the second entity may be a gNB CU. In yet another implementation, for example, the first entity may be a gNB CU-CP and the second entity may be a gNB CU-UP. In another implementation, for example, the first entity may be a gNB CU-UP and the second entity may be a gNB CU-CP.

Operation 801: The second entity forwards a message including the model to the first entity according to its own situation. In an implementation, for example, the message may be the aforementioned sixth message including the model.

Operation 802: The first entity may forward or apply the model. If the first entity is the target application entity of the model, the first entity applies the model: if the first entity is not the target application entity of the model, the first entity forwards the model to other entities to indirectly send the model to the target application entity.

Figure 9:
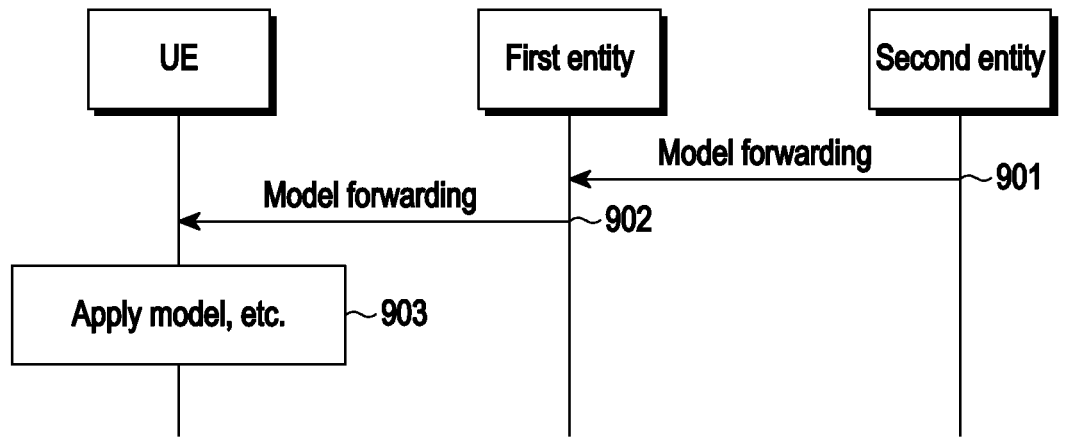
FIG. 9) is a schematic diagram showing an aspect of supporting wireless communication network data collection according to an embodiment of the disclosure.

FIG. 9) illustrates a schematic diagram of an aspect of supporting wireless communication network data collection according to an embodiment of the disclosure.

Referring to FIG. 9, FIG. 9 illustrates that an entity forwards a model according to its own situation, so that an entity can acquire the model and forward it to the UE, so as to ensure the subsequent performance of the network and/or the UE. In an implementation, for example, the first entity may be a gNB or a gNB CU-CP or gNB CU or gNB DU or an en-gNB or an eNB or an ng-eNB, and the second entity may be a gNB or a gNB CU-CP or gNB CU or gNB DU or an en-gNB or an eNB or an ng-eNB. In another implementation, for example, the first entity may be a gNB or a gNB CU-CP or gNB CU or gNB DU or an en-gNB or an eNB or an ng-eNB, and the second entity may be an AMF or an SMF or an MME. In another implementation, for example, the first entity may be a gNB CU and the second entity may be a gNB DU. In another implementation, for example, the first entity may be a gNB DU and the second entity may be a gNB CU. In yet another implementation, for example, the first entity may be a gNB CU-CP and the second entity may be a gNB CU-UP. In another implementation, for example, the first entity may be a gNB CU-UP and the second entity may be a gNB CU-CP.

Operation 901: The second entity forwards a message including a model to the first entity according to its own situation and/or based on a model forwarding request of the first entity. In an implementation, for example, the message may be the aforementioned sixth message including the model.

Operation 902: The first entity forwards the message including the model to the UE. In an implementation, for example, the message may be the aforementioned sixth message including the model.

Operation 903: The UE applies the received model.

Figure 10:
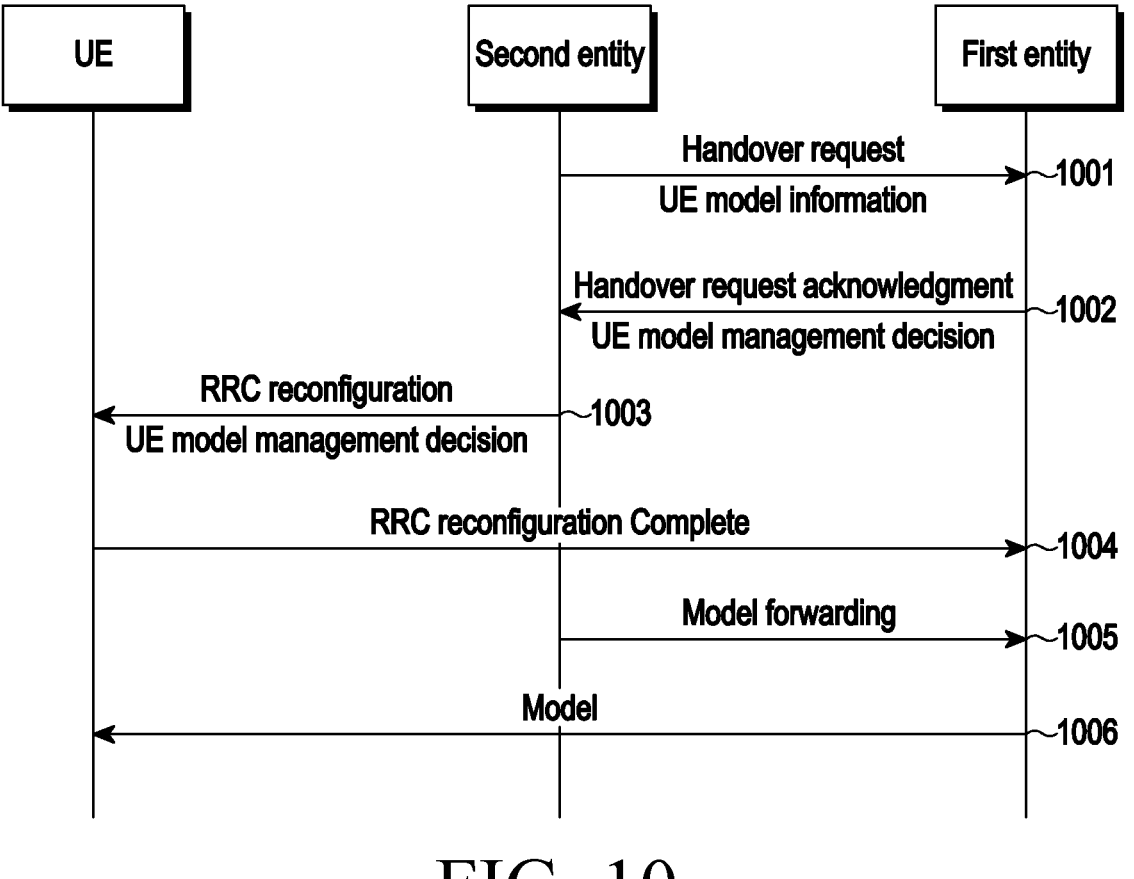
FIG. 10 is a schematic diagram illustrating an aspect of supporting wireless communication network data collection according to an embodiment of the disclosure.

FIG. 10 illustrates a schematic diagram of an aspect of supporting wireless communication network data collection according to an embodiment of the disclosure.

Referring to FIG. 10, FIG. 10 illustrates a process in which entities interact with each other for UE model information and UE model management decision in a mobility scenario, which directly or indirectly informs the UE of the UE model management decision of the entities, so as to ensure the effectiveness of model distribution and/or training and/or inference of the UE and reduce unnecessary model distribution and/or training and/or inference. In an implementation, for example, the first entity may be a gNB or a gNB CU-CP or gNB CU or gNB DU or an en-gNB or an eNB or an ng-eNB, and the second entity may be a gNB or a gNB CU-CP or gNB CU or gNB DU or an en-gNB or an eNB or an ng-eNB.

Operation 1001: The second entity sends UE model information to the first entity in a handover request message for the UE, so as to inform the first entity of the UE model information. In an implementation, for example, the message may be the aforementioned second message including UE model information.

Operation 1002: The first entity makes a UE model management decision on the model of the UE. The first entity sends a UE model management decision to the second entity in a handover request acknowledgment message for the UE to inform the second entity of the UE model management decision. In an implementation, for example, the message may be the aforementioned fourth message including a UE model management decision.

Operation 1003: The second entity sends an RRC reconfiguration message carrying the UE model management decision to inform the UE of UE model management decision therefor. In an implementation, for example, the message may be the aforementioned fourth message including a UE model management decision.

Operation 1004: The UE sends an RRC reconfiguration complete message to the first entity.

If the UE model information in operation 1001 includes information indicating that there is an incompletely downloaded model, and the UE model management decision in operation 1002 requires the second entity to forward the model, operation 1005 is performed.

Operation 1005: The second entity forwards a message including the model to the first entity. In an implementation, for example, the message may be the aforementioned sixth message including the model.

If the UE model information in operation 1001 includes information indicating that there is an incompletely downloaded model, and/or the first entity decides to distribute the model to the UE, operation 1006 is performed.

Operation 1006: The first entity sends a message including the model to the UE. In an implementation, for example, the message may be the aforementioned sixth message including the model.

Operation 1005 can be performed before and/or simultaneously with operation 1003 and operation 1004.

Figure 11:
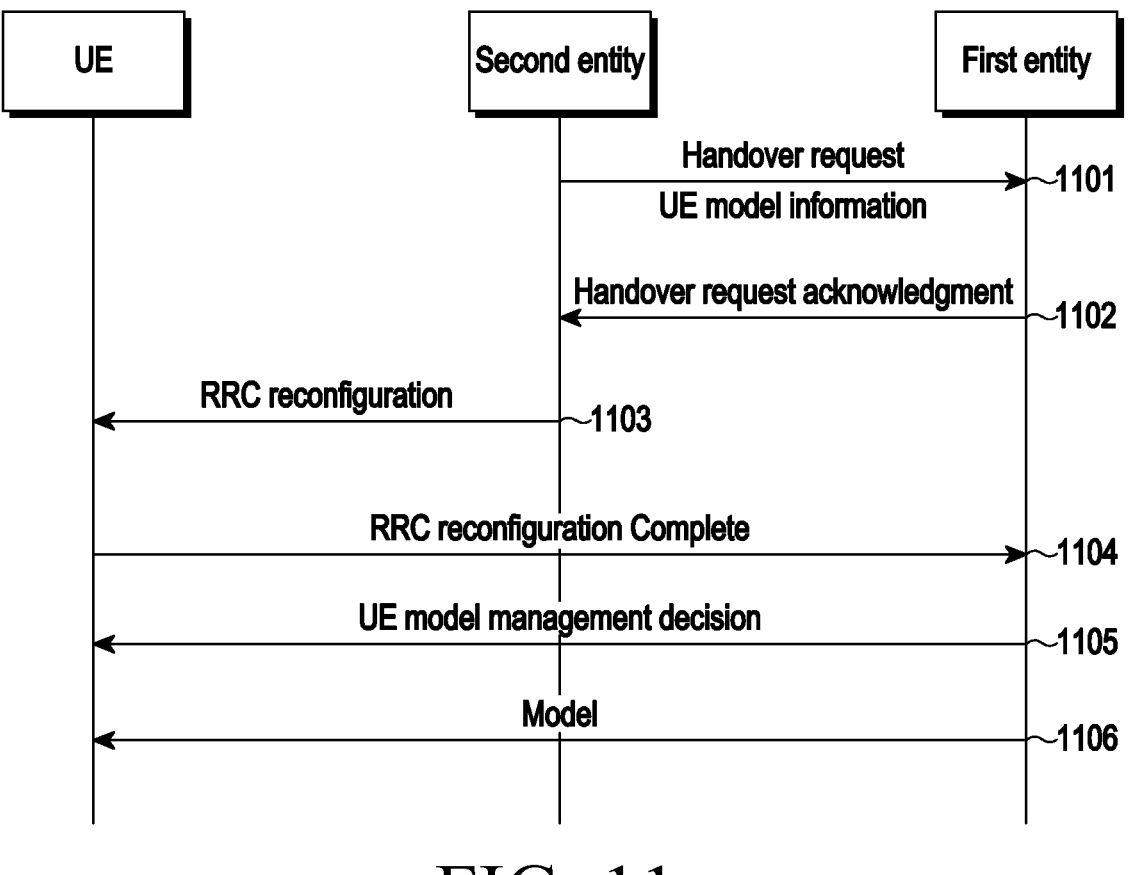
FIG. 11 is a schematic diagram illustrating an aspect of supporting wireless communication network data collection according to an embodiment of the disclosure.

FIG. 11 illustrates a schematic diagram of an aspect of supporting wireless communication network data collection according to an embodiment of the disclosure.

Referring to FIG. 11, FIG. 11 illustrates a process in which entities interact with each other for UE model information in a mobility scenario, through which the entities can make a UE model management decision on a UE, and inform the UE of the entity model management decision on the UE, so as to ensure the effectiveness of model distribution and/or training and/or inference of the UE, and reduce unnecessary model distribution and/or training and/or inference. In an implementation, for example, the first entity may be a gNB or a gNB CU-CP or gNB CU or gNB DU or an en-gNB or an eNB or an ng-eNB, and the second entity may be a gNB or a gNB CU-CP or gNB CU or gNB DU or an en-gNB or an eNB or an ng-eNB.

Operation 1101: The second entity sends the UE model information to the first entity in a handover request message for the UE, so as to inform the first entity of the UE model information. In an implementation, for example, the message may be the aforementioned second message including UE model information.

Operation 1102: The first entity sends a handover request acknowledgment message to the second entity.

Operation 1103: The second entity sends an RRC reconfiguration message to the UE.

Operation 1104: The UE sends an RRC reconfiguration complete message to the first entity.

Operation 1105: The first entity makes a UE model management decision on the UE model. The first entity sends a message including a UE model management decision to the UE to inform the UE of a UE model management decision therefor. In an implementation, for example, the message may be the aforementioned fourth message including a UE model management decision.

If the UE model information in operation 1101 includes information indicating that there is an incompletely downloaded model, and/or the first entity decides to distribute the model to the UE, operation 1106 is performed.

Operation 1106: The first entity sends a message including the model to the UE. In an implementation, for example, the message may be the aforementioned sixth message including the model.

Figure 12:
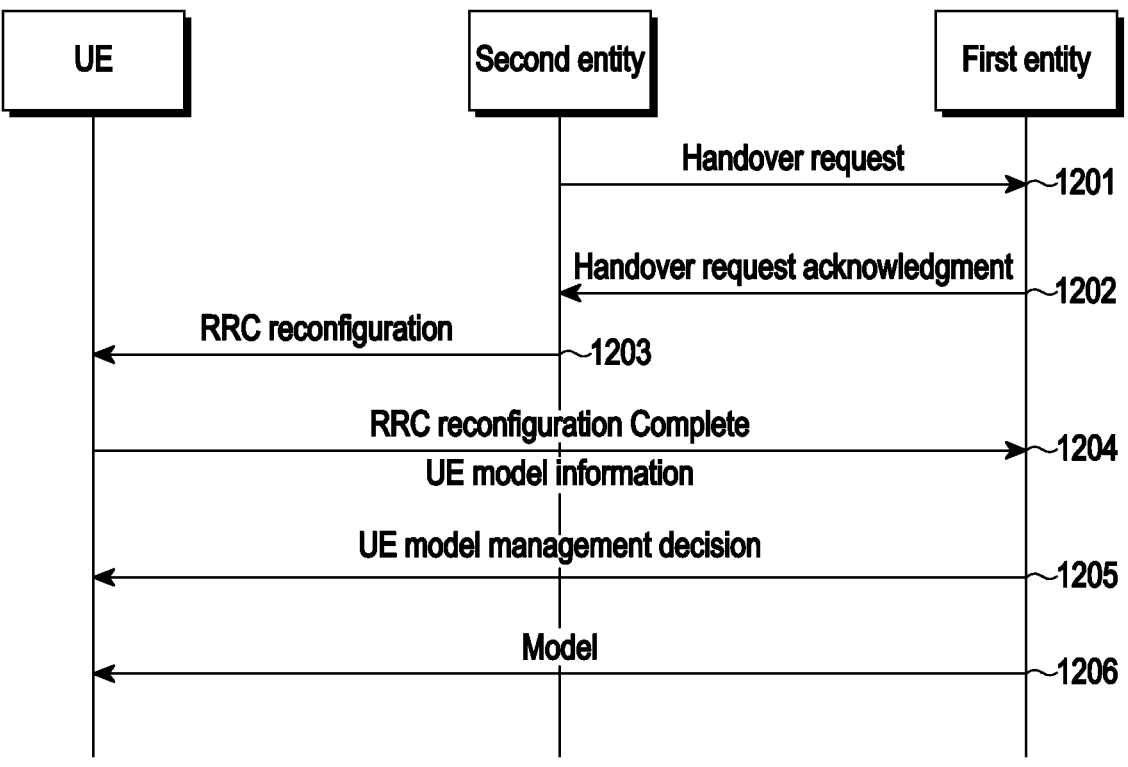
FIG. 12 is a schematic diagram illustrating an aspect of supporting wireless communication network data collection according to an embodiment of the disclosure.

FIG. 12 illustrates a schematic diagram of an aspect of supporting wireless communication network data collection according to an embodiment of the disclosure.

Referring to FIG. 12, FIG. 12 illustrates a process in which a UE and entities interact with each other for UE model information and UE model management decision in a mobility scenario, which informs the UE of the model management decision made by the entities on the UE, to ensure the effectiveness of model distribution and/or training and/or inference of the UE and reduce unnecessary model distribution and/or training and/or inference. In an implementation, for example, the first entity may be a gNB or a gNB CU-CP or gNB CU or gNB DU or an en-gNB or an eNB or an ng-eNB, and the second entity may be a gNB or a gNB CU-CP or gNB CU or gNB DU or an en-gNB or an eNB or an ng-eNB.

Operation 1201: The second entity sends a handover request to the first entity for the UE.

Operation 1202: The first entity sends a handover request acknowledgment message to the second entity.

Operation 1203: The second entity sends an RRC reconfiguration message to the UE.

Operation 1204: The UE sends an RRC reconfiguration complete message to the first entity, and the message carries UE model information to inform the first entity of the UE model information of the UE. In an implementation, for example, the message may be the aforementioned second message including UE model information.

Operation 1205: The first entity makes a UE model management decision on the model of the UE. The first entity sends a message including a UE model management decision to the UE to inform the UE of a UE model management decision therefor. In an implementation, for example, the message may be the aforementioned fourth message including a UE model management decision.

If the UE model information in operation 1204 includes information indicating that there is an incompletely downloaded model, and/or the first entity decides to distribute the model to the UE, operation 1206 is performed.

Operation 1206: The first entity sends a message including the model to the UE. In an implementation, for example, the message may be the aforementioned sixth message including the model.

Figure 13:
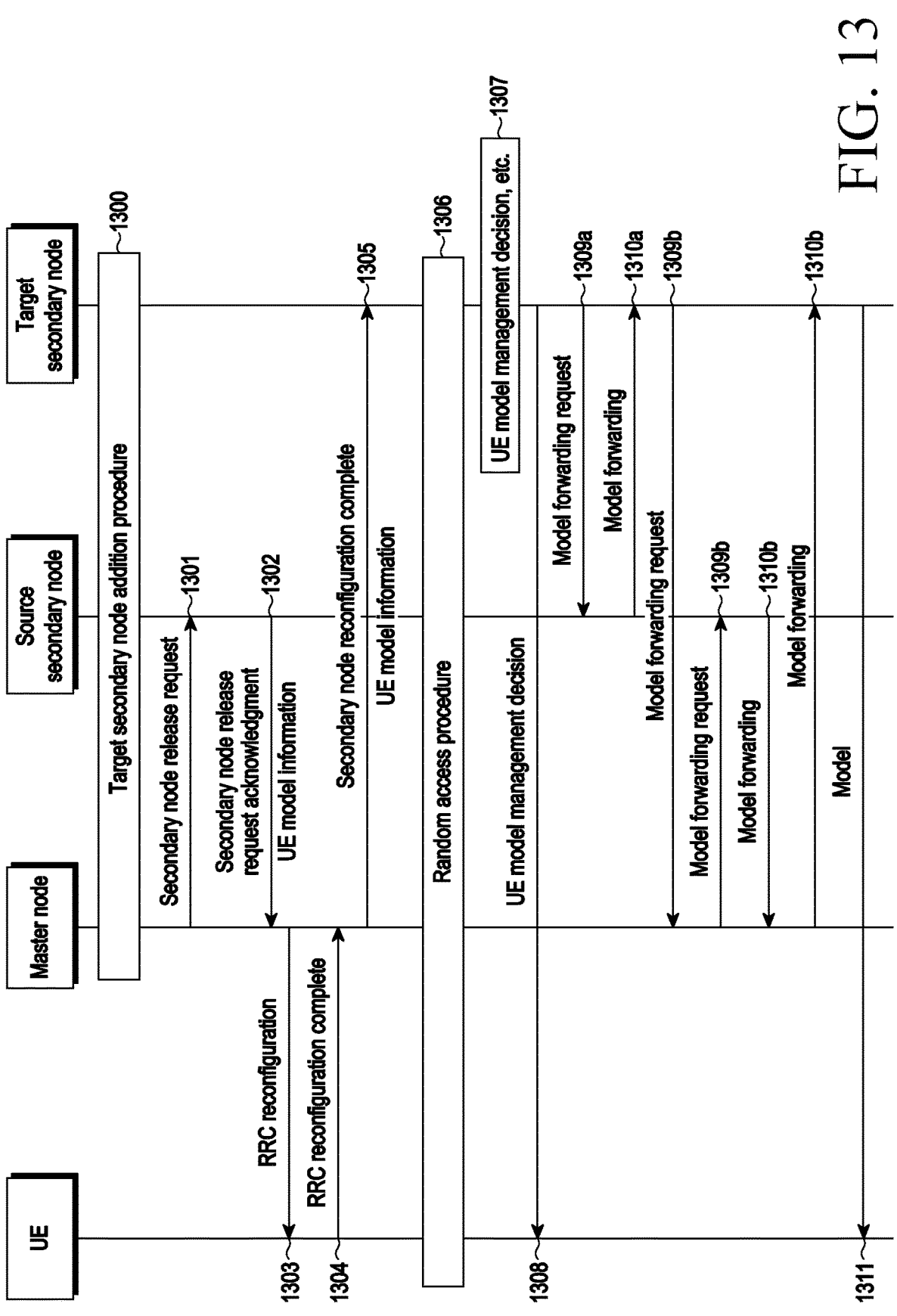
FIG. 13 is a schematic diagram illustrating an aspect of supporting wireless communication network data collection according to an embodiment of the disclosure.

FIG. 13 illustrates a schematic diagram of an aspect of supporting wireless communication network data collection according to an embodiment of the disclosure.

Referring to FIG. 13, FIG. 13 illustrates that in a dual-connectivity mobility scenario, entities interact with each other for UE model information to provide reference information for a UE model management decision, so that the UE can acquire and apply the UE model management decision made by an entity, so as to ensure the effectiveness of model distribution and/or training and/or inference of the UE and reduce unnecessary model distribution and/or training and/or inference.

Operation 1300: The master node, the source secondary node and the target secondary node perform a target secondary node addition procedure.

Operation 1301: The master node sends a secondary node release request to the source secondary node.

Operation 1302: The source secondary node sends a secondary node request acknowledgment message carrying UE model information to the master node. In an implementation, for example, the message may be the aforementioned second message including UE model information.

Operation 1303: The master node sends an RRC reconfiguration message to the UE.

Operation 1304: The UE sends an RRC reconfiguration complete message to the master node.

Operation 1305: The master node sends a secondary node reconfiguration complete message carrying UE model information to the target secondary node. In an implementation, for example, the message may be the aforementioned second message including UE model information.

Operation 1306: The UE performs random access procedure with the target secondary node.

Operation 1307: The target secondary node makes a UE model management decision according to the received UE model information.

Operation 1308: The target secondary node sends a message including the UE model management decision to the UE to inform the UE of the UE model management decision therefor. In an implementation, for example, the message may be the aforementioned fourth message including a UE model management decision.

If the UE model management decision in operation 1307 requires model forwarding, operation 1309_a_ and operation 1310_a_ are performed, or operation 1309_b_ and operation 1310_b_ are performed.

Operation 1309_a_: The target secondary node sends a model forwarding request message to the source secondary node. In an implementation, for example, the message may be the aforementioned fifth message including the model forwarding request.

Operation 1310_a_: The source secondary node forwards the message including the model to the target secondary node based on the received model forwarding request. In an implementation, for example, the message may be the aforementioned sixth message including the model.

Operation 1309_b_: the target secondary node sends a model forwarding request message to the source secondary node through the master node. In an implementation, for example, the message may be the aforementioned fifth message including the model forwarding request.

Operation 1310_b_: The source secondary node forwards the message including the model to the target secondary node through the master node based on the received model forwarding request. In an implementation, for example, the message may be the aforementioned sixth message including the model.

If the UE model information in operation 1305 includes information indicating that there is an incompletely downloaded model, and/or the target secondary node decides to distribute the model to the UE, operation 1311 is performed.

Operation 1311: The target secondary node sends a message including the model to the UE. In an implementation, for example, the message may be the aforementioned sixth message including the model.

Operation 1307 may be performed before or simultaneously with operation 1306. Operations 1309_a_ and 1310_b_ and/or 1309_b_ and 1310_b_ may be performed be performed before or simultaneously with operation 1308.

Figure 14:
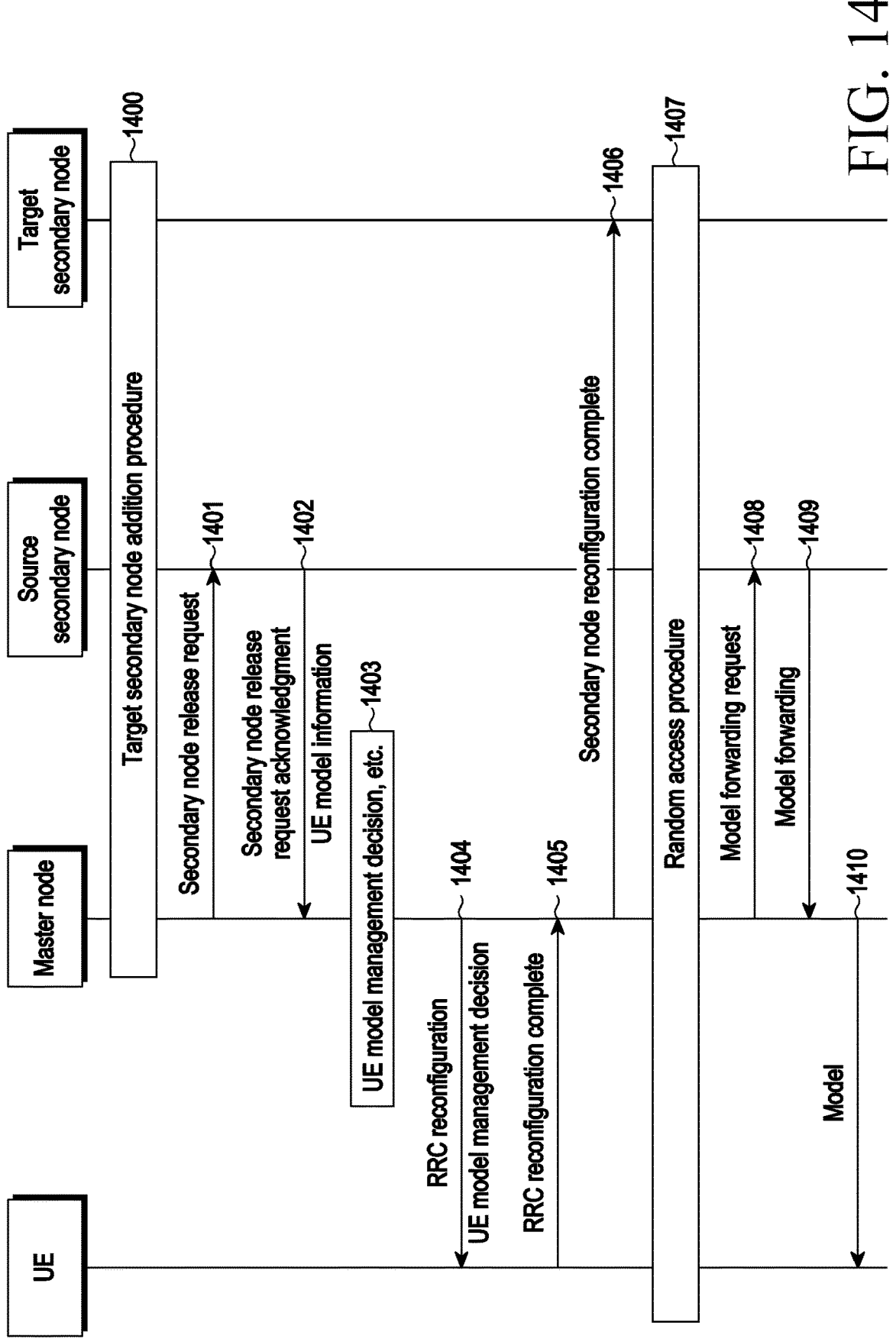
FIG. 14 is a schematic diagram illustrating an aspect of supporting wireless communication network data collection according to an embodiment of the disclosure.

FIG. 14 illustrates a schematic diagram of an aspect of supporting wireless communication network data collection according to an embodiment of the disclosure.

Referring to FIG. 14, FIG. 14 illustrates that in a dual-connectivity mobility scenario, entities interact with each other for UE model information to provide reference information for a UE model management decision, so that the UE can acquire and apply the UE model management decision made by entities for the UE, so as to ensure the effectiveness of model distribution and/or training and/or inference of UE and reduce unnecessary model distribution and/or training and/or inference.

Operation 1400: The master node, the source secondary node and the target secondary node perform target secondary node addition procedure.

Operation 1401: The master node sends a secondary node release request to the source secondary node.

Operation 1402: The source secondary node sends a secondary node request acknowledgment message carrying UE model information to the master node. In an implementation, for example, the message may be the aforementioned second message including UE model information.

Operation 1403: The master node makes a UE model management decision according to the received UE model information.

Operation 1404: The master node sends an RRC reconfiguration message carrying the UE model management decision to the UE. In an implementation, for example, the message may be the aforementioned fourth message including a UE model management decision.

Operation 1405: The UE sends an RRC reconfiguration complete message to the master node.

Operation 1406: The master node sends a secondary node reconfiguration complete message to the target secondary node.

Operation 1407: The UE performs random access procedure with the target secondary node.

If the UE model management decision in operation 1403 requires model forwarding, operation 1408 and operation 1409 are performed.

Operation 1408: The master node sends a model forwarding request message to the source secondary node. In an implementation, for example, the message may be the aforementioned fifth message including the model forwarding request.

Operation 1409: The source secondary node forwards a message including the model to the master node based on the received model forwarding request. In an implementation, for example, the message may be the aforementioned sixth message including the model.

If the UE model information in operation 1402 includes information indicating that there is an incompletely downloaded model, and/or the master node decides to distribute the model to the UE, operation 1410 is performed.

Operation 1410: The master node sends a message including the model to the UE. In an implementation, for example, the message may be the aforementioned sixth message including the model.

Operations 1408 and 1409 can be performed before or simultaneously with operations 1404, 1405, 1406 and 1407.

Figure 15:
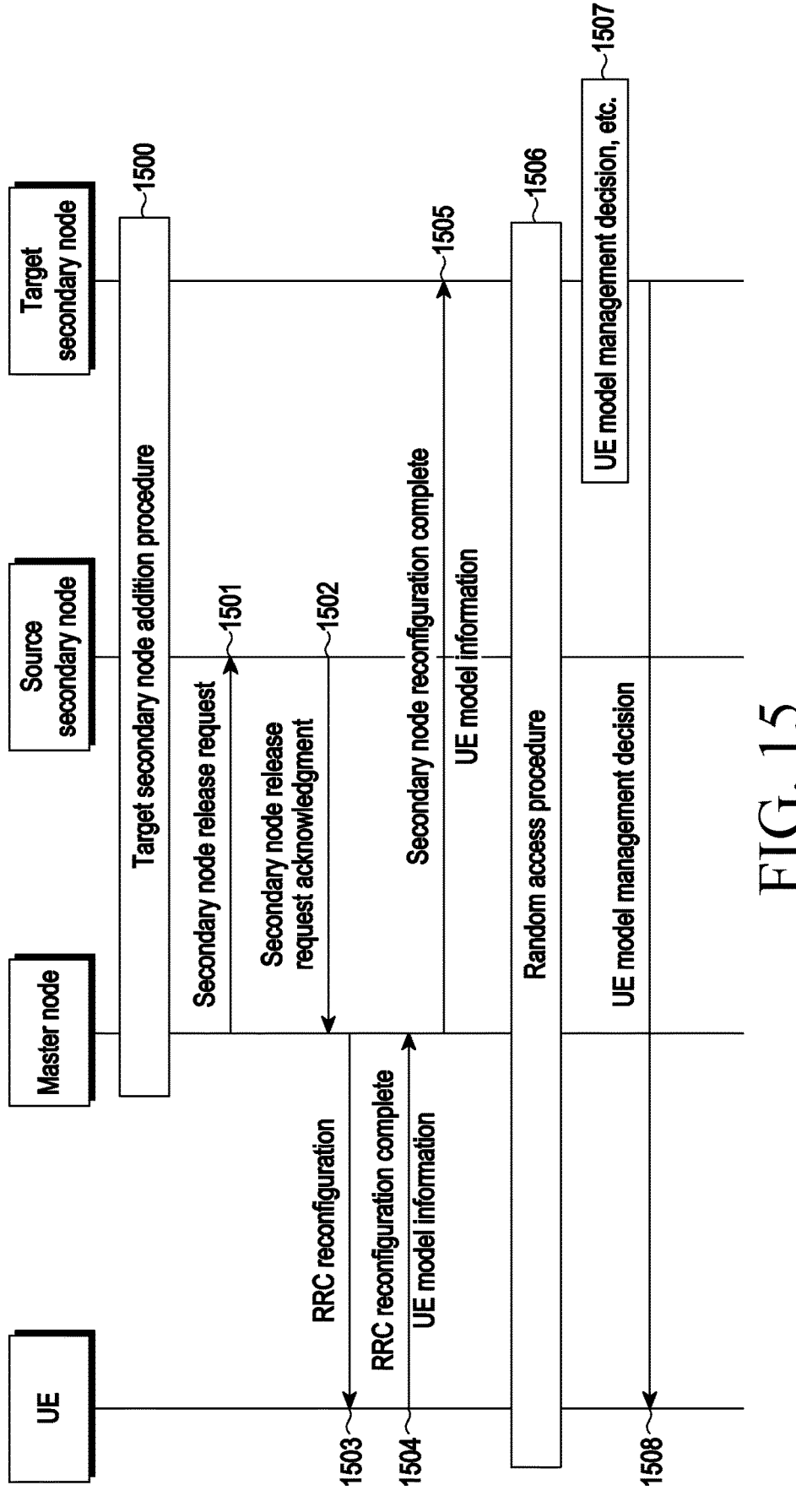
FIG. 15 is a schematic diagram illustrating an aspect of supporting wireless communication network data collection according to an embodiment of the disclosure.

FIG. 15 illustrates a schematic diagram of an aspect of supporting wireless communication network data collection according to an embodiment of the disclosure.

Referring to FIG. 15, FIG. 15 illustrates that in the dual-connectivity mobility scenario, the UE reports the UE model information to provide reference information for the entity to make a UE model management decision, so that the UE can acquire and apply the UE model management decision made by the entity for the UE, so as to ensure the effectiveness of the model distribution and/or training and/or inference of the UE and reduce unnecessary model distribution and/or training and/or inference.

Operation 1500: The master node, the source secondary node and the target secondary node perform target secondary node addition procedure.

Operation 1501: The master node sends a secondary node release request to the source secondary node.

Operation 1502: The source secondary node sends a secondary node request acknowledgment message to the master node.

Operation 1503: The master node sends an RRC reconfiguration message to the UE.

Operation 1504: The UE sends an RRC reconfiguration complete message carrying UE model information to the master node. In an implementation, for example, the message may be the aforementioned second message including UE model information.

Operation 1505: The master node sends a secondary node reconfiguration complete message carrying UE model information to the target secondary node. In an implementation, for example, the message may be the aforementioned second message including UE model information.

Operation 1506: The UE performs random access procedure with the target secondary node.

Operation 1507: The target secondary node makes a UE model management decision according to the received UE model information.

Operation 1508: The target secondary node sends a message including the UE model management decision to the UE to inform the UE of the UE model management decision for the UE. In an implementation, for example, the message may be the aforementioned fourth message including UE model management decision.

Operation 1507 may be performed before or simultaneously with operation 1506.

Figure 16:
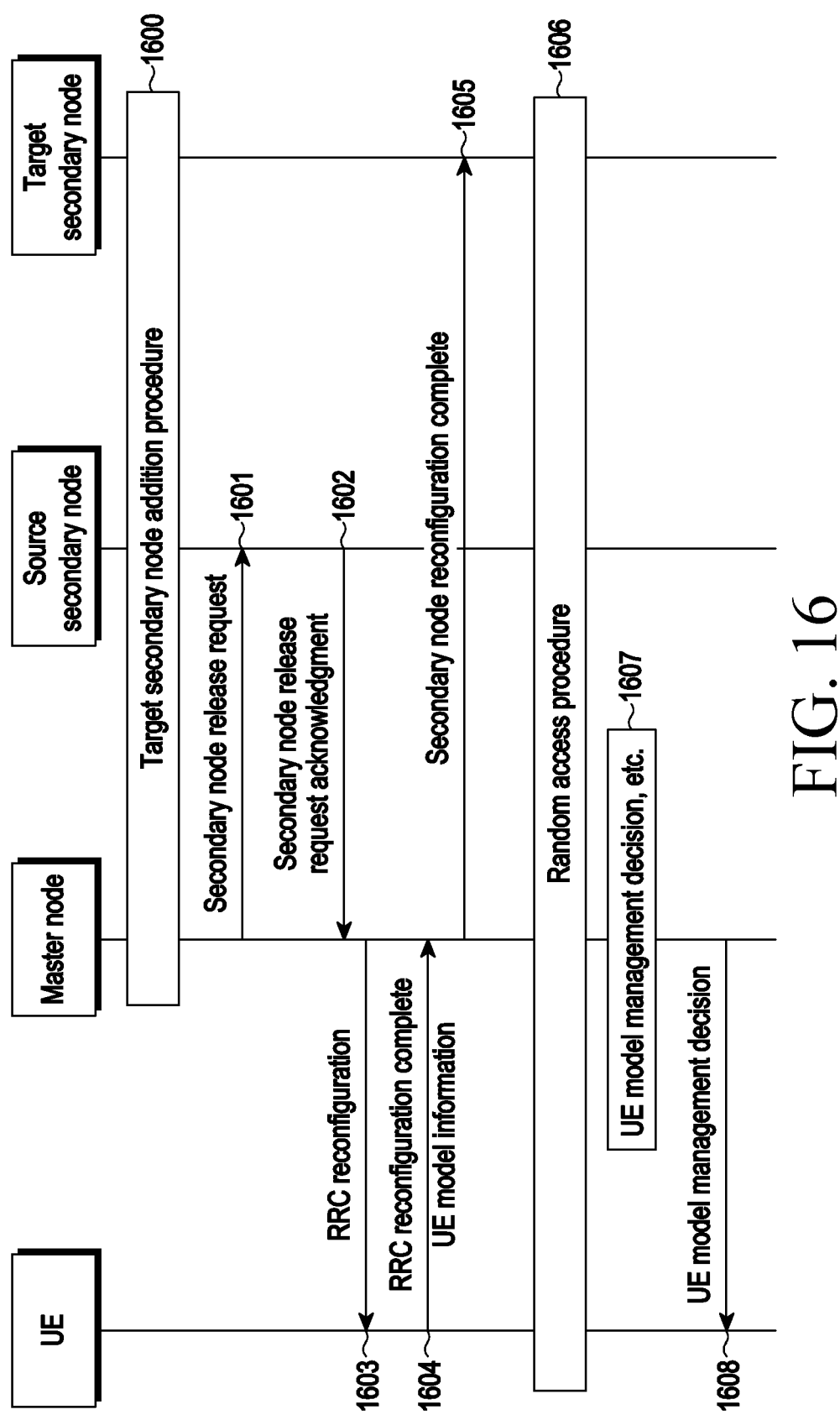
FIG. 16 is a schematic diagram illustrating an aspect of supporting wireless communication network data collection according to an embodiment of the disclosure.

FIG. 16 illustrates a schematic diagram of an aspect of supporting wireless communication network data collection according to an embodiment of the disclosure.

Referring to FIG. 16, FIG. 16 illustrates that in the dual-connectivity mobility scenario, the UE reports the UE model information to provide reference information for the entity to make a UE model management decision, so that the UE can acquire and apply the UE model management decision made by the entity for the UE, so as to ensure the effectiveness of the model distribution and/or training and/or inference of the UE and reduce unnecessary model distribution and/or training and/or inference.

Operation 1600: The master node, the source secondary node and the target secondary node perform target secondary node addition procedure.

Operation 1601: The master node sends a secondary node release request to the source secondary node.

Operation 1602: The source secondary node sends a secondary node request acknowledgment message to the master node.

Operation 1603: The master node sends an RRC reconfiguration message to the UE.

Operation 1604: The UE sends an RRC reconfiguration complete message carrying UE model information to the master node. In an implementation, for example, the message may be the aforementioned second message including UE model information.

Operation 1605: The master node sends a secondary node reconfiguration complete message to the target secondary node.

Operation 1606: The UE performs random access procedure with the target secondary node.

Operation 1607: The master node makes a UE model management decision according to the received UE model information.

Operation 1608: The master node sends a message including the UE model management decision to inform the UE of the UE model management decision for the UE. In an implementation, for example, the message may be the aforementioned fourth message including a UE model management decision.

Operations 1607 and 1608 can be performed before or simultaneously with operations 1605 and 1606.

Figure 17:
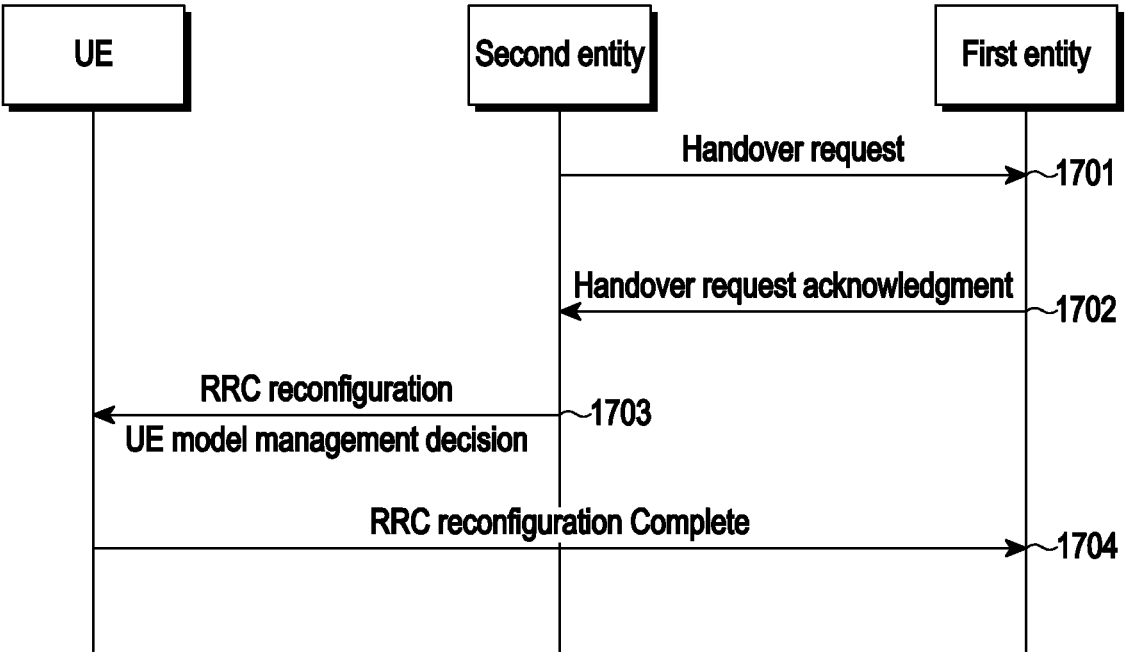
FIG. 17 is a schematic diagram illustrating an aspect of supporting wireless communication network data collection according to an embodiment of the disclosure.

FIG. 17 illustrates a schematic diagram of an aspect of supporting wireless communication network data collection according to an embodiment of the disclosure.

Referring to FIG. 17, FIG. 17 illustrates the process in which an entity informs the UE of a UE model management decision in a mobility scenario, which informs the UE of the model management decision for the UE to ensure the effectiveness of model distribution and/or training and/or inference of the UE and reduce unnecessary model distribution and/or training and/or inference. In an implementation, for example, the first entity may be a gNB or a gNB CU-CP or gNB CU or gNB DU or an en-gNB or an eNB or an ng-eNB, and the second entity may be a gNB or a gNB CU-CP or gNB CU or gNB DU or an en-gNB or an eNB or an ng-eNB.

Operation 1701: The second entity sends a handover request for the UE to the first entity.

Operation 1702: The first entity responds to the second entity with a handover request acknowledgment.

Operation 1703: The second entity makes a UE model management decision on the UE. The second entity sends an RRC reconfiguration message carrying the UE model management decision to the UE to inform the UE of the UE model management decision for the UE. In an implementation, for example, the message may be the aforementioned fourth message including a UE model management decision.

Operation 1704: The UE sends an RRC reconfiguration complete message to the first entity.

Figure 18:
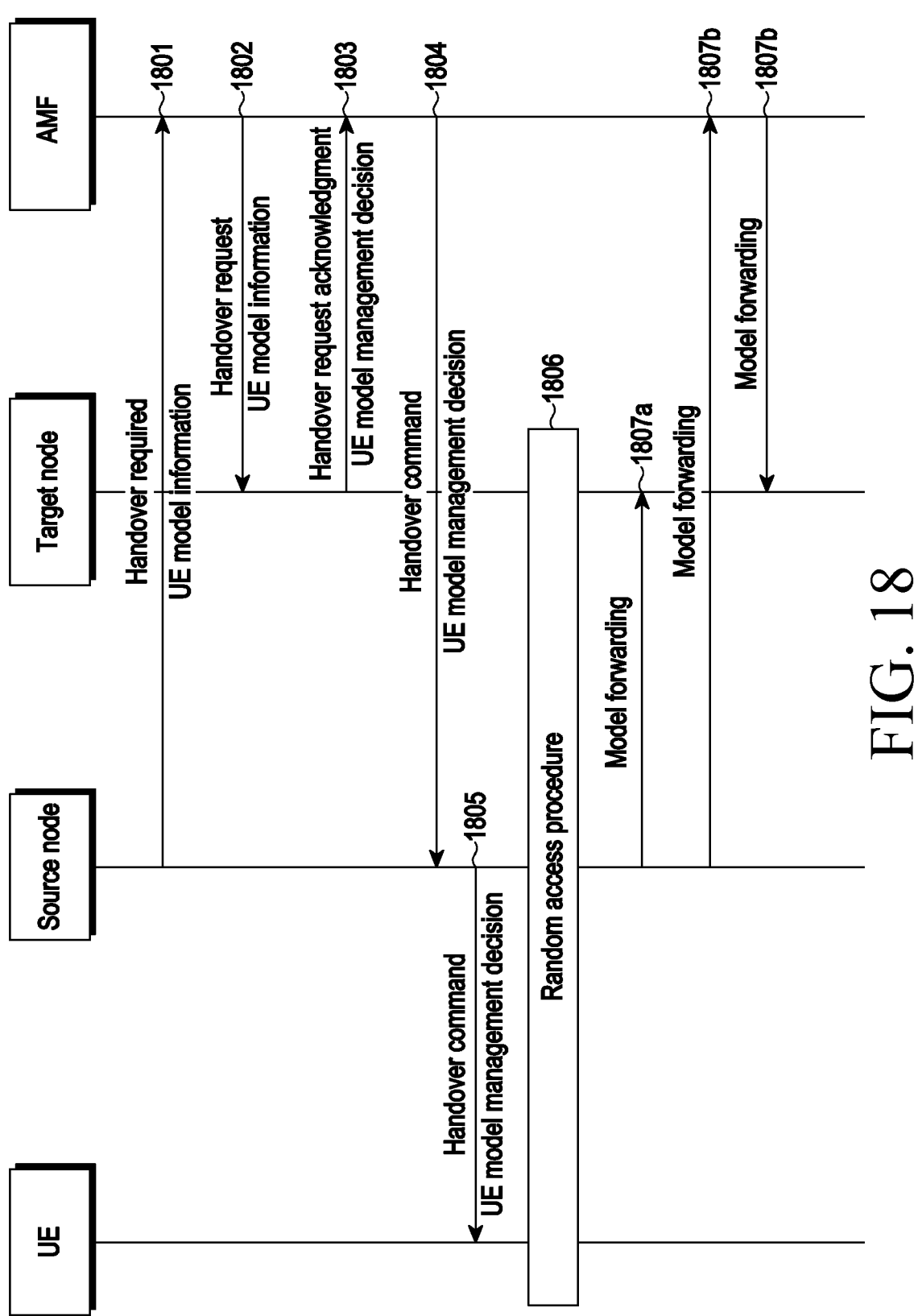
FIG. 18 is a schematic diagram illustrating an aspect of supporting wireless communication network data collection according to an embodiment of the disclosure.

FIG. 18 illustrates a schematic diagram of an aspect of supporting wireless communication network data collection according to an embodiment of the disclosure.

Referring to FIG. 18, FIG. 18 illustrates that in a mobility scenario, during the procedure of NG-based handover, entities interact with each other for UE model information to provide reference information for a UE model management decision, so that the UE can acquire and apply the UE model management decision made by the entities for the UE, so as to ensure the effectiveness of model distribution and/or training and/or inference of the UE and reduce unnecessary model distribution and/or training and/or inference.

Operation 1801: The source node sends a handover required message carrying UE model information to the AMF. In an implementation, for example, the message may be the aforementioned second message including UE model information.

Operation 1802: The AMF sends a handover request message carrying the UE model information to the target node. In an implementation, for example, the message may be the aforementioned second message including UE model information.

Operation 1803: The target node sends a handover request acknowledgment message carrying the UE model management decision to the AMF. In an implementation, for example, the message may be the aforementioned fourth message including a UE model management decision.

Operation 1804: The AMF sends a handover command message carrying the UE model management decision to the source node. In an implementation, for example, the message may be the aforementioned fourth message including a UE model management decision.

Operation 1805: The source node sends a handover command message carrying the UE model management decision to the UE to inform the UE of the UE model management decision for the UE. In an implementation, for example, the message may be the aforementioned fourth message including a UE model management decision.

Operation 1806: The UE performs a random access procedure with the target node.

If the UE model management decision in operation 1803 and operation 1804 requires model forwarding, operation 1807a or operation 1807b is performed.

Operation 1807a: The source secondary node forwards the message including the model to the target secondary node based on the received UE model management decision. In an implementation, for example, the message may be the aforementioned sixth message including the model.

Operation 1807b: The source secondary node forwards the message including the model to the target secondary node through the AMF based on the received UE model management decision. In an implementation, for example, the message may be the aforementioned sixth message including the model.

Operation 1807a and/or operation 1807b may be performed before or simultaneously with operation 1805 and/or operation 1806.

Figure 19:
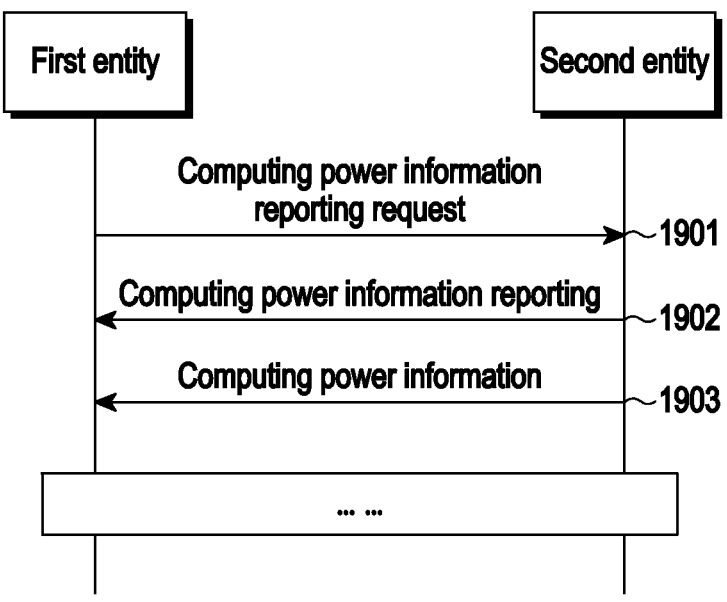
FIG. 19 is a schematic diagram illustrating an aspect of supporting wireless communication network data collection according to an embodiment of the disclosure.

FIG. 19 illustrates a schematic diagram of an aspect of supporting wireless communication network data collection according to an embodiment of the disclosure.

Referring to FIG. 19, FIG. 19 illustrates a procedure in which entities interact with each other for computing power information to send a computing power information reporting request message to the second entity. After receiving the message, the second entity needs to report the computing information to the first entity according to the computing information reporting request, so that the first entity can acquire the computing information of the second entity, so as to ensure the subsequent performance of the network and/or the UE. In an implementation, for example, the first entity may be a gNB or a gNB CU-CP or gNB CU or gNB DU or an en-gNB or an eNB or an ng-eNB, and the second entity may be a gNB or a gNB CU-CP or gNB CU or gNB DU or an en-gNB or an eNB or an ng-eNB. In another implementation, for example, the first entity may be a gNB or a gNB CU-CP or gNB CU or gNB DU or an en-gNB or an eNB or an ng-eNB, and the second entity may be a UE. In another implementation, for example, the first entity may be an AMF or an SMF or an MME, and the second entity may be a gNB or a gNB CU-CP or gNB CU or gNB DU or an en-gNB or an eNB or an ng-eNB. In another implementation, for example, the first entity may be a gNB CU and the second entity may be a gNB DU. In yet another implementation, for example, the first entity may be a gNB CU-CP and the second entity may be a gNB CU-UP.

Operation 1901: The first entity sends a computing power information reporting request message to the second entity, so that the second entity can report the computing power information according to the request. In an implementation, for example, the request message may be the aforementioned eighth message including a computing power information reporting request.

Operation 1902: The second entity sends a message including computing power information in response to the computing power information reporting request. In an implementation, for example, the message may be the ninth message including a computing power information reporting response, or the tenth message including computing power information. If the second entity cannot report the computing power information according to the request, it sends a message including computing power information reporting request failure to the first entity, and does not perform operation 1903. In an implementation, for example, the message may be the eleventh message including computing power information reporting failure information.

If periodic reporting is required in the request message in operation 1901, operation 1903 and the subsequent reporting will be performed. If on-demand reporting is required in the request message in operation 1901, operation 1903 and the subsequent reporting will not be performed. Alternatively, if the request message in operation 1901 requires on-demand reporting, operation 1902 is the ninth message including the computing power information reporting response, and operation 1903 is the tenth message including the computing power information, and the reporting after operation 1903 is not continued.

Operation 1903: The second entity sends a message including computing power information to the first entity. In an implementation, for example, the message may be the aforementioned tenth message including computing power information.

Figure 20:
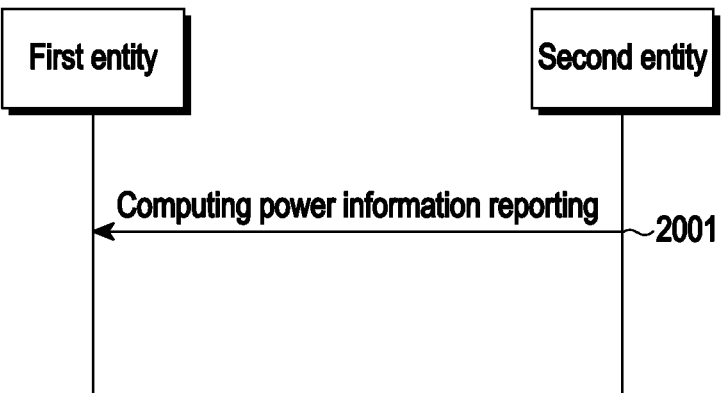
FIG. 20 is a schematic diagram illustrating an aspect of supporting wireless communication network data collection according to an embodiment of the disclosure.

FIG. 20 illustrates a schematic diagram of an aspect of supporting wireless communication network data collection according to an embodiment of the disclosure.

Referring to FIG. 20, FIG. 20 illustrates a procedure in which entities interact with each other for computing power information according to their own situations. Specifically, the second entity sends a message including computing power information report to the first entity according to its own situation, so that the first entity can acquire the computing power information of the second entity, so as to ensure the subsequent performance of the network and/or UE. In an implementation, for example, the first entity may be a gNB or a gNB CU-CP or gNB CU or gNB DU or an en-gNB or an eNB or an ng-eNB, and the second entity may be a gNB or a gNB CU-CP or gNB CU or gNB DU or an en-gNB or an eNB or an ng-eNB. In another implementation, for example, the first entity may be a gNB or a gNB CU-CP or gNB CU or gNB DU or an en-gNB or an eNB or an ng-eNB, and the second entity may be a UE. In another implementation, for example, the first entity may be an AMF or an SMF or an MME, and the second entity may be a gNB or a gNB CU-CP or gNB CU or gNB DU or an en-gNB or an eNB or an ng-eNB. In another implementation, for example, the first entity may be a gNB CU and the second entity may be a gNB DU. In yet another implementation, for example, the first entity may be a gNB CU-CP and the second entity may be a gNB CU-UP.

Operation 2001: The second entity sends a message including computing power information. In an implementation, for example, the message may be the aforementioned tenth message including computing power information.

Figures 21, 22:
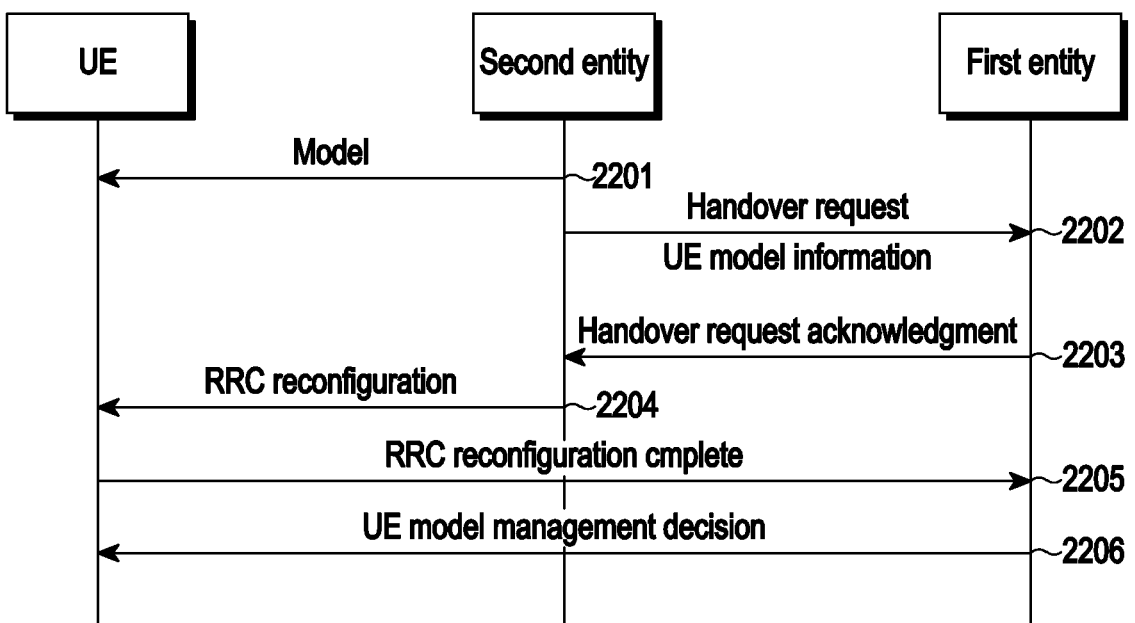
FIG. 21 is a flowchart illustrating a method of supporting wireless communication network data collection according to an embodiment of the disclosure.
FIG. 22 is a schematic diagram illustrating an aspect of supporting wireless communication network data collection according to an embodiment of the disclosure.

FIG. 21 is a flowchart 2100 illustrating a method of supporting wireless communication network data collection according to an embodiment of the disclosure.

Operation 2101: Receive a message including information related to network data collection from a second entity.

It should be understood that a first entity and a second entity including a processor and a transceiver are also provided herein, wherein the processors of the first entity and the second entity are coupled with the transceiver and configured to perform the methods, steps and operations described above with reference to FIGS. 3 to 21.

FIG. 22 is a schematic diagram illustrating an aspect of supporting wireless communication network data collection according to an embodiment of the disclosure.

Referring to FIG. 22, FIG. 22 shows that in the mobile scenario, an entity distributes a UE model in advance, and when a UE is connected to the applicable entity, the entity to which the model is applicable sends a model management decision, so that the UE can use the relevant model in time, reducing the model use delay caused by the model distribution, thus ensuring the performance of the network and the UE. In an implementation, for example, the first entity may be gNB or gNB CU-CP or gNB CU or gNB DU or gNB-CU or en-gNB or eNB or ng-eNB, and the second entity may be gNB or gNB CU or gNB DU or gNB-CU or en-gNB or eNB or ng-eNB.

Operation 2201: The second entity sends a message including a model to the UE. In an implementation, for example, the message may be the sixth message including the model. In operation 2201, if the model is distributed, that is, the UE has downloaded the model, the model is a completely downloaded model, so the model can be in an inactive state or an active state after the distribution. If the second entity is not the applicable entity of the model, then the model distribution is advanced model distribution, and the model is in the inactive state after the distribution.

Operation 2202: The second entity sends a UE model information to the first entity in a handover request message for the UE, so as to inform the first entity of the UE model information. In an implementation, for example, the message may be the aforementioned second message including the UE model information.

Operation 2203: The first entity sends a handover request acknowledgement message to the second entity.

Operation 2204: The second entity sends a RRC reconfiguration message to the UE.

Operation 2205: The UE sends a RRC reconfiguration complete message to the first entity.

Operation 2206: The first entity makes a UE model management decision for the UE model. The first entity sends a message including the UE model management decision to the UE to inform the UE of its UE model management decision. In an implementation, for example, the message may be the aforementioned fourth message including the UE model management decision. If the first entity is the applicable entity to distribute the model in operation 2201, the UE model management decision in operation 2206 may be to activate the model.

Figures 23, 24:
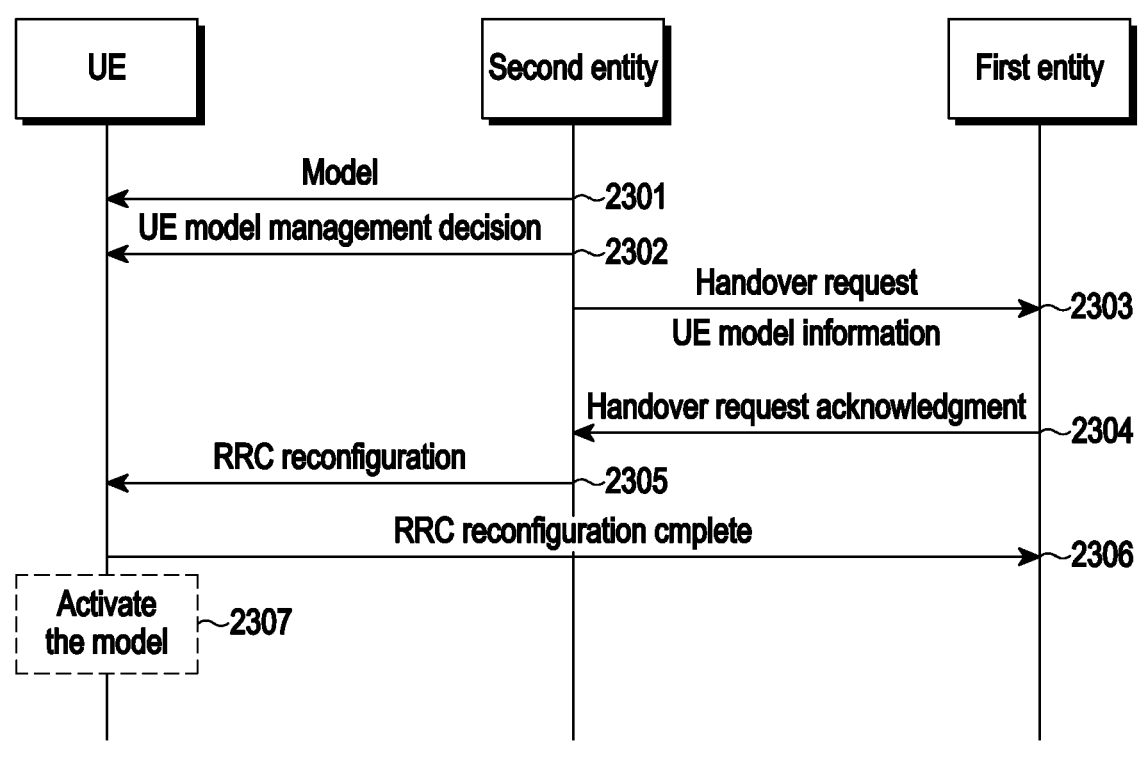
FIG. 23 is a schematic diagram illustrating an aspect of supporting wireless communication network data collection according to an embodiment of the disclosure.
FIG. 24 is a schematic diagram illustrating an aspect of supporting wireless communication network data collection according to an embodiment of the disclosure.

FIG. 23 is a schematic diagram illustrating an aspect of supporting wireless communication network data collection according to an embodiment of the disclosure.

Referring to FIG. 23, FIG. 23 shows that in the mobile scenario, the entity distributes a UE model in advance and sends a UE model management decision to inform the UE that, when the UE is connected to an applicable entity, the entity to which the model is applicable sends the model management decision, so that the UE can use the relevant model in time and reduce the model use delay caused by the model distribution, thus ensuring the performance of the network and the UE. In an implementation, for example, the first entity may be gNB or gNB CU-CP or gNB CU or gNB DU or en-gNB or eNB or ng-eNB, and the second entity may be gNB or gNB CU or gNB DU or en-gNB or eNB or ng-eNB.

Operation 2301: The second entity sends a message including a model to the UE. In an implementation, for example, the message may be the sixth message including the model. In operation 2201, if the model is distributed, that is, the UE has downloaded the model, and the model is a completely downloaded model, so the model can be in an inactive state or an active state after the distribution. If the second entity is not the applicable entity of the model, then the model is distributed in advance, and the model is in the inactive state after the distribution.

Operation 2302: The second entity makes a UE model management decision for the UE model. The second entity sends a message including the UE model management decision to the UE to inform the UE of its UE model management decision. In an implementation, for example, the message may be the aforementioned fourth message including the UE model management decision. If the second entity is not the applicable entity to distribute the model in operation 2301, the UE model management decision in operation 2302 can configure the model activation conditions for the UE.

Operation 2303: The second entity sends a UE model information to the first entity in a handover request message for the UE, so as to inform the first entity of the UE model information. In an implementation, for example, the message may be the aforementioned second message including the UE model information.

Operation 2304: The first entity sends a handover request acknowledgement message to the second entity.

Operation 2305: The second entity sends an RRC reconfiguration message to the UE.

Operation 2306: The UE sends an RRC reconfiguration complete message to the first entity.

Operation 2307: If the model activation condition configured by the entity to the UE in operation 2302 is satisfied, the UE activates the model, and then performs model training and/or inference.

Operation 2307 can be performed before and/or simultaneously with operation 2303, operation 2304, operation 2305 and operation 2306.

FIG. 24 is a schematic diagram illustrating an aspect of supporting wireless communication network data collection according to an embodiment of the disclosure.

Specifically, FIG. 7 shows the process of interactive model forwarding request and model between entities, so that the entities can obtain the model to ensure the subsequent performance of the network and/or the UE. In an implementation, for example, the first entity may be gNB or gNB CU-CP or gNB CU or gNB DU or en-gNB or eNB or ng-eNB, and the second entity may be gNB or gNB CU or gNB DU or en-gNB or eNB or ng-eNB. In another implementation, for example, the first entity may be gNB or gNB CU-CP or gNB CU or gNB DU or en-gNB or eNB or ng-eNB, and the second entity may be UE. In another implementation, for example, the first entity may be AMF or SMF or MME, and the second entity may be gNB or gNB CU-CP or gNB CU or gNB DU or en-gNB or eNB or ng-eNB. In another implementation, for example, the first entity may be gNB or gNB CU-CP or gNB CU or gNB DU or en-gNB or eNB or ng-eNB, and the second entity may be AMF or SMF or MME. In another implementation, for example, the first entity may be a gNB CU and the second entity may be a gNB DU. In another implementation, for example, the first entity may be a gNB DU and the second entity may be a gNB CU. In yet another implementation, for example, the first entity may be a gNB CU-CP and the second entity may be a gNB CU-UP. In another implementation, for example, the first entity may be gNB CU-UP and the second entity may be gNB CU-CP.

Operation 2401: The first entity sends a message including a model to the second entity. In an implementation, for example, the message may be the sixth message including the model. If the current situation is not suitable for using the model, the model can be in inactive state.

Operation 2402: The first entity makes a UE model management decision, and the first entity sends the UE model management decision to the second entity. In an implementation, for example, the message may be the aforementioned fourth message including the UE model management decision. If the model distributed in operation 2401 is in the inactive state, and the current conditions are suitable for training and/or inference of the model distributed in operation 2401, the model can be activated by using the message in operation 2402.

Operation 2403: The second entity applies and/or forwards the UE model management decision.

The various illustrative logic blocks, modules, and circuits described in this application can be implemented or performed with a general-purpose processor, a Digital Signal Processor (DSP), an application specific integrated circuit (ASIC), a Field Programmable Gate Array (FPGA) or other programmable logic devices, discrete gate or transistor logic, discrete hardware components, or any combination thereof designed to perform the functions described herein. The general-purpose processor may be a microprocessor, but in the alternative, the processor may be any conventional processor, controller, microcontroller, or state machine. The processor can also be implemented as a combination of computing devices, such as a combination of a DSP and a microprocessor, a plurality of microprocessors, one or more microprocessors cooperating with a DSP core, or any other such configuration.

The steps of the method or algorithm described in this application can be directly embodied in hardware, in a software module executed by a processor, or in a combination of the both. The software modules may reside in random access memory (RAM) memory, flash memory, read only memory (ROM) memory, erasable programmable ROM (EPROM) memory, electrically erasable programmable ROM (EEPROM) memory, registers, hard disks, removable disks, or any other form of storage media known in the art. A storage medium is coupled to the processor so that the processor can read and write information from/to the storage medium. In the alternative, the storage medium may be integrated into the processor. The processor and the storage medium may reside in the ASIC. The ASIC may reside in the user terminal. In the alternative, the processor and the storage medium may reside as discrete components in the user terminal.

In one or more designs, the functions can be implemented in hardware, software, firmware, or any combination thereof. If implemented in software, each function can be stored on or transmitted by a computer-readable medium as one or more instructions or codes. Computer readable media include both computer storage media and communication media, the latter including any media that facilitates the transfer of computer programs from one place to another. Storage media can be any available media that can be accessed by general-purpose or special-purpose computers.

With reference to the drawings, the description set forth herein describes example configurations, methods and devices, and does not represent all examples that can be realized or within the scope of the claims. As used herein, the term "example" means "serving as an example, instance or illustration", not "preferred" or "superior to other examples". The detailed description includes specific details in order to provide an understanding of the described technology. However, these techniques may be practiced without these specific details. In some cases, well-known structures and devices are shown in block diagram form to avoid obscuring the concepts of the described examples.

Although this specification includes a number of specific implementation details, these should not be construed as limitations on any disclosure or the scope of the claimed protection, but descriptions of specific features of specific embodiments of specific disclosures. Some features described in this specification in the context of individual embodiments can also be combined in a single embodiment. On the contrary, various features described in the context of a single embodiment can also be implemented in multiple embodiments alone or in any suitable sub-combination. Furthermore, although features can be described above as functioning in some combinations, and even initially claimed as such, in some cases, one or more features from the claimed combination can be deleted from the combination, and the claimed combination can be aimed at sub-combinations or variations of sub-combinations.

It should be understood that the specific order or hierarchy of steps in the method of the disclosure is an illustration of a process. Based on the design preference, it can be understood that the specific order or hierarchy of steps in the method can be rearranged to achieve the disclosed functions and effects of the disclosure. The attached method claims present elements of various steps in an example order, and are not meant to be limited to the specific order or hierarchy presented, unless otherwise stated. Therefore, the disclosure is not limited to the illustrated examples, and any device for performing the functions described herein is included in various aspects of the disclosure.

And drawings are provided as examples only to help readers understand the disclosure. They are not intended and should not be construed to limit the scope of the disclosure in any way.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first entity for data collection in a wireless communication network, the method comprising:

sending a first message including a request for user equipment (UE) model information and information about content to be reported including a model download address and an inference content reporting situation indicating a situation that a UE reports inference content of a UE model, to a second entity; and receiving a second message including the UE model information including the model download address and the inference content reporting situation from the second entity in response to sending the first message.

2. The method of claim 1, wherein the content comprises information on activation of the UE model and information on deactivation of the UE model.

3. The method of claim 1, wherein the first message comprises one or more of the following:

UE identification, a validity range of content of the first message, a handover time, UE model information reporting request indication, a reporting registration request, a reporting time interval, reporting time, an information reporting type, an information reporting period, and triggering event configuration for reporting, wherein the content to be reported includes one or more of the following:

an index and/or a list of indexes of model(s), a name of a model, a function of a model, a state of a model, a model integrity state, a state of an incompletely downloaded model, a model download proportion, a suggested action, a suggested action for an incompletely downloaded model, model accuracy, a model activation condition, a model deactivation condition, model activation time, and model deactivation time, and wherein the inference content reporting situation includes one or more of the following:

an inference content reporting type, an inference content reporting period, a triggering event for inference content reporting, reported inference content, validity time of the inference content requested to be reported and/or reported inference content, and accuracy.

4. The method of claim 1, wherein the second message comprises model information content, and wherein the model information content comprises information on activation of the UE model and information on deactivation of the UE model.

5. The method of claim 1, wherein the second message comprises one or more of the following:

UE identification, a validity range of content of the second message, confirmation that the content can be reported, a triggering event, and model information content, wherein the model information content includes one or more of the following:

an index and/or a list of indexes of model(s), a name of a model, a function of a model, a state of a model, a model integrity state, a state of an incompletely downloaded model, a suggested action, a suggested action for an incompletely downloaded model, model accuracy, a model download proportion, a model activation condition, a model deactivation condition, model activation time, and model deactivation time, and wherein the inference content reporting situation includes one or more of the following:

an inference content reporting type, an inference content reporting period, a triggering event for inference content reporting, reported inference content, validity time of the reported inference content, and accuracy.

6. The method of claim 1, wherein the method further comprises receiving a fourth message including a user equipment (UE) model management decision from the second entity, and wherein the fourth message comprises one or more of the following:

UE identification, a validity range of content of the fourth message, and a model management decision, wherein the model management decision includes one or more of the following:

an index and/or a list of indexes of model(s), a name of a model, a function of a model, a state of a model, a state of an incompletely downloaded model, a decision for a model, a decision for an incompletely downloaded model, a list of active models, a model activation indication, a model deactivation indication, model activation time, model deactivation time, a model activation condition, a model deactivation condition, a forwarding strategy applicable to a completely down-loaded model, a model forwarding strategy applicable to an incom-pletely downloaded model, a model forwarding proportion, and an inference content reporting decision, and wherein the inference content reporting decision includes one or more of the following:

an inference content reporting type, an inference content reporting period, a triggering event for inference content reporting, reported inference content, validity time of the reported inference content, inference content requested to be reported, validity time of the inference content requested to be reported, and accuracy.

7. The method of claim 1, wherein the method further comprises:

sending a fifth message including a UE model forwarding request to the second entity; and receiving a sixth message including a UE model from the second entity, wherein the fifth message comprises one or more of the following:

UE identification, a validity range of content of the fifth message, a handover time, model forwarding request identification, a model forwarding registration request, a model forwarding time interval, model forwarding time, a model forwarding proportion, a model forwarding type, triggering event configuration for model forwarding, a model download address, a model download proportion, and content to be forwarded, and wherein the content to be forwarded includes one or more of the following:

an index and/or a list of indexes of model(s), a name of a model, a function of a model, a state of a model, model accuracy, a model type, a feature parameter of a model, an input parameter type of a model, constraints of input parameters of a model, output parameter types of a model, preprocessing methods of input parameters of a model, post-processing methods of output parameters of a model, and validity time of model inference content.

8. The method of claim 7, wherein the sixth message comprises one or more of the following:

UE identification, a validity range of content of the sixth message, confirmation that the content can be forwarded, a model download proportion, a model forwarding proportion, a triggering event for model forwarding, content to be forwarded, and distribution content, wherein the content to be forwarded includes one or more of the following:

an index and/or a list of indexes of model(s), a name of a model, a function of a model, a state of a model, model accuracy, a type of a model, a feature parameter of a model, an input parameter type of a model, constraints of input parameters of a model, output parameter types of a model, preprocessing methods of input parameters of a model, post-processing methods of output parameters of a model, and validity time of model inference content, and wherein the distribution content includes one or more of the following:

an index and/or a list of indexes of model(s), a name of a model, a function of a model, a state of a model, model accuracy, a type of a model, a feature parameter of a model, an input parameter type of a model, constraints of input parameters of a model, output parameter types of a model, preprocessing methods of input parameters of a model, and post-processing methods of output parameters of a model.

9. The method of claim 1, wherein the method further comprises receiving a tenth message including computing power information from the second entity.

10. The method of claim 1, wherein the method further comprises:

sending an eighth message including information for requesting computing power to the second entity; and receiving a ninth message including a response to the eighth message or a tenth message including computing power information from the second entity, wherein the eighth message comprises one or more of the following:

a validity range of content of the eighth message, prediction identification, a prediction registration request, a registration request, a reporting time interval, reporting time, a predicted information reporting time interval, predicted information reporting time, validity time of the prediction result of predicted infor-mation, a computing power information reporting type, a computing power information reporting period, triggering event configuration for computing power information reporting, a predicted computing power information reporting type, a predicted computing power information reporting period, triggering event configuration for predicted computing power information reporting, computing power information content to be reported, and predicted computing power information content to be reported, and wherein the ninth message comprises one or more of the following:

a validity range of content of the ninth message, confirmation that the content can be reported, confirmation that the predicted computing power information content can be reported, a triggering event for computing power information reporting, a triggering event for predicted computing power information reporting, computing power information reporting content, predicted computing power information reporting content, accuracy of predicted computing power information, and validity time of predicted computing power information.

11. The method of claim 10, wherein the tenth message comprises one or more of the following:

a validity range of content of the tenth message;

a triggering event for computing power information reporting:

a triggering event for predicted computing power information reporting:

computing power information reporting content;

predicted computing power information reporting content;

accuracy of predicted computing power information; and validity time of predicted computing power information.

12. A method performed by a second entity for data collection in a wireless communication network, the method comprising:

receiving a first message including a request for user equipment (UE) model information and information about content to be reported including a model download address and an inference content reporting situation indicating a situation that a UE reports inference content of a UE mode, from a first entity; and sending a second message including the UE model information including the model download address and the inference content reporting situation to the first entity.

13. A first entity in a wireless communication network, the first entity comprising:

a transceiver; and a processor coupled to the transceiver and configured to:

send a first message including a request for user equipment (UE) model information and information about content to be reported including a model download address and an inference content reporting situation indicating a situation that a UE reports inference content of a UE model, to a second entity, and receive a second message including the UE model information including the model download address and the inference content reporting situation from the second entity in response to sending the first message.

14. The first entity of claim 13, wherein the content comprises information on activation of the UE model and information on deactivation of the UE model.

15. The first entity of claim 13, wherein the first message comprises one or more of the following:

UE identification, a validity range of content of the first message, a handover time, UE model information reporting request indication, a reporting registration request, a reporting time interval, reporting time, an information reporting type, an information reporting period, and triggering event configuration for reporting, wherein the content to be reported includes one or more of the following:

an index and/or a list of indexes of model(s), a name of a model, a function of a model, a state of a model, a model integrity state, a state of an incompletely downloaded model, a model download proportion, a suggested action, a suggested action for an incompletely downloaded model, model accuracy, a model activation condition, a model deactivation condition, model activation time, model deactivation time, and an inference content reporting situation, and wherein the inference content reporting situation includes one or more of the following:

an inference content reporting type, an inference content reporting period, a triggering event for inference content reporting, reported inference content, validity time of the inference content requested to be reported and/or reported inference content, and accuracy.

16. The first entity of claim 13, wherein the second message comprises one or more of the following:

UE identification, a validity range of content of the second message, confirmation that the content can be reported, a triggering event, and model information content, wherein the model information content includes one or more of the following:

an index and/or a list of indexes of model(s), a name of a model, a function of a model, a state of a model, a model integrity state, a state of an incompletely downloaded model, a suggested action, a suggested action for an incompletely downloaded model, model accuracy, a model download proportion, a model activation condition, a model deactivation condition, model activation time, model deactivation time, and an inference content reporting situation, and wherein the inference content reporting situation includes one or more of the following:

an inference content reporting type, an inference content reporting period, a triggering event for inference content reporting, reported inference content, validity time of the reported inference content, and accuracy.

17. The first entity of claim 13, wherein the processor is further configured to receive a fourth message including a user equipment (UE) model management decision from the second entity, wherein the fourth message comprises one or more of the following:

UE identification, a validity range of content of the fourth message, and a model management decision, wherein the model management decision includes one or more of the following:

an index and/or a list of indexes of model(s), a name of a model, a function of a model, a state of a model, a state of an incompletely downloaded model, a decision for a model, a decision for an incompletely downloaded model, a list of active models, a model activation indication, a model deactivation indication, model activation time, model deactivation time, a model activation condition, a model deactivation condition, a forwarding strategy applicable to a completely downloaded model, a model forwarding strategy applicable to an incompletely downloaded model, a model forwarding proportion, and an inference content reporting decision, and wherein the inference content reporting decision includes one or more of the following:

an inference content reporting type, an inference content reporting period, a triggering event for inference content reporting, reported inference content, validity time of the reported inference content, inference content requested to be reported, validity time of the inference content requested to be reported, and accuracy.

18. A second entity in a wireless communication network, the second entity comprising:

a transceiver; and a processor coupled to the transceiver and configured to:

receive a first message including a request for user equipment (UE) model information and information about content to be reported including a model download address and an inference content reporting situation indicating a situation that a UE reports inference content of a UE model, from a first entity; and send a second message including the UE model information including the model download address and the inference content reporting situation to the first entity.

19. The second entity of claim 18, wherein the first message comprises one or more of the following:

UE identification, a validity range of content of the first message, a handover time, UE model information reporting request indication, a reporting registration request, a reporting time interval, reporting time, an information reporting type, an information reporting period, triggering event configuration for reporting, and content to be reported, wherein the content to be reported includes one or more of the following:

an index and/or a list of indexes of model(s), a name of a model, a function of a model, a state of a model, a model integrity state, a state of an incompletely downloaded model, a model download address, a model download proportion, a suggested action, a suggested action for an incompletely downloaded model, model accuracy, a model activation condition, a model deactivation condition, model activation time, model deactivation time, and an inference content reporting situation, and wherein the inference content reporting situation includes one or more of the following:

an inference content reporting type, an inference content reporting period, a triggering event for inference content reporting, reported inference content, validity time of the inference content requested to be reported and/or reported inference content, and accuracy.

20. The second entity of claim 18, wherein the second message comprises one or more of the following:

UE identification, a validity range of content of the second message, confirmation that the content can be reported, a triggering event, and model information content, wherein the model information content includes one or more of the following:

an index and/or a list of indexes of model(s), a name of a model, a function of a model, a state of a model, a model integrity state, a state of an incompletely downloaded model, a suggested action, a suggested action for an incompletely downloaded model, model accuracy, a model download address, a model download proportion, a model activation condition, a model deactivation condition, model activation time, model deactivation time, and an inference content reporting situation, and wherein the inference content reporting situation includes one or more of the following:

an inference content reporting type, an inference content reporting period, a triggering event for inference content reporting,
reported inference content,
validity time of the reported inference content, and
accuracy.

* * * * *